United States Patent
Yamasaki et al.

(10) Patent No.: US 12,243,568 B2
(45) Date of Patent: *Mar. 4, 2025

(54) MAGNETIC TAPE CARTRIDGE, MAGNETIC TAPE DRIVE, MEMORY, MAGNETIC TAPE, MAGNETIC TAPE SYSTEM, AND OPERATION METHOD OF MAGNETIC TAPE DRIVE

(71) Applicant: FUJIFILM Corporation, Tokyo (JP)

(72) Inventors: Nagisa Yamasaki, Kanagawa (JP); Toru Nakao, Kanagawa (JP); Atsushi Musha, Kanagawa (JP); Kento Takishima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,119

(22) Filed: Dec. 22, 2022

(65) Prior Publication Data

US 2023/0206945 A1 Jun. 29, 2023

(30) Foreign Application Priority Data

Dec. 24, 2021 (JP) .................................. 2021-211562

(51) Int. Cl.
*G11B 5/53* (2006.01)
(52) U.S. Cl.
CPC ............. *G11B 5/534* (2013.01); *G11B 5/535* (2013.01)
(58) Field of Classification Search
None
See application file for complete search history.

(56) References Cited

U.S. PATENT DOCUMENTS

| | | | | | |
|---|---|---|---|---|---|
| 6,222,698 | B1 * | 4/2001 | Barndt | ............... | G11B 5/00813 |
| 6,965,490 | B2 * | 11/2005 | Ito | ............... | G11B 5/52 |
| 8,797,682 | B1 * | 8/2014 | Biskeborn | ........... | G11B 5/00826 360/121 |
| 8,810,957 | B1 * | 8/2014 | Biskeborn | ........... | G11B 5/00826 360/85 |

(Continued)

FOREIGN PATENT DOCUMENTS

| | | | | |
|---|---|---|---|---|
| EP | 1378891 A1 * | 1/2004 | ............... | G11B 5/52 |
| JP | 6669302 B1 | 3/2020 | | |
| JP | 2021-034099 A | 3/2021 | | |

OTHER PUBLICATIONS

Extended European Search Report issued May 25, 2023 in European Application No. 22214841.3.

*Primary Examiner* — William J Klimowicz
(74) *Attorney, Agent, or Firm* — Sughrue Mion, PLLC

(57) ABSTRACT

A magnetic tape cartridge includes a magnetic tape, and a storage medium in which information on the magnetic tape is stored. The magnetic tape has a recording surface. Data is recorded in the recording surface by a magnetic head in a state in which the magnetic tape is made to travel. The magnetic head is disposed at an inclined posture with respect to a width direction of the magnetic tape along the recording surface. Angle adjustment information obtained before the data is recorded in the recording surface is stored in the storage medium. The angle adjustment information is information for adjusting an angle at which the magnetic head is inclined with respect to the width direction along the recording surface.

19 Claims, 45 Drawing Sheets

(56) References Cited

U.S. PATENT DOCUMENTS

| | | | | |
|---|---|---|---|---|
| 9,007,712 | B1* | 4/2015 | Biskeborn | G11B 5/56 |
| | | | | 360/76 |
| 9,105,291 | B1* | 8/2015 | Biskeborn | G11B 5/56 |
| 9,117,470 | B1* | 8/2015 | Bui | G11B 5/4893 |
| 9,129,614 | B2* | 9/2015 | Biskeborn | G11B 5/4893 |
| 9,208,809 | B2* | 12/2015 | Biskeborn | G11B 5/115 |
| 9,218,838 | B2* | 12/2015 | Biskeborn | G11B 5/584 |
| 9,449,628 | B2* | 9/2016 | Biskeborn | G11B 5/4893 |
| 11,295,772 | B1* | 4/2022 | Watson | G11B 5/00813 |
| 11,373,683 | B2* | 6/2022 | Watson | G11B 15/093 |
| 11,783,857 | B2* | 10/2023 | Biskeborn | G11B 5/56 |
| | | | | 360/78.02 |
| 2007/0285831 | A1* | 12/2007 | Goker | G11B 5/584 |
| 2009/0128949 | A1* | 5/2009 | Matsuno | G11B 5/584 |
| 2011/0170214 | A1 | 7/2011 | Bui et al. | |
| 2014/0016226 | A1* | 1/2014 | Bui | G11B 20/10305 |
| | | | | 360/75 |
| 2014/0334033 | A1 | 11/2014 | Biskeborn et al. | |
| 2017/0372735 | A1* | 12/2017 | Biskeborn | G11B 5/531 |
| 2021/0125633 | A1* | 4/2021 | Jurneke | G11B 5/5928 |
| 2022/0108725 | A1* | 4/2022 | Watson | G11B 5/00813 |
| 2022/0180897 | A1* | 6/2022 | Biskeborn | G11B 5/29 |
| 2022/0254370 | A1 | 8/2022 | Yamaga et al. | |
| 2023/0104452 | A1* | 4/2023 | Kasada | G11B 5/71 |
| | | | | 428/840.2 |

\* cited by examiner

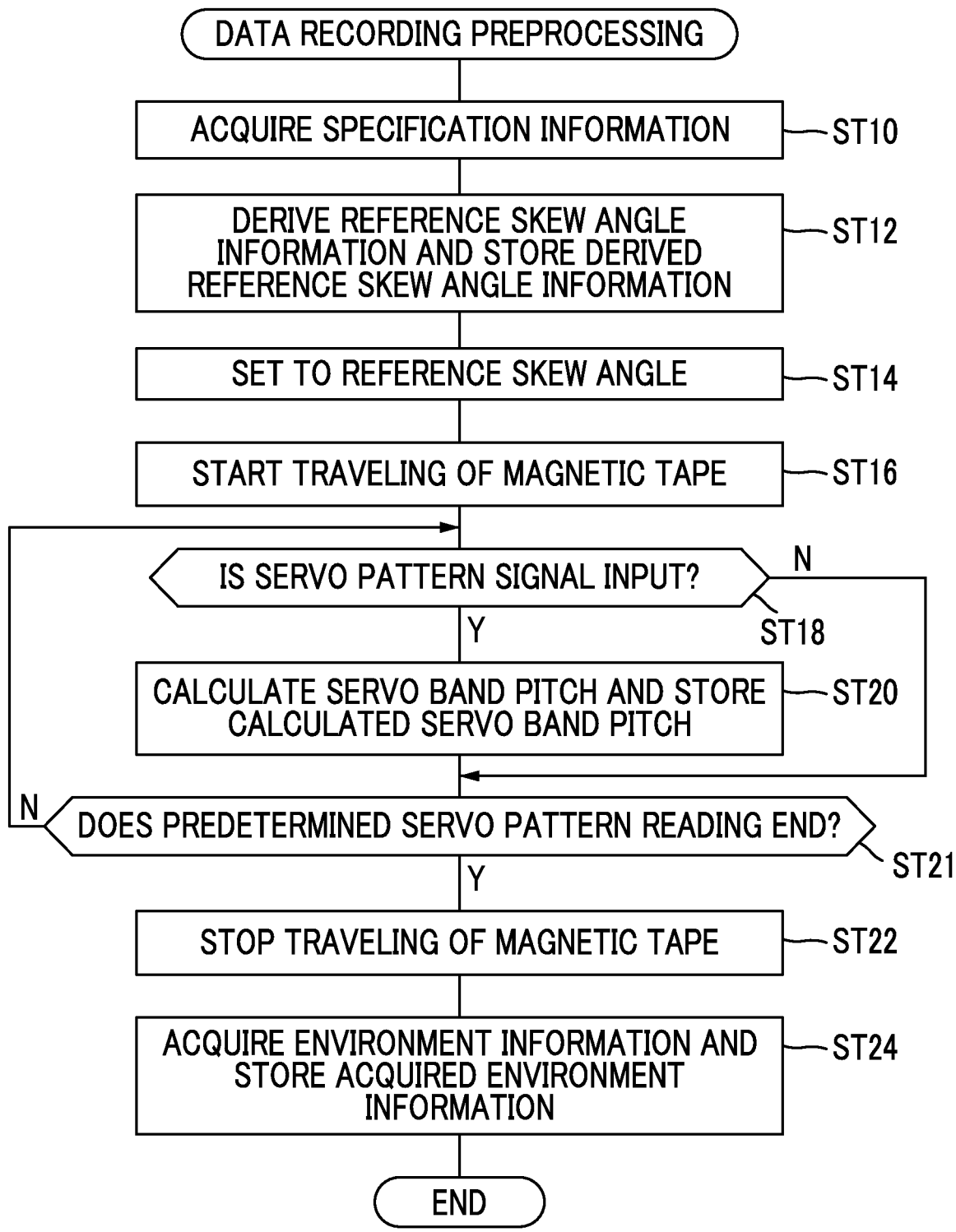

MAGNETIC TAPE CARTRIDGE, MAGNETIC TAPE DRIVE, MEMORY, MAGNETIC TAPE, MAGNETIC TAPE SYSTEM, AND OPERATION METHOD OF MAGNETIC TAPE DRIVE

CROSS-REFERENCE TO RELATED APPLICATIONS

This application claims priority under 35 USC 119 from Japanese Patent Application No. 2021-211562 filed on Dec. 24, 2021, the disclosure of which is incorporated by reference herein.

BACKGROUND

1. Technical Field

The technology of the present disclosure relates to a magnetic tape cartridge, a magnetic tape drive, a memory, a magnetic tape, a magnetic tape system, and an operation method of a magnetic tape drive.

2. Related Art

JP6669302B discloses a cartridge including a cartridge case that accommodates a magnetic tape, and a memory that is provided in the cartridge case and stores information on the magnetic tape before data recording, which is information for adjusting a width of the magnetic tape during the data recording or data reproduction of the magnetic tape.

SUMMARY

One embodiment according to the technology of the present disclosure provides a magnetic tape cartridge, a magnetic tape drive, a memory, a magnetic tape, a magnetic tape system, and an operation method of a magnetic tape drive capable of suppressing off-track caused by deformation of a width of a magnetic tape with high accuracy.

A first aspect according to the technology of the present disclosure relates to a magnetic tape cartridge comprising a magnetic tape, and a storage medium in which information on the magnetic tape is stored, in which the magnetic tape has a recording surface, data is recorded in the recording surface by a magnetic head in a state in which the magnetic tape is made to travel, the magnetic head is disposed at an inclined posture with respect to a width direction of the magnetic tape along the recording surface, angle adjustment information obtained before the data is recorded in the recording surface is stored in the storage medium, and the angle adjustment information is information for adjusting an angle at which the magnetic head is inclined with respect to the width direction along the recording surface.

A second aspect according to the technology of the present disclosure relates to the magnetic tape cartridge according to the first aspect, in which the angle adjustment information includes width correspondence information corresponding to a width of the magnetic tape, and the width correspondence information is information acquired in a state in which the magnetic tape is made to travel before the data is recorded in the recording surface.

A third aspect according to the technology of the present disclosure relates to the magnetic tape cartridge according to the second aspect, in which the width correspondence information is acquired at a plurality of points of the magnetic tape in a total length direction of the magnetic tape.

A fourth aspect according to the technology of the present disclosure relates to the magnetic tape cartridge according to any one of the first to third aspects, in which the angle adjustment information includes first environment information for specifying an environment.

A fifth aspect according to the technology of the present disclosure relates to the magnetic tape cartridge according to the fourth aspect, in which the first environment information is information including at least one of temperature information that indicates a temperature or humidity information that indicates humidity.

A sixth aspect according to the technology of the present disclosure relates to the magnetic tape cartridge according to any one of the first to fifth aspects, in which the angle adjustment information includes angle information that indicates an angle of the magnetic head being inclined with respect to the width direction along the recording surface.

A seventh aspect according to the technology of the present disclosure relates to the magnetic tape cartridge according to any one of the first to sixth aspects, in which the angle adjustment information includes physical feature information that indicates a physical feature of the magnetic tape.

An eighth aspect according to the technology of the present disclosure relates to the magnetic tape cartridge according to the seventh aspect, in which the physical feature includes at least one of a thickness of the magnetic tape, a thickness of a magnetic layer of the magnetic tape, a friction coefficient of a front surface of the magnetic tape, a friction coefficient of a back surface of the magnetic tape, a temperature expansion coefficient of the magnetic tape, a humidity expansion coefficient of the magnetic tape, a Poisson's ratio of the magnetic tape, or a substrate of the magnetic tape.

A ninth aspect according to the technology of the present disclosure relates to the magnetic tape cartridge according to any one of the first to eighth aspects, in which the storage medium is a medium including a memory capable of communicating with a noncontact read/write device in a noncontact manner.

A tenth aspect according to the technology of the present disclosure relates to the magnetic tape cartridge according to any one of the first to ninth aspects, in which the storage medium is a medium including a part of the magnetic tape.

An eleventh aspect according to the technology of the present disclosure relates to a magnetic tape drive comprising a processor that executes processing for the magnetic tape cartridge according to any one of the first to tenth aspects, and an angle adjustment mechanism that adjusts the angle by applying power to the magnetic head, in which the processor acquires the angle adjustment information from the storage medium, and causes the angle adjustment mechanism to adjust the angle based on the angle adjustment information.

A twelfth aspect according to the technology of the present disclosure relates to the magnetic tape drive according to the eleventh aspect, in which the magnetic tape includes a servo band, the magnetic head includes a servo reading element, and the processor matches a position of the servo band with a position of the servo reading element by causing the angle adjustment mechanism to adjust the angle based on the angle adjustment information in a case in which the data is recorded in the recording surface.

A thirteenth aspect according to the technology of the present disclosure relates to the magnetic tape drive according to the eleventh or twelfth aspect, in which the magnetic head performs magnetic processing on the recording surface, the angle adjustment information includes second environment information for specifying an environment, and the processor acquires third environment information for specifying the environment at a timing at which the magnetic processing is performed, and causes the angle adjustment mechanism to adjust the angle based on a degree of difference between the second environment information and the third environment information.

A fourteenth aspect according to the technology of the present disclosure relates to the magnetic tape drive according to any one of the eleventh to thirteenth aspects, in which the processor acquires fourth environment information for specifying an environment at a first timing at which the data is recorded in the recording surface, acquires fifth environment information for specifying the environment at a second timing at which the data is recorded in the recording surface, the second timing being different from the first timing, and causes the angle adjustment mechanism to adjust the angle based on a degree of difference between the fourth environment information and the fifth environment information.

A fifteenth aspect according to the technology of the present disclosure relates to the magnetic tape drive according to the fourteenth aspect, in which the second timing is a timing at which the data is updated by performing overwriting to the data recorded in the recording surface at the first timing and/or a timing at which new data is added to the recording surface in which the data is recorded at the first timing.

A sixteenth aspect according to the technology of the present disclosure relates to a memory in which control information for controlling an operation of a magnetic head that performs magnetic processing on a magnetic tape is stored, in which the magnetic tape has a recording surface, data is recorded in the recording surface by the magnetic head in a state in which the magnetic tape is made to travel, the magnetic head is disposed at an inclined posture with respect to a width direction of the magnetic tape along the recording surface, the control information includes angle adjustment information obtained before the data is recorded in the recording surface, and the angle adjustment information is information for adjusting an angle at which the magnetic head is inclined with respect to the width direction along the recording surface.

A seventeenth aspect according to the technology of the present disclosure relates to a magnetic tape comprising a recording surface that is subjected to magnetic processing by a magnetic head, in which data is recorded in the recording surface by the magnetic head in a state in which the magnetic tape is made to travel, the magnetic head is disposed at an inclined posture with respect to a width direction of the magnetic tape along the recording surface, angle adjustment information obtained before the data is recorded in the recording surface is recorded in the recording surface, and the angle adjustment information is information for adjusting an angle at which the magnetic head is inclined with respect to the width direction along the recording surface.

An eighteenth aspect according to the technology of the present disclosure relates to a magnetic tape system comprising the magnetic tape according to the seventeenth aspect, and a magnetic tape drive including a processor that executes processing for the magnetic tape and an angle adjustment mechanism that adjusts the angle by applying power to the magnetic head, in which the processor acquires the angle adjustment information from the recording surface, and causes the angle adjustment mechanism to adjust the angle based on the angle adjustment information.

A nineteenth aspect according to the technology of the present disclosure relates to an operation method of a magnetic tape drive, the method comprising acquiring the angle adjustment information from the storage medium included in the magnetic tape cartridge according to any one of the first to tenth aspects, and causing an angle adjustment mechanism to adjust the angle based on the angle adjustment information.

BRIEF DESCRIPTION OF THE DRAWINGS

Exemplary embodiments of the technology of the disclosure will be described in detail based on the following figures, wherein:

FIG. 22 is a flowchart showing an example of a flow of data recording preprocessing;

DETAILED DESCRIPTION

In the following, examples of embodiments of a magnetic tape cartridge, a magnetic tape drive, a memory, a magnetic tape, a magnetic tape system, and an operation method of a magnetic tape drive according to the technology of the present disclosure will be described with reference to the accompanying drawings.

First, the terms used in the following description will be described.

CPU refers to an abbreviation of "central processing unit". NVM refers to an abbreviation of "non-volatile memory". RAM refers to an abbreviation of "random access memory". EEPROM refers to an abbreviation of "electrically erasable and programmable read only memory". SSD refers to an abbreviation of "solid state drive". HDD refers to an abbreviation of "hard disk drive". ASIC refers to an abbreviation of "application specific integrated circuit". FPGA refers to an abbreviation of "field-programmable gate array". PLC is an abbreviation of "programmable logic controller". SoC refers to an abbreviation of "system-on-a-chip". IC refers to an abbreviation of "integrated circuit". RFID refers to an abbreviation of "radio frequency identifier". BOT refers to an abbreviation of "beginning of tape". EOT refers to an abbreviation of "end of tape". UI refers to an abbreviation of "user interface". WAN refers to an abbreviation of "wide area network". LAN refers to an abbreviation of "local area network". In addition, in the following description, the geometrical characteristic refers to a generally recognized geometrical characteristic, such as a length, a shape, an orientation, and/or a position.

Figure 1:
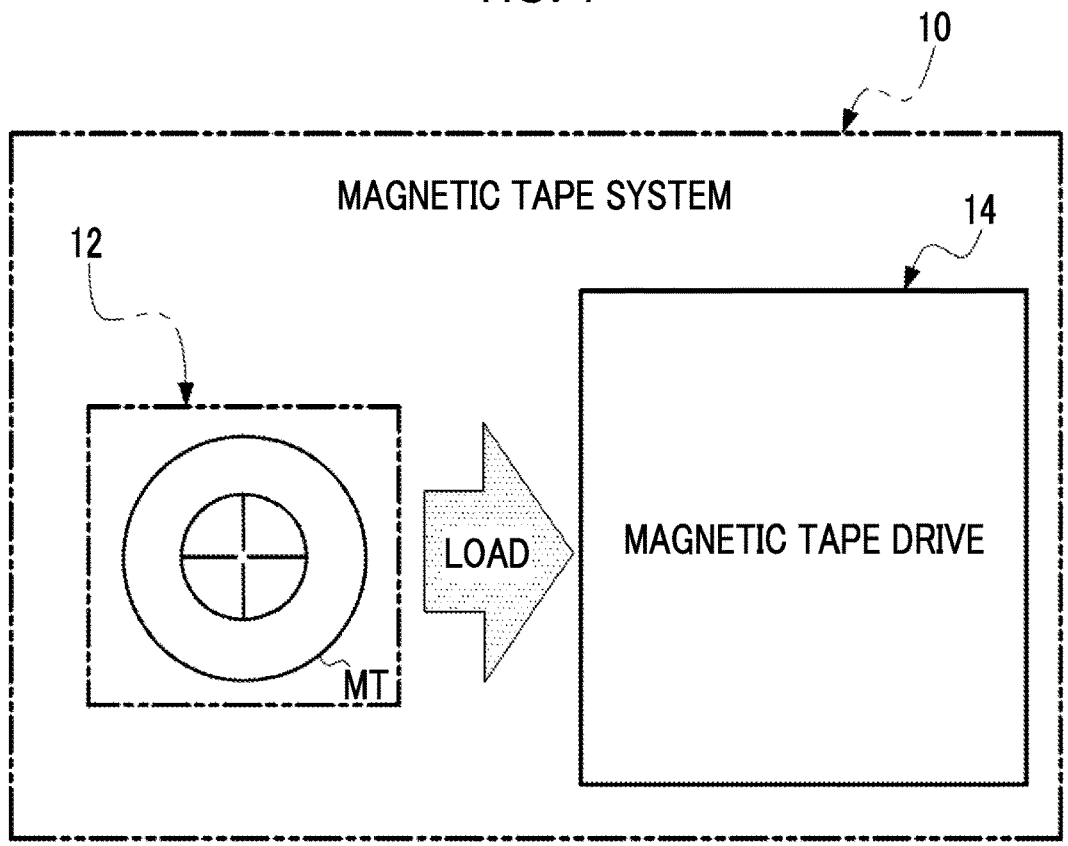
FIG. 1 is a block diagram showing an example of a configuration of a magnetic tape system.

As an example, as shown in FIG. 1, a magnetic tape system 10 comprises a magnetic tape cartridge 12 and a magnetic tape drive 14. A magnetic tape cartridge 12 is loaded into the magnetic tape drive 14. The magnetic tape cartridge 12 accommodates a magnetic tape MT. The magnetic tape drive 14 pulls out the magnetic tape MT from the loaded magnetic tape cartridge 12, and records data in the magnetic tape MT and reads data from the magnetic tape MT while causing the pulled out magnetic tape MT to travel.

In the present embodiment, the magnetic tape MT is an example of a "magnetic tape" according to the technology of the present disclosure. In addition, in the present embodiment, the magnetic tape system 10 is an example of a "magnetic tape system" according to the technology of the present disclosure. In addition, in the present embodiment, the magnetic tape drive 14 is an example of a "magnetic tape drive" according to the technology of the present disclosure. In addition, in the present embodiment, the magnetic tape cartridge 12 is an example of a "magnetic tape cartridge" according to the technology of the present disclosure.

Next, an example of a configuration of the magnetic tape cartridge 12 will be described with reference to FIGS. 2 to 4. It should be noted that, in the following description, for convenience of description, in FIGS. 2 to 4, a loading direction of the magnetic tape cartridge 12 into the magnetic tape drive 14 is indicated by an arrow A, a direction of the arrow A is defined as a front direction of the magnetic tape cartridge 12, and a side of the magnetic tape cartridge 12 in the front direction is defined as a front side of the magnetic tape cartridge 12. In the following description of the structure, "front" refers to the front side of the magnetic tape cartridge 12.

In addition, in the following description, for convenience of description, in FIGS. 2 to 4, a direction of an arrow B orthogonal to the direction of the arrow A is defined as a right direction, and a side of the magnetic tape cartridge 12 in the right direction is defined as a right side of the magnetic tape cartridge 12. In the following description of the structure, "right" refers to the right side of the magnetic tape cartridge 12.

In addition, in the following description, for convenience of description, in FIGS. 2 to 4, a direction opposite to the direction of the arrow B is defined as a left direction, and a side of the magnetic tape cartridge 12 in the left direction is defined as a left side of the magnetic tape cartridge 12. In the following description of the structure, "left" refers to the left side of the magnetic tape cartridge 12.

In addition, in the following description, for convenience of description, in FIGS. 2 to 4, a direction orthogonal to the direction of the arrow A and the direction of the arrow B is indicated by an arrow C, a direction of the arrow C is defined as an upper direction of the magnetic tape cartridge 12, and a side of the magnetic tape cartridge 12 in the upper direction is defined as an upper side of the magnetic tape cartridge 12. In the following description of the structure, "upper" refers to the upper side of the magnetic tape cartridge 12.

In addition, in the following description, for convenience of description, in FIGS. 2 to 4, a direction opposite to the front direction of the magnetic tape cartridge 12 is defined as a rear direction of the magnetic tape cartridge 12, and a side of the magnetic tape cartridge 12 in the rear direction is defined as a rear side of the magnetic tape cartridge 12. In the following description of the structure, "rear" refers to the rear side of the magnetic tape cartridge 12.

In addition, in the following description, for convenience of description, in FIGS. 2 to 4, a direction opposite to the upper direction of the magnetic tape cartridge 12 is defined as a lower direction of the magnetic tape cartridge 12, and a side of the magnetic tape cartridge 12 in the lower direction is defined as a lower side of the magnetic tape cartridge 12. In the following description of the structure, "lower" refers to the lower side of the magnetic tape cartridge 12.

Figure 2:
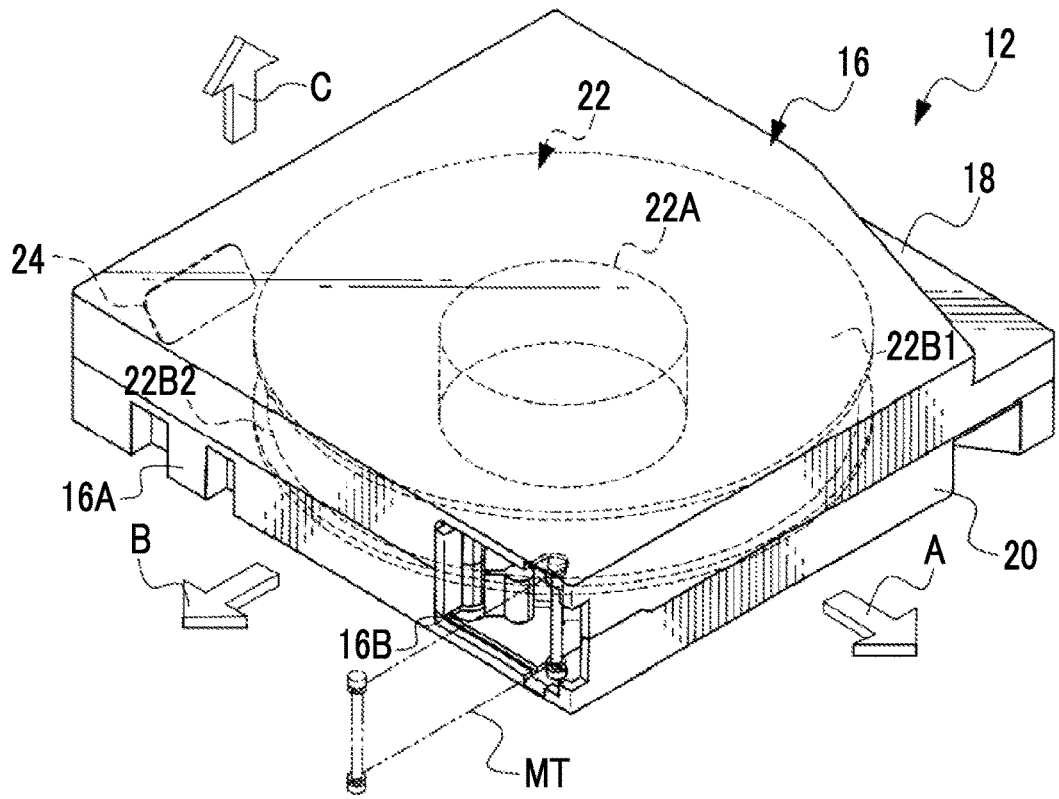
FIG. 2 is a schematic perspective view of an example of an appearance of a magnetic tape cartridge.

As an example, as shown in FIG. 2, the magnetic tape cartridge 12 has a substantially rectangular shape in a plan view, and comprises a box-shaped case 16. The magnetic tape MT is accommodated in the case 16. The case 16 is made of resin, such as polycarbonate, and comprises an upper case 18 and a lower case 20. The upper case 18 and the lower case 20 are bonded by welding (for example, ultrasound welding) and screwing in a state in which a lower peripheral edge surface of the upper case 18 and an upper peripheral edge surface of the lower case 20 are brought into contact with each other. The bonding method is not limited to welding and screwing, and other bonding methods may be used.

A sending reel 22 is rotatably accommodated inside the case 16. The sending reel 22 comprises a reel hub 22A, an upper flange 22B1, and a lower flange 22B2. The reel hub 22A is formed in a cylindrical shape. The reel hub 22A is an axial center portion of the sending reel 22, has an axial center direction along an up-down direction of the case 16, and is disposed in a center portion of the case 16. Each of the upper flange 22B1 and the lower flange 22B2 is formed in an annular shape. A center portion of the upper flange 22B1 in a plan view is fixed to an upper end portion of the reel hub 22A, and a center portion of the lower flange 22B2 in a plan view is fixed to a lower end portion of the reel hub 22A. It should be noted that the reel hub 22A and the lower flange 22B2 may be integrally molded.

The magnetic tape MT is wound around an outer peripheral surface of the reel hub 22A, and an end portion of the magnetic tape MT in a width direction is held by the upper flange 22B1 and the lower flange 22B2.

An opening 16B is formed on a front side of a right wall 16A of the case 16. The magnetic tape MT is pulled out from the opening 16B.

A cartridge memory 24 is provided in the lower case 20. Specifically, the cartridge memory 24 is accommodated in a right rear end portion of the lower case 20. An IC chip including an NVM is mounted on the cartridge memory 24. In the present embodiment, a so-called passive RFID tag is adopted as the cartridge memory 24, and the read/write of various pieces of information is performed with respect to the cartridge memory 24 in a noncontact manner. It should be noted that, in the present embodiment, the form example has been described in which the cartridge memory 24 is provided in the lower case 20, but the technology of the present disclosure is not limited to this, and the cartridge memory 24 need only be provided in the case 16 at a position at which various pieces of information can be read and written in a noncontact manner.

The cartridge memory 24 stores management information 13 for managing the magnetic tape cartridge 12. The management information 13 includes, for example, information on the cartridge memory 24 (for example, information for specifying the magnetic tape cartridge 12), information on the magnetic tape MT, and information on the magnetic tape drive 14 (for example, information that indicates specifications of the magnetic tape drive 14 and a signal used in the magnetic tape drive 14). The information on the magnetic tape MT includes specification information 13A. The specification information 13A is information for specifying the specifications of the magnetic tape MT. In addition, the information on the magnetic tape MT also includes information that indicates an outline of the data recorded in the magnetic tape MT, information that indicates an item of the data recorded in the magnetic tape MT, information that indicates a recording format of the data recorded in the magnetic tape MT, and the like. It should be noted that the cartridge memory 24 is an example of a "memory" according to the technology of the present disclosure. In addition, the cartridge memory 24 and the magnetic tape MT are examples of a "storage medium" and a "medium including a memory" according to the technology of the present disclosure. The management information 13 is an example of "control information" according to the technology of the present disclosure.

Figure 3:
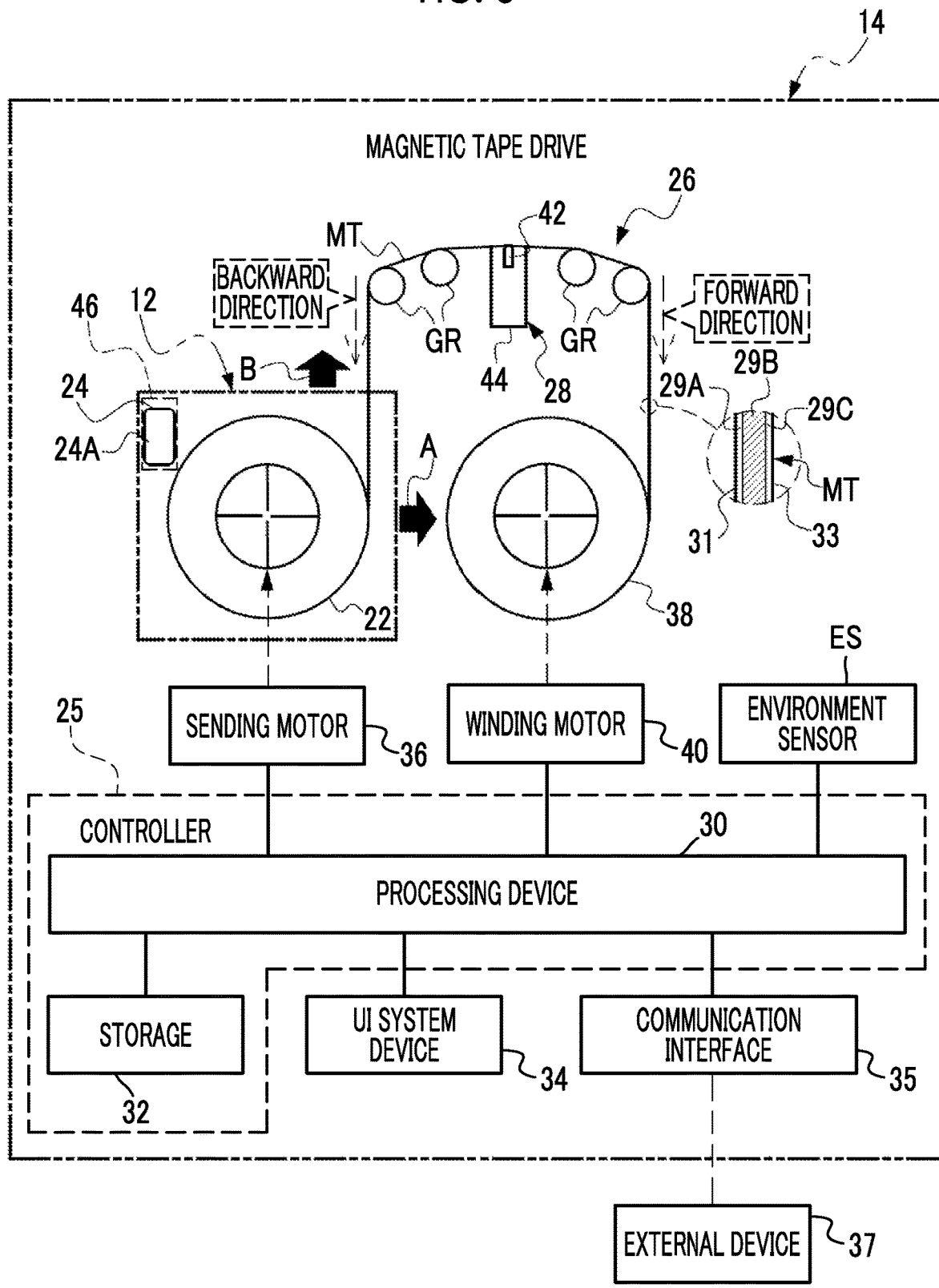
FIG. 3 is a schematic configuration diagram showing an example of a hardware configuration of a magnetic tape drive.

As an example, as shown in FIG. 3, the magnetic tape drive 14 comprises a controller 25, a transport device 26, a magnetic head 28, a UI system device 34, a communication interface 35, and an environment sensor ES. The controller 25 comprises a processing device 30 and a storage 32. The processing device 30 is an example of a "processor" according to the technology of the present disclosure.

The magnetic tape drive 14 is loaded into the magnetic tape cartridge 12 along the direction of the arrow A. In the magnetic tape drive 14, the magnetic tape MT is pulled out from the magnetic tape cartridge 12 and used. The magnetic tape drive 14 controls the entire magnetic tape drive 14 (for example, the magnetic head 28 or the like) by using the management information 13 and the like stored in the cartridge memory 24.

The magnetic tape MT has a magnetic layer 29A, a base film 29B, and a back coating layer 29C. The magnetic layer 29A is formed on one surface side of the base film 29B, and the back coating layer 29C is formed on the other surface side of the base film 29B. The data is recorded in the magnetic layer 29A. The magnetic layer 29A contains ferromagnetic powder. As the ferromagnetic powder, for example, ferromagnetic powder generally used in the magnetic layer of various magnetic recording media is used. Preferable specific examples of the ferromagnetic powder include hexagonal ferrite powder. Examples of the hexagonal ferrite powder include hexagonal strontium ferrite powder and hexagonal barium ferrite powder. The back coating layer 29C is a layer containing non-magnetic powder, such as carbon black. The base film 29B is also referred to as a support, and is made of, for example, polyethylene terephthalate, polyethylene naphthalate, or polyamide. It should be noted that a non-magnetic layer may be formed between the base film 29B and the magnetic layer 29A. In the magnetic tape MT, a surface on which the magnetic layer 29A is formed is a front surface 31 of the magnetic tape MT, and a surface on which the back coating layer 29C is formed is a back surface 33 of the magnetic tape MT. The front surface 31 is an example of a "recording surface" according to the technology of the present disclosure.

The magnetic tape drive 14 performs magnetic processing on the front surface 31 of the magnetic tape MT by using the magnetic head 28 in a state in which the magnetic tape MT is made to travel. Here, the magnetic processing refers to recording the data in the front surface 31 of the magnetic tape MT and reading the data (that is, reproducing the data) from the front surface 31 of the magnetic tape MT. In the present embodiment, the magnetic tape drive 14 selectively records the data in the front surface 31 of the magnetic tape MT and reads the data from the front surface 31 of the magnetic tape MT by using the magnetic head 28. That is, the magnetic tape drive 14 pulls out the magnetic tape MT from the magnetic tape cartridge 12, records the data in the front surface 31 of the pulled out magnetic tape MT by using the magnetic head 28, or reads the data from the front surface 31 of the pulled out magnetic tape MT by using the magnetic head 28.

The processing device 30 controls the entire magnetic tape drive 14. In the present embodiment, although the processing device 30 is realized by an ASIC, the technology of the present disclosure is not limited to this. For example, the processing device 30 may be realized by an FPGA and/or a PLC. In addition, the processing device 30 may be realized by the computer including a CPU, a flash memory (for example, an EEPROM and/or an SSD), and a RAM. In addition, the processing device 30 may be realized by combining two or more of an ASIC, an FPGA, a PLC, and a computer. That is, the processing device 30 may be realized by a combination of a hardware configuration and a software configuration.

The storage 32 is connected to the processing device 30, and the processing device 30 writes various pieces of information to the storage 32 and reads out various pieces of information from the storage 32. Examples of the storage 32 include a flash memory and/or an HDD. The flash memory and the HDD are merely examples, and any memory may be used as long as the memory is a non-volatile memory that can be mounted on the magnetic tape drive 14.

The UI system device 34 is a device having the reception function of receiving a command signal indicating a command from a user and the presentation function of presenting the information to the user. The reception function is realized by a touch panel, a hard key (for example, a keyboard), and/or a mouse, for example. The presentation function is realized by a display, a printer, and/or a speaker, for example. The UI system device 34 is connected to the processing device 30. The processing device 30 acquires the command signal received by the UI system device 34. The UI system device 34 presents various pieces of information to the user under the control of the processing device 30.

The communication interface 35 is connected to the processing device 30. In addition, the communication interface 35 is connected to an external device 37 via a communication network (not shown), such as a WAN and/or a LAN. The communication interface 35 controls the exchange of various pieces of information (for example, the data to be recorded in the magnetic tape MT, the data read from the magnetic tape MT, and/or a command signal given to the processing device 30) between the processing device 30 and the external device 37. It should be noted that examples of the external device 37 include a personal computer and a mainframe.

The transport device 26 is a device that selectively transports the magnetic tape MT along a predetermined path in a forward direction and a backward direction, and comprises a sending motor 36, a winding reel 38, a winding motor 40, and a plurality of guide rollers GR. It should be noted that, here, the forward direction refers to a sending direction of the magnetic tape MT, and the backward direction refers to a rewinding direction of the magnetic tape MT.

The sending motor 36 rotates the sending reel 22 in the magnetic tape cartridge 12 under the control of the processing device 30. The processing device 30 controls the sending motor 36 to control a rotation direction, a rotation speed, a rotation torque, and the like of the sending reel 22.

The winding motor 40 rotates the winding reel 38 under the control of the processing device 30. The processing device 30 controls the winding motor 40 to control a rotation direction, a rotation speed, a rotation torque, and the like of the winding reel 38.

In a case in which the magnetic tape MT is wound by the winding reel 38, the processing device 30 rotates the sending motor 36 and the winding motor 40 such that the magnetic tape MT travels along the predetermined path in the forward direction. The rotation speed, the rotation torque, and the like of the sending motor 36 and the winding motor 40 are adjusted in accordance with a speed at which the magnetic tape MT is wound around the winding reel 38. In addition, by adjusting the rotation speed, the rotation torque, and the like of each of the sending motor 36 and the winding motor 40 by the processing device 30, the tension is applied to the magnetic tape MT. In addition, the tension applied to the magnetic tape MT is controlled by adjusting the rotation speed, the rotation torque, and the like of each of the sending motor 36 and the winding motor 40 by the processing device 30.

It should be noted that, in a case in which the magnetic tape MT is rewound to the sending reel 22, the processing device 30 rotates the sending motor 36 and the winding motor 40 such that the magnetic tape MT travels along the predetermined path in the backward direction.

In the present embodiment, the tension applied to the magnetic tape MT is controlled by controlling the rotation speed, the rotation torque, and the like of the sending motor 36 and the winding motor 40, but the technology of the present disclosure is not limited to this. For example, the tension applied to the magnetic tape MT may be controlled by using a dancer roller, or may be controlled by drawing the magnetic tape MT into a vacuum chamber.

Each of the plurality of guide rollers GR is a roller which guides the magnetic tape MT. The predetermined path, that is, a traveling path of the magnetic tape MT is determined by separately disposing the plurality of guide rollers GR at positions straddling the magnetic head 28 between the magnetic tape cartridge 12 and the winding reel 38.

The magnetic head 28 comprises a magnetic element unit 42 and a holder 44. The magnetic element unit 42 is held by the holder 44 to come into contact with the traveling magnetic tape MT. The magnetic element unit 42 includes a plurality of magnetic elements.

The magnetic element unit 42 records the data in the magnetic tape MT transported by the transport device 26, and reads the data from the magnetic tape MT transported by the transport device 26. Here, the data refers to, for example, a servo pattern 52 (see FIG. 6) and the data other than the servo pattern 52, that is, the data recorded in a data band DB (see FIG. 6).

The magnetic tape drive 14 comprises a noncontact read/write device 46. The noncontact read/write device 46 is an example of a "noncontact read/write device" according to the technology of the present disclosure. The noncontact read/write device 46 is disposed to face a back surface 24A of the cartridge memory 24 on the lower side of the magnetic tape cartridge 12 in a state in which the magnetic tape cartridge 12 is loaded, and performs the read/write of the information with respect to the cartridge memory 24 in a noncontact manner.

The environment sensor ES is built in the magnetic tape drive 14. The environment sensor ES measures a physical quantity for specifying the environment of the magnetic tape drive 14 (for example, the environment inside the magnetic tape drive 14). Examples of the physical quantity for specifying the environment (hereinafter, also simply referred to as "environment") of the magnetic tape drive 14 include temperature and humidity. In the present embodiment, the environment sensor ES measures the temperature and the humidity of the magnetic tape drive 14. The temperature and the humidity of the magnetic tape drive 14 are, for example, a temperature and humidity inside the magnetic tape drive 14 (for example, in the vicinity of a distal end portion of the magnetic head 28 or in the vicinity of a position at which the magnetic tape cartridge 12 is loaded). A point at which the temperature and the humidity are measured is preferably around the magnetic tape MT in the magnetic tape drive 14. In particular, a point designated in advance as a point at which the temperature and the humidity most likely influence the deformation of the width of the magnetic tape MT is preferable. The environment sensor ES is connected to the processing device 30, and the temperature and the humidity measured by the environment sensor ES are grasped by the processing device 30.

Figure 4:
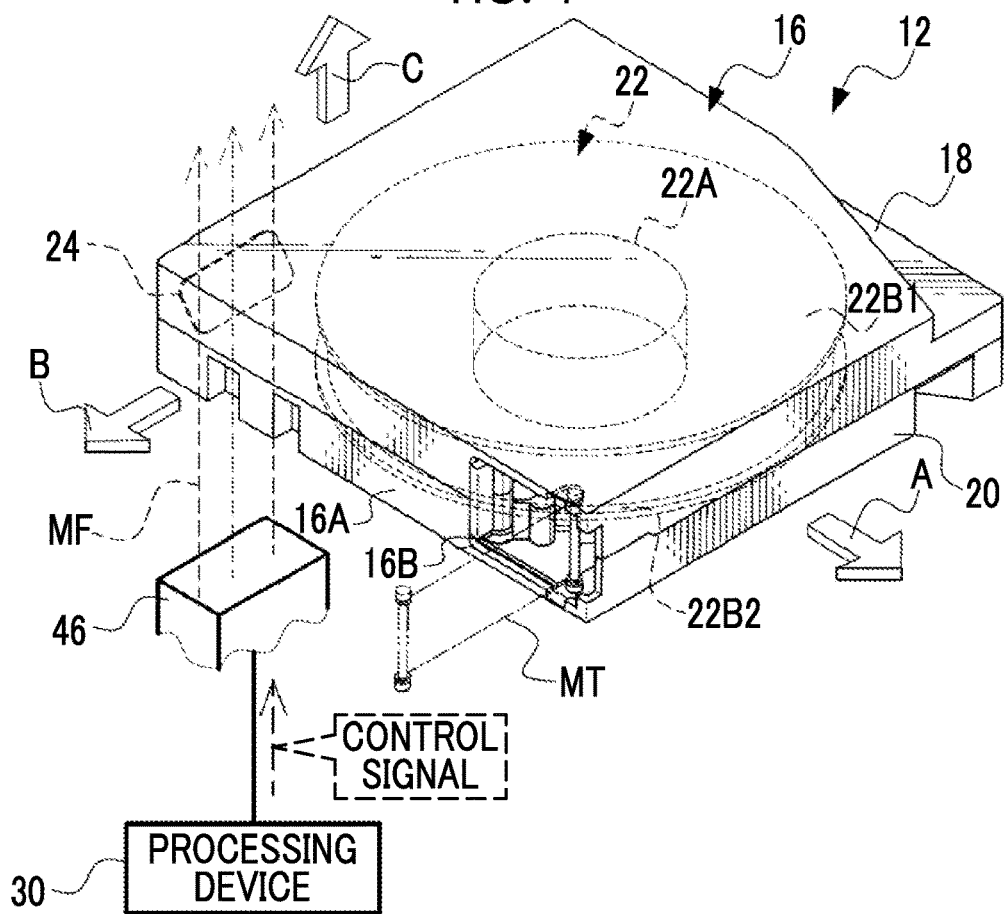
FIG. 4 is a schematic perspective view showing an example of an aspect in which a magnetic field is released by a noncontact read/write device from a lower side of the magnetic tape cartridge.

As an example, as shown in FIG. 4, the noncontact read/write device 46 releases a magnetic field MF from the lower side of the magnetic tape cartridge 12 toward the cartridge memory 24. The magnetic field MF passes through the cartridge memory 24.

The noncontact read/write device 46 is connected to the processing device 30. The processing device 30 outputs a control signal to the noncontact read/write device 46. The control signal is a signal for controlling the cartridge memory 24. The noncontact read/write device 46 generates the magnetic field MF in response to the control signal input from the processing device 30, and releases the generated magnetic field MF toward the cartridge memory 24.

The noncontact read/write device 46 performs noncontact communication with the cartridge memory 24 via the magnetic field MF to perform processing on the cartridge memory 24 in response to the control signal. For example, the noncontact read/write device 46 selectively performs, under the control of the processing device 30, processing of reading the information from the cartridge memory 24 and processing of storing the information in the cartridge memory 24 (that is, processing of writing the information to the cartridge memory 24). In other words, the processing device 30 reads the information from the cartridge memory 24 and stores the information in the cartridge memory 24 by performing communication with the cartridge memory 24 via the noncontact read/write device 46 in a noncontact manner.

Figure 5:
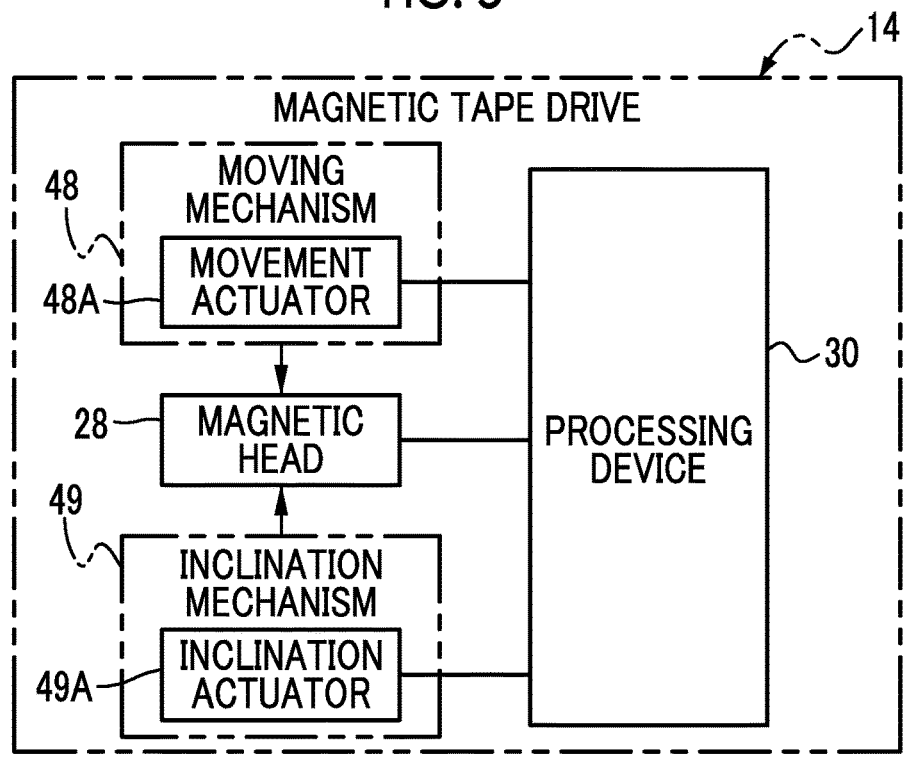
FIG. 5 is a schematic configuration diagram showing an example of the hardware configuration of the magnetic tape drive.

As an example, as shown in FIG. 5, the magnetic tape drive 14 comprises a moving mechanism 48. The moving mechanism 48 includes a movement actuator 48A. Examples of the movement actuator 48A include a voice coil motor and/or a piezo actuator. The movement actuator 48A is connected to the processing device 30, and the processing device 30 controls the movement actuator 48A. The movement actuator 48A generates power under the control of the processing device 30. The moving mechanism 48 moves the magnetic head 28 in a width direction WD (see FIG. 6) of the magnetic tape MT by receiving the power generated by the movement actuator 48A.

The magnetic tape drive 14 comprises an inclination mechanism 49. The inclination mechanism 49 is an example of an "angle adjustment mechanism" according to the technology of the present disclosure. The inclination mechanism 49 includes an inclination actuator 49A. Examples of the inclination actuator 49A include a voice coil motor and/or a piezo actuator. The inclination actuator 49A is connected to the processing device 30, and the processing device 30 controls the inclination actuator 49A. The inclination actuator 49A generates power under the control of the processing device 30. The inclination mechanism 49 inclines the magnetic head 28 to a longitudinal direction LD side of the magnetic tape MT with respect to a width direction WD of the magnetic tape MT by receiving the power generated by the inclination actuator 49A (see FIG. 10). That is, the magnetic head 28 is skewed on the magnetic tape MT by applying power from the inclination mechanism 49 under the control of the processing device 30.

Figure 6:
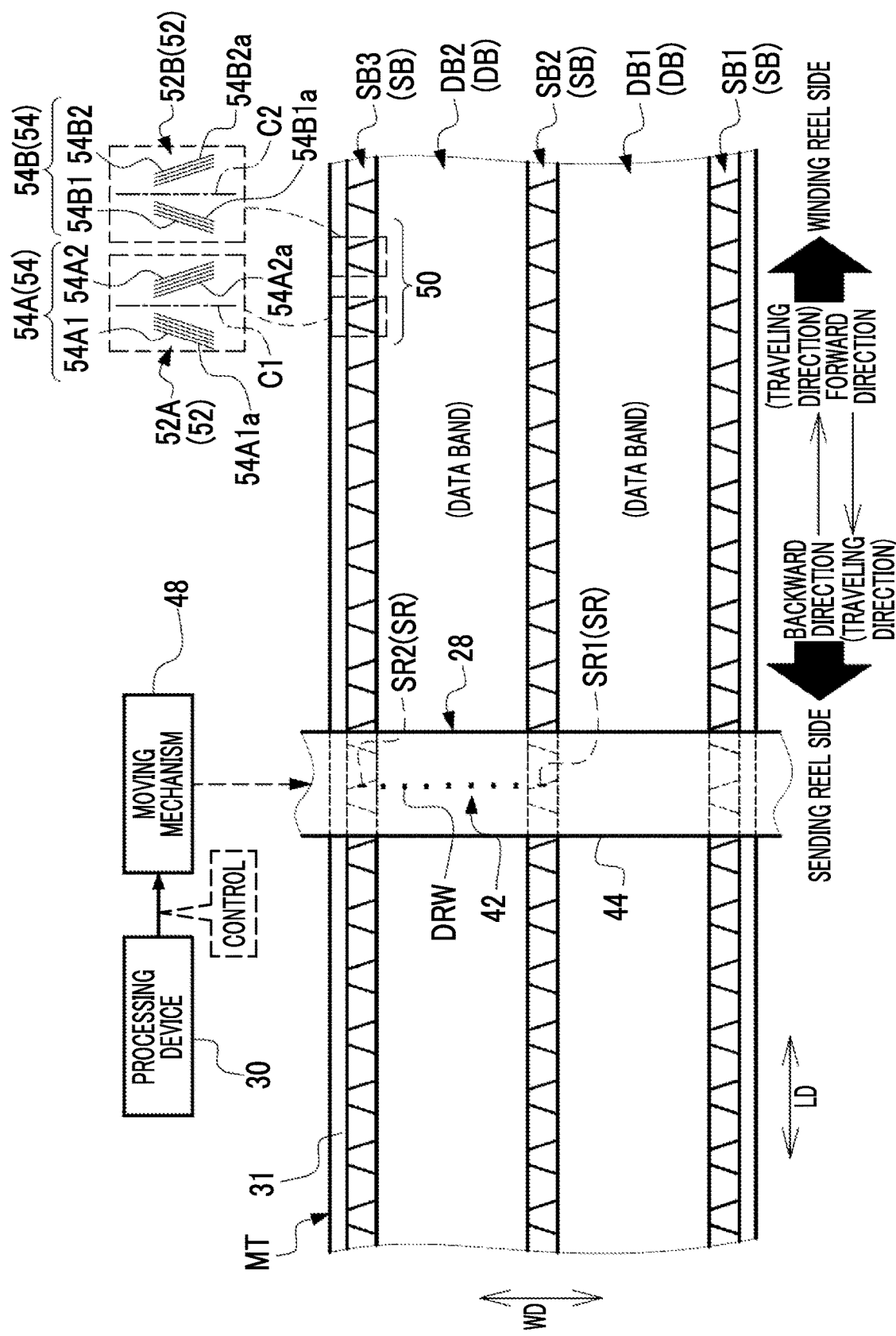
FIG. 6 is a conceptual diagram showing an example of an aspect in which a state in which a magnetic head is disposed on a magnetic tape is observed from a front surface side of the magnetic tape.

As an example, as shown in FIG. 6, on the front surface 31 of the magnetic tape MT, servo bands SB1, SB2, and SB3 are data bands DB1 and DB2 are formed. It should be noted that, in the following, for convenience of description, in a case in which the distinction is not specifically needed, the servo bands SB1 to SB3 are referred to as a servo band SB, and the data bands DB1 and DB2 are referred to as the data band DB.

The servo bands SB1 to SB3 and the data bands DB1 and DB2 are formed along the longitudinal direction LD (that is, a total length direction) of the magnetic tape MT. Here, the total length direction of the magnetic tape MT refers to the traveling direction of the magnetic tape MT, in other words. The traveling direction of the magnetic tape MT is defined in two directions of the forward direction which is a direction in which the magnetic tape MT travels from the sending reel 22 side to the winding reel 38 side (hereinafter, also simply referred to as "forward direction"), and the backward direction which is a direction in which the magnetic tape MT travels from the winding reel 38 side to the sending reel 22 side (hereinafter, also simply referred to as "backward direction").

The servo bands SB1 to SB3 are arranged at positions spaced in the width direction WD of the magnetic tape MT (hereinafter, also simply referred to as "width direction WD"). For example, the servo bands SB1 to SB3 are arranged at equal intervals along the width direction WD. It should be noted that, in the present embodiment, "equal interval" refers to the equal interval in the sense of including an error generally allowed in the technical field to which the technology of the present disclosure belongs, which is the error to the extent that it does not contradict the purpose of the technology of the present disclosure, in addition to the exact equal interval.

The data band DB1 is disposed between the servo band SB1 and the servo band SB2, and the data band DB2 is disposed between a servo band SB2 and a servo band SB3. That is, the servo bands SB and the data bands DB are arranged alternately along the width direction WD.

It should be noted that, in the example shown in FIG. 6, for convenience of description, three servo bands SB and two data bands DB are shown, but these are merely examples, and two servo bands SB and one data band DB may be used, and the technology of the present disclosure is established even in a case in which four or more servo bands SB and three or more data bands DB are used.

A plurality of servo patterns 52 are recorded in the servo band SB along the longitudinal direction LD of the magnetic tape MT. The servo patterns 52 are classified into a servo pattern 52A and a servo pattern 52B. The plurality of servo patterns 52 are disposed at regular intervals along the longitudinal direction LD of the magnetic tape MT. It should be noted that, in the present embodiment, "regular" refers to the regularity in the sense of including an error generally allowed in the technical field to which the technology of the present disclosure belongs, which is the error to the extent that it does not contradict the purpose of the technology of the present disclosure, in addition to the exact regularity.

The servo band SB is divided by a plurality of frames 50 along the longitudinal direction LD of the magnetic tape MT. The frame 50 is defined by one set of servo patterns 52. In the example shown in FIG. 6, the servo patterns 52A and 52B are shown as an example of the set of servo patterns 52. The servo patterns 52A and 52B are adjacent to each other along the longitudinal direction LD of the magnetic tape MT, and the servo pattern 52A is positioned on the upstream side in the forward direction in the frame 50, and the servo pattern 52B is positioned on the downstream side in the forward direction.

The servo pattern 52 consists of a linear magnetization region pair 54. The linear magnetization region pair 54 is classified into a linear magnetization region pair 54A and a linear magnetization region pair 54B.

The servo pattern 52A consists of the linear magnetization region pair 54A. In the example shown in FIG. 6, a pair of linear magnetization regions 54A1 and 54A2 is shown as an example of the linear magnetization region pair 54A. Each of the linear magnetization regions 54A1 and 54A2 is a linearly magnetized region.

The linear magnetization regions 54A1 and 54A2 are inclined in opposite directions with respect to an imaginary straight line C1 which is an imaginary straight line along the width direction WD. In the example shown in FIG. 6, the linear magnetization regions 54A1 and 54A2 are inclined line-symmetrically with respect to the imaginary straight line C1. More specifically, the linear magnetization regions 54A1 and 54A2 are formed in a state of being not parallel to each other and being inclined at a predetermined angle (for example, 5 degrees) in opposite directions on the longitudinal direction LD side of the magnetic tape MT with the imaginary straight line C1 as the symmetry axis.

The linear magnetization region 54A1 is a set of magnetization straight lines 54A1a, which are five magnetized straight lines. The linear magnetization region 54A2 is a set of magnetization straight lines 54A2a, which are five magnetized straight lines.

The servo pattern 52B consists of the linear magnetization region pair 54B. In the example shown in FIG. 6, a pair of linear magnetization regions 54B1 and 54B2 is shown as an example of the linear magnetization region pair 54B. Each of the linear magnetization regions 54B1 and 54B2 is a linearly magnetized region.

The linear magnetization regions 54B1 and 54B2 are inclined in opposite directions with respect to an imaginary straight line C2 which is an imaginary straight line along the width direction WD. In the example shown in FIG. 6, the linear magnetization regions 54B1 and 54B2 are inclined line-symmetrically with respect to the imaginary straight line C2. More specifically, the linear magnetization regions 54B1 and 54B2 are formed in a state of being not parallel to each other and being inclined at a predetermined angle (for example, 5 degrees) in opposite directions on the longitudinal direction LD side of the magnetic tape MT with the imaginary straight line C2 as the symmetry axis.

The linear magnetization region 54B1 is a set of magnetization straight lines 54B1a, which are four magnetized straight lines. The linear magnetization region 54B2 is a set of magnetization straight lines 54B2a, which are four magnetized straight lines.

The magnetic head 28 is disposed on the front surface 31 side of the magnetic tape MT configured as described above. The holder 44 is formed in a rectangular parallelepiped shape, and is disposed to cross the front surface 31 of the magnetic tape MT along the width direction WD. The plurality of magnetic elements of the magnetic element unit 42 are arranged in a straight line along the longitudinal direction of the holder 44. The magnetic element unit 42 has a pair of servo reading elements SR and a plurality of data read/write elements DRW as the plurality of magnetic elements. The servo reading element SR is an example of a "servo reading element" according to the technology of the present disclosure.

A length of the holder 44 in the longitudinal direction is sufficiently long with respect to the width of the magnetic tape MT. For example, the length of the holder 44 in the longitudinal direction is set to a length exceeding the width of the magnetic tape MT even in a case in which the magnetic element unit 42 is disposed at any position on the magnetic tape MT.

The pair of servo reading elements SR are mounted on the magnetic head 28. In the magnetic head 28, a relative positional relationship between the holder 44 and the pair of servo reading elements SR is fixed. The pair of servo reading elements SR consists of servo reading elements SR1 and SR2. The servo reading element SR1 is disposed at one end of the magnetic element unit 42, and the servo reading element SR2 is disposed at the other end of the magnetic element unit 42. In the example shown in FIG. 6, the servo reading element SR1 is provided at a position corresponding to the servo band SB2, and the servo reading element SR2 is provided at a position corresponding to the servo band SB3.

The plurality of data read/write elements DRW are disposed in a straight line between the servo reading element SR1 and the servo reading element SR2. The plurality of data read/write elements DRW are disposed at intervals along the longitudinal direction of the magnetic head 28 (for example, are disposed at equal intervals along the longitudinal direction of the magnetic head 28). In the example shown in FIG. 6, the plurality of data read/write elements DRW are provided at positions corresponding to the data band DB2.

The processing device 30 acquires a servo pattern signal which is a result of reading the servo pattern 52 by the servo reading element SR, and performs a servo control in response to the acquired servo pattern signal. Here, the servo control refers to a control of moving the magnetic head 28 in the width direction WD of the magnetic tape MT by operating the moving mechanism 48 in accordance with the servo pattern 52 read by the servo reading element SR.

By performing the servo control, the plurality of data read/write elements DRW are positioned on a designated region in the data band DB, and perform the magnetic processing on the designated region in the data band DB in this state. In the example shown in FIG. 6, the plurality of data read/write elements DRW perform the magnetic processing on the designated region in the data band DB2.

In addition, in a case in which the data band DB of which the data is to be read by the magnetic element unit 42 is changed (in the example shown in FIG. 6, the data band DB of which the data is to be read by the magnetic element unit 42 is changed from the data band DB2 to the data band DB1), the moving mechanism 48 moves, under the control of the processing device 30, the magnetic head 28 in the width direction WD to change the position of the pair of servo reading elements SR. That is, by moving the magnetic head 28 in the width direction WD, the moving mechanism 48 moves the servo reading element SR1 to a position corresponding to the servo band SB1 and moves the servo reading element SR2 to the position corresponding to the servo band SB2. As a result, the positions of the plurality of data read/write elements DRW are changed from the data band DB2 to the data band DB1, and the plurality of data read/write elements DRW perform the magnetic processing on the data band DB1.

Figure 7:
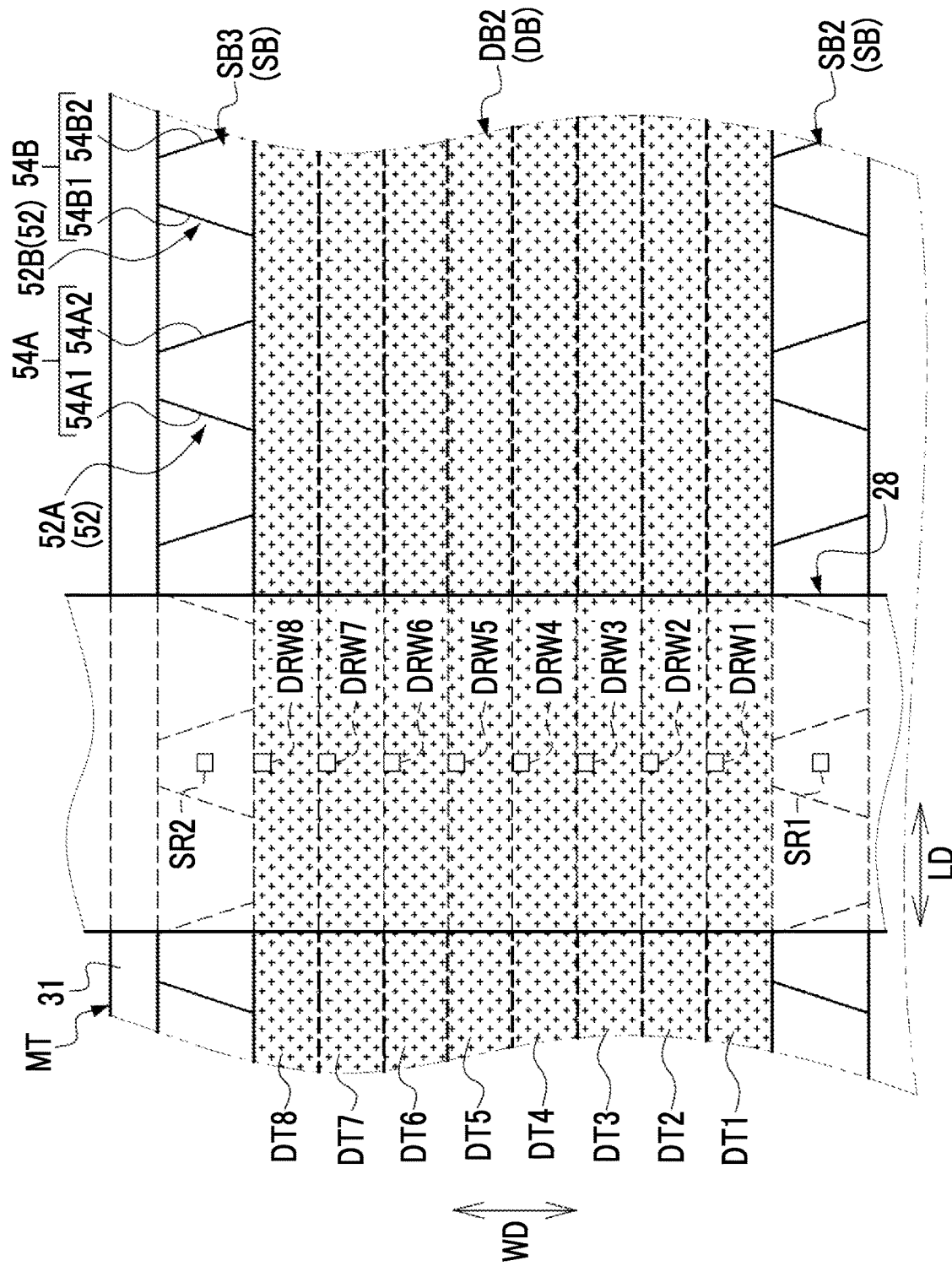
FIG. 7 is a conceptual diagram showing an example of a configuration of a data band formed on a front surface of the magnetic tape.

As an example, as shown in FIG. 7, in the data band DB2, as a plurality of division areas obtained by dividing the data band DB2 in the width direction WD, data tracks DT1, DT2, DT3, DT4, DT5, DT6, DT7, and DT8 are formed from the servo band SB2 side to the servo band SB3 side.

The magnetic head 28 includes, as the plurality of data read/write elements DRW, data read/write elements DRW1, DRW2, DRW3, DRW4, DRW5, DRW6, DRW7, and DRW8 between the servo reading element SR1 and the servo reading element SR2 along the width direction WD. The data read/write elements DRW1 to DRW8 have a one-to-one correspondence with the data tracks DT1 to DT8, and can read (that is, reproduce) data from the data tracks DT1 to DT8 and record (that is, write) the data in the data tracks DT1 to DT8.

In addition, although not shown, a plurality of data tracks DT corresponding to the data tracks DT1, DT2, DT3, DT4, DT5, DT6, DT7, and DT8 are formed in the data band DB1 (see FIG. 6).

It should be noted that, in the following, in a case in which the distinction is not specifically needed, the data tracks DT1, DT2, DT3, DT4, DT5, DT6, DT7, and DT8 are referred to as a "data track DT". In addition, in the following, in a case in which the distinction is not specifically needed, the data read/write elements DRW1, DRW2, DRW3, DRW4, DRW5, DRW6, DRW7, and DRW8 are referred to as the "data read/write element DRW".

Figure 8:
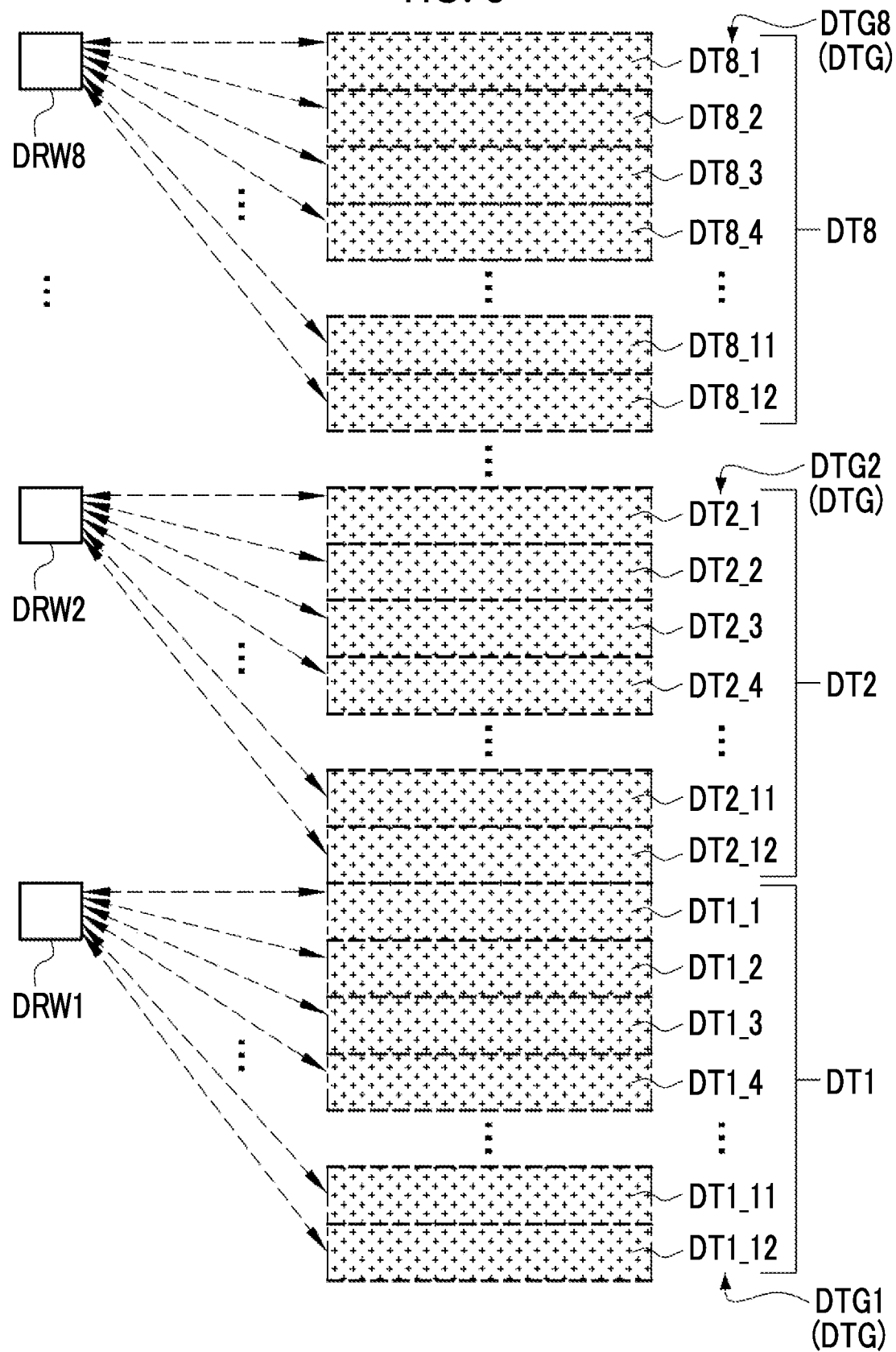
FIG. 8 is a conceptual diagram showing an example of a correspondence relationship between a data read/write element and a data track.

As shown in FIG. 8 as an example, the data track DT includes a division data track group DTG. The data tracks DT1 to DT8 correspond to the division data track groups DTG1 to DTG8. In the following, in a case in which the distinction is not specifically needed, the division data track groups DTG1 to DTG8 are referred to as the "division data track group DTG".

The division data track group DTG1 is a set of a plurality of division data tracks obtained by dividing the data track DT in the width direction WD. In the example shown in FIG. 8, as an example of the division data track group DTG1, the division data tracks DT1_1, DT1_2, DT1_3, DT1_4, ..., DT1_11, and DT1_12 obtained by dividing the data track DT into 12 equal parts in the width direction WD are shown. The data read/write element DRW1 is responsible for the magnetic processing of the division data track group DTG1. That is, the data read/write element DRW1 is responsible for recording the data in the division data tracks DT1_1, DT1_2, DT1_3, DT1_4, ..., DT1_11, and DT1_12, and reading the data from the division data tracks DT1_1, DT1_2, DT1_3, DT1_4, ..., DT1_11, and DT1_12.

Each of the data read/write elements DRW2 to DRW8 is also responsible for the magnetic processing of the division data track group DTG of the data track DT corresponding to each data read/write element DRW, similarly to the data read/write element DRW1.

The data read/write element DRW is moved to a position corresponding to one designated data track DT among the plurality of data tracks DT with the movement of the magnetic head 28 by the moving mechanism 48 (see FIG. 6) in the width direction WD. The data read/write element DRW is fixed at a position corresponding to one designated data track DT by a servo control using the servo pattern 52 (see FIGS. 6 and 7).

By the way, in recent years, research on a technology of reducing the influence of transverse dimensional stability (TDS) has been advanced. It has been known that the TDS is influenced by a temperature, humidity, a pressure at which the magnetic tape is wound around the reel, temporal deterioration, or the like, the TDS is increased in a case in which no measures are taken, and off-track (that is, misregistration of the data read/write element DRW with respect to the track in the data band DB) occurs in a scene in which the magnetic processing is performed on the data band DB.

Figure 9:
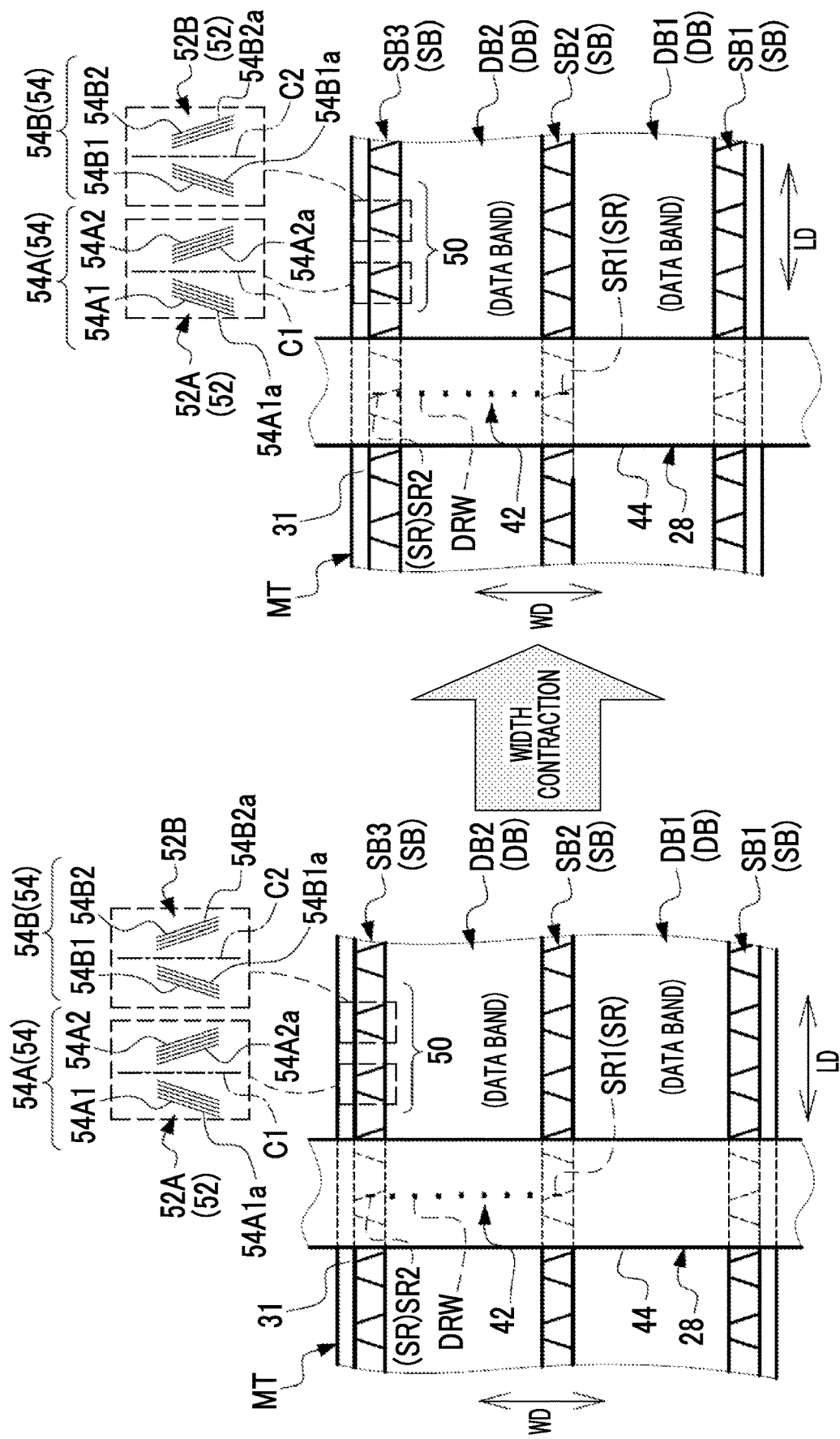
FIG. 9 is a conceptual diagram showing an example of an aspect in which the magnetic tape before and after a width of the magnetic tape contracts is observed from a front surface side of the magnetic tape.

In the example shown in FIG. 9, an aspect is shown in which the width of the magnetic tape MT contracts with the elapse of time. In this case, the off-track is realized. The off-track refers to a state in which the data read/write element DRW is not positioned on the designated division data track among the division data tracks DT1_1, DT1_2, DT1_3, DT1_4, ..., DT1_11, and DT1_12 (that is, a state in which the position of the designated division data track and the position of the data read/write element DRW deviate from each other in the width direction WD) included in the division data track group DTG.

In some cases, the width of the magnetic tape MT expands, and the off-track occurs in this case as well. That is, in a case in which the width of the magnetic tape MT contracts or expands with the elapse of time, the position of the servo reading element SR with respect to the servo pattern 52 diverges from a predetermined position (that is, a predetermined position determined in design with respect to each of the linear magnetization regions 54A1, 54A2, 54B1, and 54B2) determined in design in the width direction WD. In a case in which the position of the servo reading element SR with respect to the servo pattern 52 diverges from the predetermined position determined by the design in the width direction WD, the accuracy of the servo control is deteriorated, and the position of the track (for example, the designated division data track among the division data tracks DT1_1, DT1_2, DT1_3, DT1_4, ..., DT1_11, and DT1_12) in the data band DB and the position of the data read/write element DRW deviate from each other. Then, an originally planned track will not be subjected to the magnetic processing.

Figure 10:
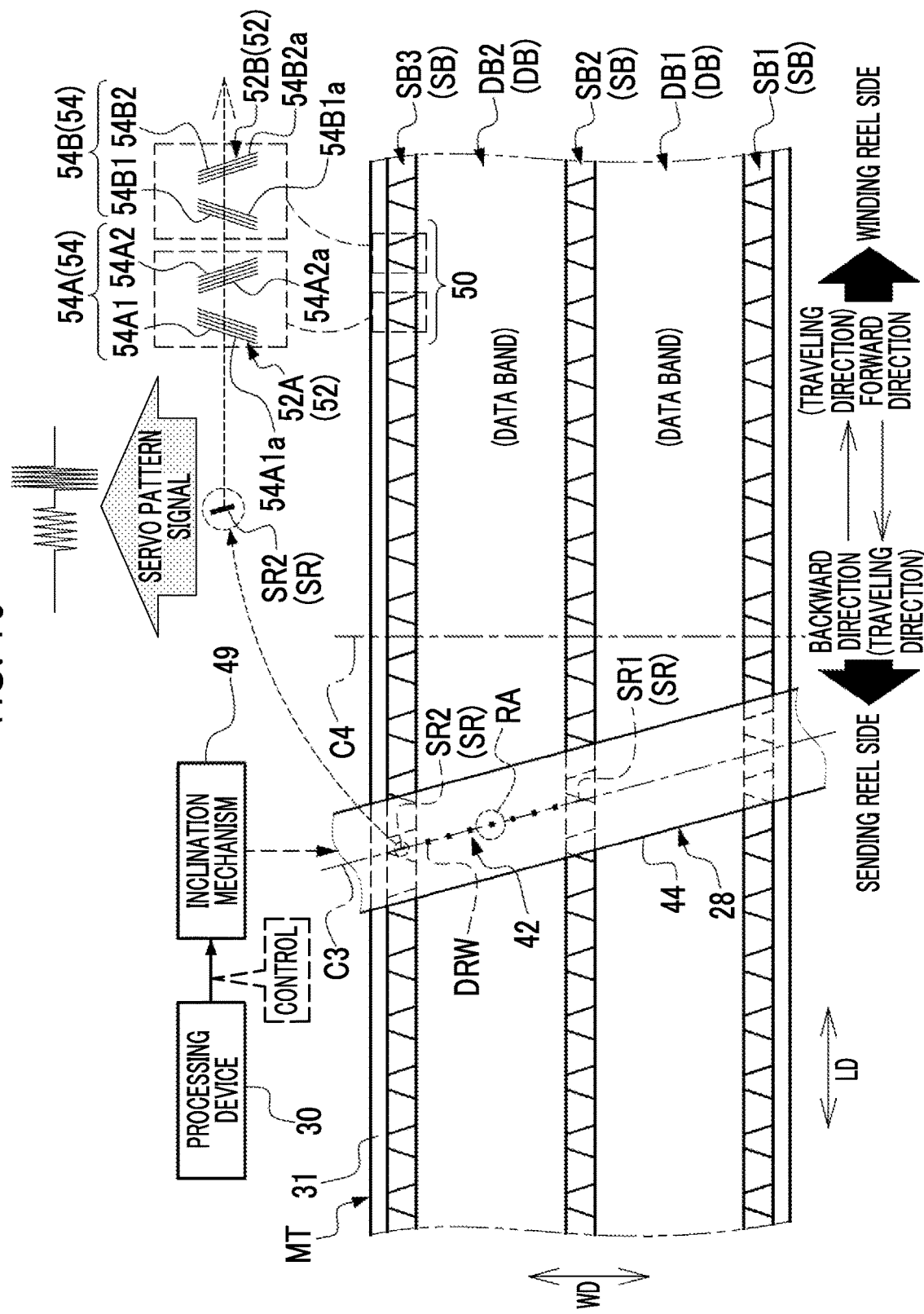
FIG. 10 is a conceptual diagram showing an example of an aspect in which a state in which the magnetic head is skewed on the magnetic tape is observed from the front surface side of the magnetic tape.

As a method of reducing the influence of the TDS, a method of adjusting the width of the magnetic tape MT by adjusting the tension applied to the magnetic tape MT is considered. However, in a case in which an amount of deformation of the magnetic tape MT in the width direction WD is too large, the off-track may not be eliminated even in a case in which the tension applied to the magnetic tape MT is adjusted. In addition, in a case in which the tension applied to the magnetic tape MT is increased, the load applied to the magnetic tape MT is also increased, which may lead to shortening the life of the magnetic tape MT. Further, in a case in which the tension applied to the magnetic tape MT is too weak, the contact state between the magnetic head 28 and the magnetic tape MT is unstable, and it is difficult for the magnetic head 28 to perform the magnetic processing on the magnetic tape MT. As a method of reducing the influence of the TDS other than the method of adjusting the tension applied to the magnetic tape MT, as shown in FIG. 10 as an example, a method of holding the position of the servo reading element SR with respect to the servo pattern 52 at the predetermined position determined in design by skewing the magnetic head 28 on the magnetic tape MT is known.

The magnetic head 28 comprises a rotation axis RA. The rotation axis RA is provided at a position corresponding to a center portion of the magnetic element unit 42 provided in the magnetic head 28 in a plan view. The magnetic head 28 is rotatably held by the inclination mechanism 49 via the rotation axis RA. It should be noted that, in the present embodiment, the operation of inclining the magnetic head 28 with respect to the width direction WD by rotating the magnetic head 28 on the front surface 31 with the rotation axis RA as a central axis along the front surface 31 is referred to as "skew".

An imaginary straight line C3 which is an imaginary center line is provided in the magnetic head 28. The imaginary straight line C3 is a straight line that passes through the rotation axis RA and extends in the longitudinal direction of the magnetic head 28 in a plan view (that is, the direction in which the plurality of data read/write elements DRW are arranged). The magnetic head 28 is disposed in an inclined posture with respect to the width direction WD along the front surface 31 (in other words, a posture in which the imaginary straight line C3 is inclined with respect to the imaginary straight line C4 along the front surface 31). In the example shown in FIG. 10, the magnetic head 28 is held by the inclination mechanism 49 to have a posture in which the imaginary straight line C3 is inclined to the longitudinal direction LD side of the magnetic tape MT with respect to an imaginary straight line C4 which is an imaginary straight line along the width direction WD. In the example shown in FIG. 10, the magnetic head 28 is held by the inclination mechanism 49 in a posture in which the imaginary straight line C3 is inclined toward the sending reel 22 side with respect to the imaginary straight line C4 (that is, a posture inclined counterclockwise as viewed from a paper surface side of FIG. 10). An angle formed by the imaginary straight line C3 and the imaginary straight line C4 corresponds to an angle at which the magnetic head 28 is inclined with respect to the width direction WD by rotating the magnetic head 28 on the front surface 31 with the rotation axis RA as a central axis along the front surface 31. It should be noted that, in the following, the angle formed by the imaginary straight line C3 and the imaginary straight line C4 is also referred to as a "skew angle" or a "skew angle of the magnetic head 28". The skew angle is an angle defined such that the counterclockwise direction as viewed from the paper surface side of FIG. 10 is positive, and the clockwise direction as viewed from the paper surface side of FIG. 10 is negative.

The inclination mechanism 49 receives the power from the inclination actuator 49A (see FIG. 5) to rotate the magnetic head 28 around the rotation axis RA on the front surface 31 of the magnetic tape MT. The inclination mechanism 49 rotates, under the control of the processing device 30, the magnetic head 28 around the rotation axis RA on the front surface 31 of the magnetic tape MT to change the direction of the inclination of the imaginary straight line C3 with respect to the imaginary straight line C4 (that is, azimuth) and the inclined angle. The change the direction of the inclination and the inclined angle of the imaginary straight line C3 with respect to the imaginary straight line C4 is realized by changing an angle at which the magnetic head 28 is inclined with respect to the width direction WD along the front surface 31, that is, the skew angle of the magnetic head 28. In the present embodiment, the direction of the inclination and the inclined angle of the imaginary straight line C3 with respect to the imaginary straight line C4 are represented by the skew angle of the magnetic head 28.

By changing the direction of the inclination of the imaginary straight line C3 with respect to the imaginary straight line C4 and the inclined angle, that is, the skew angle in accordance with the temperature, the humidity, the pressure at which the magnetic tape MT is wound around the reel, the temporal deterioration, and the like, or expansion and contraction of the magnetic tape MT in the width direction WD due to these, the position of the servo reading element SR with respect to the servo pattern 52 is held at the predetermined position determined in design. In this case, the on-track is realized. The on-track refers to a state in which the data read/write element DRW is positioned on the designated division data track among the division data tracks DT1_1, DT1_2, DT1_3, DT1_4, ..., DT1_11, and DT1_12 (that is, a state in which the position of the designated division data track and the position of the data read/write element DRW match in the width direction WD) included in the division data track group DTG.

The servo reading element SR reads the servo pattern 52 and outputs the servo pattern signal indicating a read result. The servo reading element SR is formed in a straight line along the imaginary straight line C3. Therefore, in a case in which the servo pattern 52A is read by the servo reading element SR, in the linear magnetization region pair 54A, an angle formed by the linear magnetization region 54A1 and the servo reading element SR and an angle formed by the linear magnetization region 54A2 and the servo reading element SR are different. In a case in which the angles are different in this way, a variation due to an azimuth loss (for example, variation in signal level and waveform distortion) occurs between the servo pattern signal derived from the linear magnetization region 54A1 (that is, the servo pattern signal obtained by reading the linear magnetization region 54A1 by the servo reading element SR) and the servo pattern signal derived from the linear magnetization region 54A2 (that is, the servo pattern signal obtained by reading the linear magnetization region 54A2 by the servo reading element SR).

In the example shown in FIG. 10, since the angle formed by the servo reading element SR and the linear magnetization region 54A1 is larger than the angle formed by the servo reading element SR and the linear magnetization region 54A2, the output of the servo pattern signal is small, and the waveform also spreads, so that the variation occurs in the servo pattern signal obtained by being read by the servo reading element SR across the servo band SB in a state in which the magnetic tape MT travels. In addition, also in a case in which the servo pattern 52B is read by the servo reading element SR, the variation due to the azimuth loss occurs between the servo pattern signal derived from the linear magnetization region 54B1 and the servo pattern signal derived from the linear magnetization region 54B2.

Details will be described below, but in the present embodiment, a method of detecting the servo pattern signal using an autocorrelation coefficient is used as a method of detecting the servo pattern signal in which the variation occurs due to the azimuth loss as described above (see FIG. 12).

Next, an example of contents of specific processing performed by the processing device 30 will be described with reference to FIGS. 11 to 21.

Figure 11:
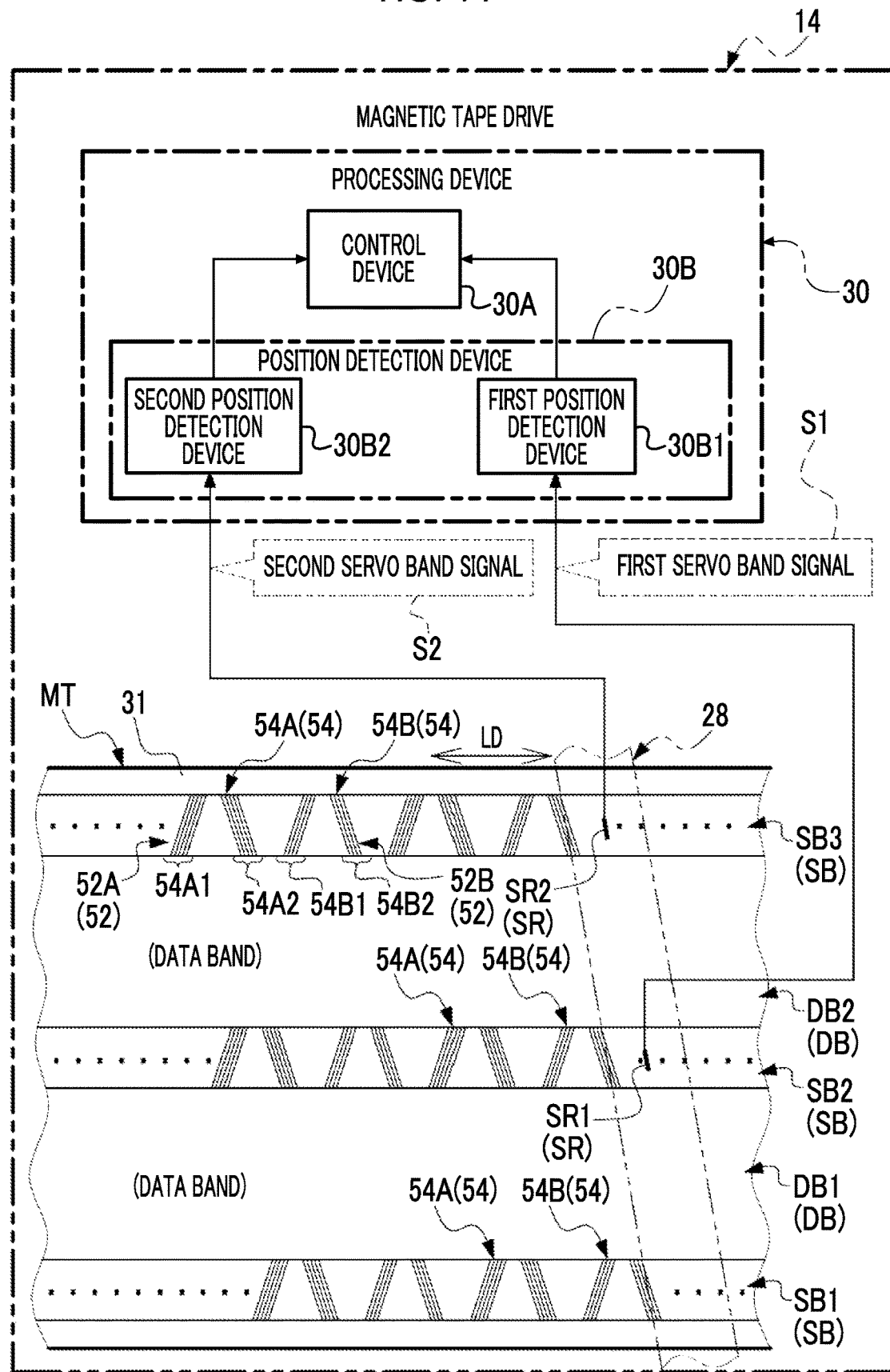
FIG. 11 is a conceptual diagram showing an example of a function of a processing device provided in the magnetic tape drive.

As an example, as shown in FIG. 11, the processing device 30 includes a control device 30A and a position detection device 30B. The position detection device 30B includes a first position detection device 30B1 and a second position detection device 30B2. The position detection device 30B acquires a servo band signal that is a result of reading the servo band SB by the servo reading element SR, and detects the position of the magnetic head 28 on the magnetic tape MT based on the acquired servo band signal. The servo band signal includes a signal (for example, noise) unnecessary for the servo control in addition to the servo pattern signal which is the result of reading the servo pattern 52.

The position detection device 30B acquires the servo band signal from the magnetic head 28. The servo band signal is classified into a first servo band signal S1 and a second servo band signal S2. The first servo band signal S1 is the signal indicating a result of reading the servo band SB by the servo reading element SR1, and the second servo band signal S2 is the signal indicating a result of reading the servo band SB by the servo reading element SR2. The first position detection device 30B1 acquires the first servo band signal S1, and the second position detection device 30B2 acquires the second servo band signal S2. In the example shown in FIG. 11, the signal obtained by reading the servo band SB2 by the servo reading element SR1 is shown as an example of the first servo band signal S1, and the signal obtained by reading the servo band SB3 by the servo reading element SR2 is shown as an example of the second servo band signal S2. It should be noted that, in the present embodiment, for convenience of description, in a case in which the distinction is not specifically needed, the first servo band signal S1 and the second servo band signal S2 will be referred to as a "servo band signal" without reference numerals.

The first position detection device 30B1 detects a position of the servo reading element SR1 with respect to the servo band SB2 based on the first servo band signal S1. The second position detection device 30B2 detects a position of the servo reading element SR2 with respect to the servo band SB3 based on the second servo band signal S2.

The control device 30A performs various controls based on a position detection result by the first position detection device 30B1 (that is, a result of detecting the position by the first position detection device 30B1) and a position detection result by the second position detection device 30B2 (that is, a result of detecting the position by the second position detection device 30B2). Here, the various controls refer to, for example, the servo control and a skew angle control. The skew angle control refers to control of changing the skew angle. In the present embodiment, a tracking control is realized by the servo control and the skew angle control. The tracking control refers to a control of adjusting the position of the magnetic head 28 to be on-track. It should be noted that the tracking control may be realized by the servo control, the skew angle control, and a tension control. The tension control refers to a control of the tension applied to the magnetic tape MT (for example, the tension for reducing the influence of the TDS).

Next, a specific processing content of the position detection device 30B will be described. It should be noted that since the configuration of the second position detection device 30B2 and the configuration of the first position detection device 30B1 are the same, in the following, the processing content of the position detection device 30B is described with a specific processing content of the first position detection device 30B1 as an example, and the description of a specific processing content of the second position detection device 30B2 will be omitted.

In addition, in the following, for convenience of description, the servo pattern signal derived from the linear magnetization region 54A1 or 54B1 is also referred to as a "first linear magnetization region signal", and the servo pattern signal derived from the linear magnetization region 54A2 or 54B2 is also referred to as a "second linear magnetization region signal". In addition, in the present embodiment, the servo pattern signal is a signal composed of the first linear magnetization region signal and the second linear magnetization region signal. Therefore, the detection of the first linear magnetization region signal and the second linear magnetization region signal by the position detection device 30B means the detection of the servo pattern signal by the position detection device 30B.

Figure 12:
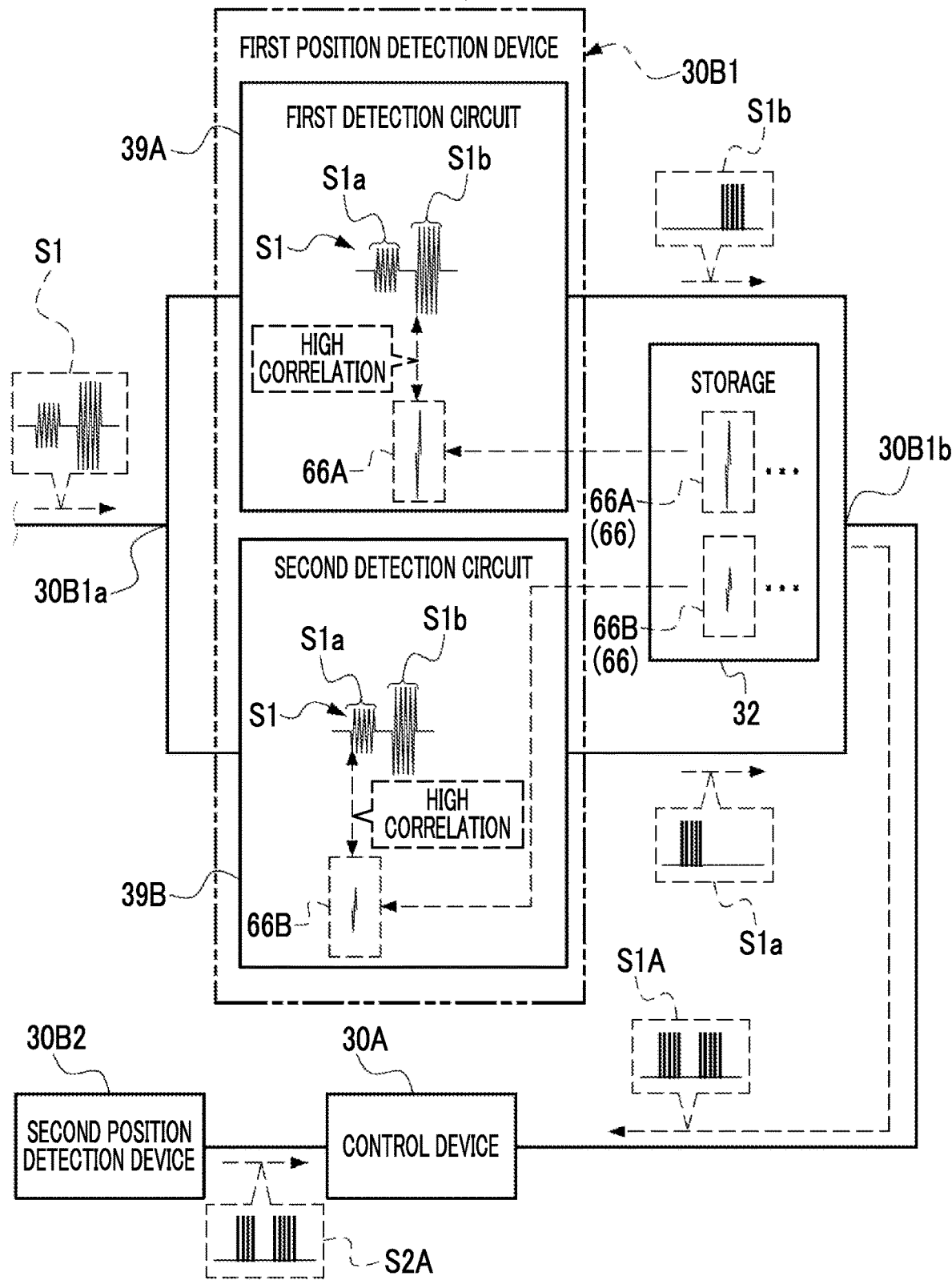
FIG. 12 is a conceptual diagram showing an example of processing contents of a position detection device provided in the processing device provided in the magnetic tape drive.

As an example, as shown in FIG. 12, the first position detection device 30B1 includes a first detection circuit 39A and a second detection circuit 39B. The first detection circuit 39A and the second detection circuit 39B are connected in parallel and comprise an input terminal 30B1a and an output terminal 30B1b common to each other. In the example shown in FIG. 12, an aspect example is shown in which the first servo band signal S1 is input to the input terminal 30B1a. The first servo band signal S1 includes a first linear magnetization region signal S1a and a second linear magnetization region signal S1b. The first linear magnetization region signal S1a and the second linear magnetization region signal S1b are the servo pattern signals (that is, analog servo pattern signals) which are the results of read by the servo reading element SR1 (see FIG. 11). The same applied to the second servo band signal S2 (see FIG. 11) as in the first servo band signal S1. That is, the servo pattern signal includes the first linear magnetization region signal S1a and the second linear magnetization region signal S1b.

One ideal waveform signal 66 is stored in advance in the storage 32, for each frame 50. The ideal waveform signal 66 is, for example, individually associated with each of all the frames 50 from the beginning to the end of the magnetic tape MT. In a case in which the servo pattern 52 included in each frame 50 is read by the servo reading element SR from the beginning to the end of the magnetic tape MT, the first position detection device 30B1 acquires the ideal waveform signal 66 corresponding to each frame 50 from the storage 32 for each time the servo pattern 52 included in each frame 50 is read by the servo reading element SR (for example, in synchronization with a timing at which reading of the servo pattern 52 by the servo reading element SR is started), and uses the acquired ideal waveform signal 66 for the comparison with the first servo band signal S1.

The ideal waveform signal 66 is a signal indicating the ideal waveform of the servo pattern signal (that is, the analog servo pattern signal) which is a result of reading the servo pattern 52 (see FIG. 11) recorded in the servo band SB of the magnetic tape MT by the servo reading element SR. The ideal waveform signal 66 can be said to be a sample signal compared with the first servo band signal S1.

The ideal waveform signal 66 is classified into a first ideal waveform signal 66A and a second ideal waveform signal 66B. The first ideal waveform signal 66A corresponds to a signal derived from the linear magnetization region 54A2 or 54B2, that is, the second linear magnetization region signal S1b, and is a signal indicating the ideal waveform of the second linear magnetization region signal S1b. The second ideal waveform signal 66B corresponds to a signal derived from the linear magnetization region 54A1 or 54B1, that is, the first linear magnetization region signal S1a, and is a signal indicating the ideal waveform of the first linear magnetization region signal S1a. More specifically, for example, the first ideal waveform signal 66A is a signal indicating a single ideal waveform (that is, for one wavelength) included in the second linear magnetization region signal S1b (for example, an ideal signal which is a result of reading one of an ideal magnetization straight lines included in the servo pattern 52 by the servo reading element SR). In addition, for example, the second ideal waveform signal 66B is a signal indicating a single ideal waveform (that is, one wavelength) included in the first linear magnetization region signal S1a (for example, an ideal signal which is a result of reading one of an ideal magnetization straight lines included in the servo pattern 52 by the servo reading element SR).

An ideal waveform indicated by a first ideal waveform signal 66A is a waveform determined in accordance with an orientation of the magnetic head 28 on the magnetic tape MT. A relative positional relationship between the holder 44 (see FIG. 10) of the magnetic head 28 and the servo reading element SR is fixed. Therefore, the ideal waveform indicated by the first ideal waveform signal 66A can be said to be a waveform determined in accordance with the orientation of the servo reading element SR on the magnetic tape MT. For example, the ideal waveform indicated by the first ideal waveform signal 66A is a waveform determined in accordance with a geometrical characteristic of the linear magnetization region 54A2 of the servo pattern 52A (for example, a geometrical characteristic of the magnetization straight line 54A2a) and the orientation of the magnetic head 28 on the magnetic tape MT. As described above, since the relative positional relationship between the holder 44 (see FIG. 10) of the magnetic head 28 and the servo reading element SR is fixed, the ideal waveform indicated by the first ideal waveform signal 66A can be said to be a waveform determined in accordance with the geometrical characteristic of the linear magnetization region 54A2 of the servo pattern 52A (for example, geometrical characteristic of the magnetization straight line 54A2a) and the orientation of the servo reading element SR on the magnetic tape MT. Here, the orientation of the magnetic head 28 on the magnetic tape MT refers to, for example, an angle formed by the linear magnetization region 54A2 and the magnetic head 28 on the magnetic tape MT. In addition, the orientation of the servo reading element SR on the magnetic tape MT refers to, for example, an angle formed by the linear magnetization region 54A2 and the servo reading element SR on the magnetic tape MT. It should be noted that the ideal waveform indicated by the first ideal waveform signal 66A may be determined by also adding the characteristics of the servo reading element SR itself (material, size, shape, and/or use history), the characteristics of the magnetic tape MT (material and/or use history), and/or the use environment of the magnetic head 28 in addition to the elements described above.

Similarly to the ideal waveform indicated by the first ideal waveform signal 66A, an ideal waveform indicated by a second ideal waveform signal 66B is also a waveform determined in accordance with the orientation of the magnetic head 28 on the magnetic tape MT, that is, a waveform determined in accordance with the orientation of the servo reading element SR on the magnetic tape MT. For example, the ideal waveform indicated by the second ideal waveform signal 66B is a waveform determined in accordance with the geometrical characteristic of the linear magnetization region 54A1 of the servo pattern 52A (for example, geometrical characteristic of the magnetization straight line 54A 1a) and the orientation of the magnetic head 28 on the magnetic tape MT, that is, a waveform determined in accordance with the geometrical characteristic of the linear magnetization region 54A1 of the servo pattern 52A (for example, geometrical characteristic of the magnetization straight line 54A1a) and the orientation of the servo reading element SR on the magnetic tape MT. Here, the orientation of the magnetic head 28 on the magnetic tape MT refers to, for example, an angle formed by the linear magnetization region 54A1 and the magnetic head 28 on the magnetic tape MT. In addition, the orientation of the servo reading element SR on the magnetic tape MT refers to, for example, an angle formed by the linear magnetization region 54A1 and the servo reading element SR on the magnetic tape MT. It should be noted that, similarly to the ideal waveform indicated by the first ideal waveform signal 66A the ideal waveform indicated by the second ideal waveform signal 66B may be determined by also adding the characteristics of the servo reading element SR itself (material, size, shape, and/or use history), the characteristics of the magnetic tape MT (material and/or use history), and/or the use environment of the magnetic head 28 in addition to the elements described above.

The first position detection device 30B1 acquires the first servo band signal S1 and compares the acquired first servo band signal S1 with the ideal waveform signal 66 to detect a servo pattern signal S1A. In the example shown in FIG. 12, the first position detection device 30B1 detects the servo pattern signal S1A by using the first detection circuit 39A and the second detection circuit 39B.

The first servo band signal S1 is input to the first detection circuit 39A via the input terminal 30B1a. The first detection circuit 39A detects the second linear magnetization region signal S1b from the input first servo band signal S1 by using the autocorrelation coefficient.

The autocorrelation coefficient used by the first detection circuit 39A is a coefficient indicating a degree of correlation between the first servo band signal S1 and the first ideal waveform signal 66A. The first detection circuit 39A acquires the first ideal waveform signal 66A from the storage 32 to compare the acquired first ideal waveform signal 66A with the first servo band signal S1. Moreover, the first detection circuit 39A calculates the autocorrelation coefficient based on the comparison result. The first detection circuit 39A detects a position at which the correlation between the first servo band signal S1 and the first ideal waveform signal 66A is high (for example, position at which the first servo band signal S1 and the first ideal waveform signal 66A match) on the servo band SB (for example, servo band SB2 shown in FIG. 9) in accordance with the autocorrelation coefficient.

On the other hand, the first servo band signal S1 is also input to the second detection circuit 39B via the input terminal 30B1a. The second detection circuit 39B detects the first linear magnetization region signal S1a from the input first servo band signal S1 by using the autocorrelation coefficient.

The autocorrelation coefficient used by the second detection circuit 39B is a coefficient indicating a degree of correlation between the first servo band signal S1 and the second ideal waveform signal 66B. The second detection circuit 39B acquires the second ideal waveform signal 66B from the storage 32 to compare the acquired second ideal waveform signal 66B with the first servo band signal S1. Moreover, the second detection circuit 39B calculates the autocorrelation coefficient based on the comparison result. The second detection circuit 39B detects a position at which the correlation between the first servo band signal S1 and the second ideal waveform signal 66B is high (for example, position at which the first servo band signal S1 and the second ideal waveform signal 66B match) on the servo band SB (for example, servo band SB2 shown in FIG. 9) in accordance with the autocorrelation coefficient.

The first position detection device 30B1 detects the servo pattern signal S1A based on a detection result by the first detection circuit 39A and a detection result by the second detection circuit 39B. The first position detection device 30B1 outputs the servo pattern signal S1A from the output terminal 30B1b to the control device 30A. The servo pattern signal S1A is a signal indicating a logical sum of the second linear magnetization region signal S1b detected by the first detection circuit 39A and the first linear magnetization region signal S1a detected by the second detection circuit 39B (for example, digital signal).

The position of the servo reading element SR with respect to the servo band SB is detected based on, for example, an interval between the servo patterns 52A and 52B in the longitudinal direction LD. For example, the interval between the servo patterns 52A and 52B in the longitudinal direction LD is detected in accordance with the autocorrelation coefficient. In a case in which the servo reading element SR is positioned on the upper side of the servo pattern 52 (that is, the upper side in the front view of the paper in FIG. 11), an interval between the linear magnetization region 54A1 and the linear magnetization region 54A2 is narrowed, and an interval between the linear magnetization region 54B1 and the linear magnetization region 54B2 is also narrowed. On the other hand, in a case in which the servo reading element SR is positioned on the lower side of the servo pattern 52 (that is, the lower side in the front view of the paper in FIG. 11), the interval between the linear magnetization region 54A1 and the linear magnetization region 54A2 is widened, and the interval between the linear magnetization region 54B1 and the linear magnetization region 54B2 is also widened. As described above, the first position detection device 30B1 detects the position of the servo reading element SR with respect to the servo band SB by using the interval between the linear magnetization region 54A1 and the linear magnetization region 54A2 and the interval between the linear magnetization region 54B1 and the linear magnetization region 54B2 detected in accordance with the autocorrelation coefficient.

In the example shown in FIG. 12, the form example has been described in which the first position detection device 30B1 detects the servo pattern signal S1A by comparing the first servo band signal S1 with the ideal waveform signal 66, similarly, the second position detection device 30B2 also detects the servo pattern signal S2A by comparing the second servo band signal S2 with the ideal waveform signal 66, and outputs the detected servo pattern signal S2A to the control device 30A.

It should be noted that, in the present embodiment, the form example has been described in which the first linear magnetization region signal S1$a$ and the second linear magnetization region signal S1$b$ are detected by using the autocorrelation coefficient, but the technology of the present disclosure is not limited to this, and the first linear magnetization region signal S1$a$ and the second linear magnetization region signal S1$b$ may be detected by using a plurality of threshold values. Examples of the plurality of threshold values include a first threshold value and a second threshold value. A magnitude relationship between the first threshold value and the second threshold value is "first threshold value >second threshold value". The first threshold value is a value derived in advance based on an amplitude expected as the amplitude of the waveform of the second linear magnetization region signal S1$b$, and is used to detect the second linear magnetization region signal S1$b$. The second threshold value is a value derived in advance based on an amplitude expected as the amplitude of the waveform of the first linear magnetization region signal S1$a$ and the amplitude expected as the amplitude of the waveform of the second linear magnetization region signal S1$b$. The first threshold value and the second threshold value are used to detect the first linear magnetization region signal S1$a$.

Figure 13:
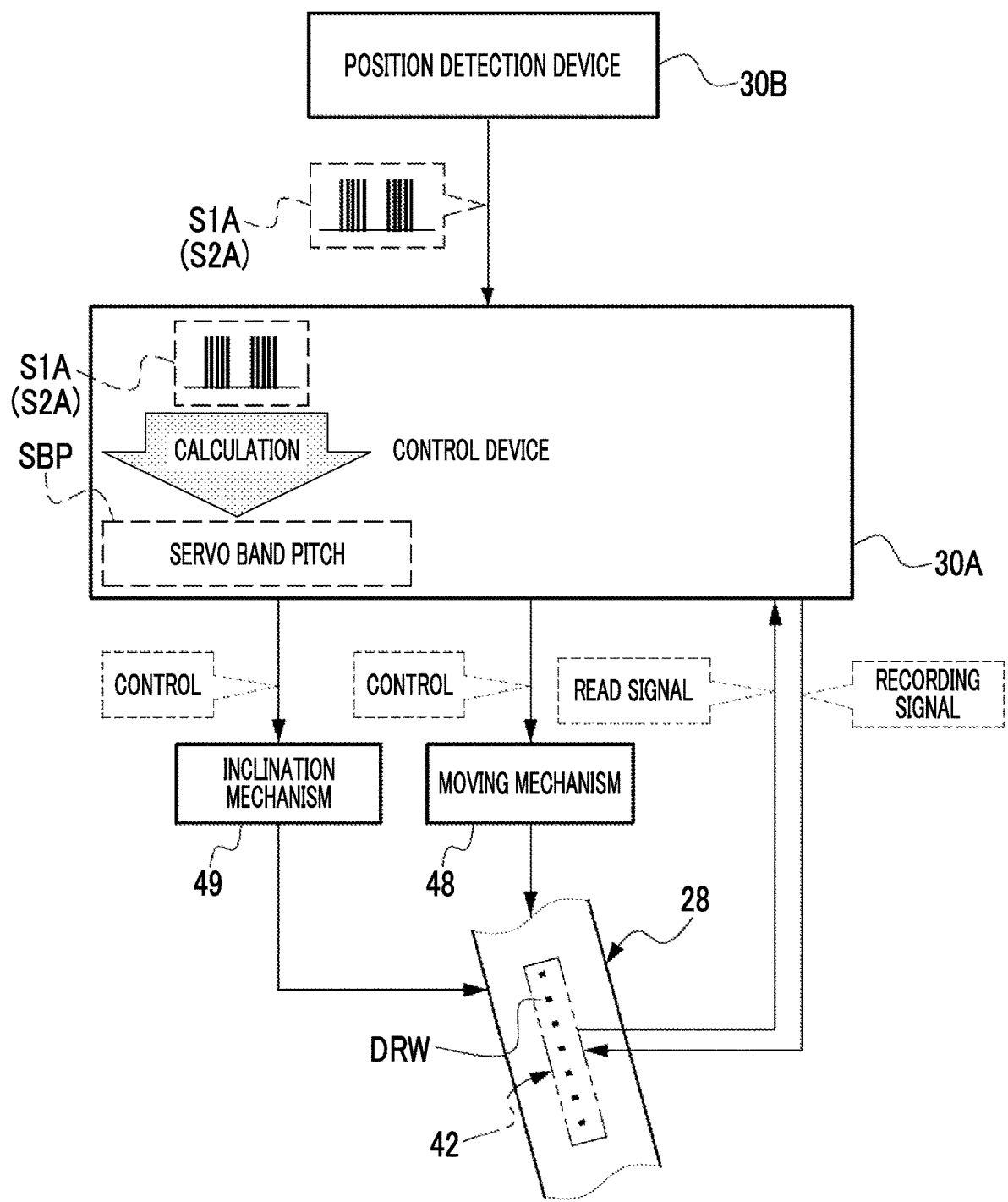
FIG. 13 is a conceptual diagram showing an example of processing contents of a control device provided in the processing device provided in the magnetic tape drive.

As shown in FIG. 13 as an example, the control device 30A operates the moving mechanism 48 based on the position detection results (that is, the servo pattern signals S1A and S2A) in the position detection device 30B to adjust the position of the magnetic head 28. In addition, the control device 30A causes the magnetic element unit 42 to perform the magnetic processing on the data band DB of the magnetic tape MT. That is, the control device 30A acquires a read signal (that is, data read from the data band DB of the magnetic tape MT by the magnetic element unit 42) from the magnetic element unit 42, or supplies a recording signal to the magnetic element unit 42 to record the data in response to the recording signal in the data band DB of the magnetic tape MT.

In addition, in order to reduce the influence of the TDS, the control device 30A calculates a servo band pitch SBP from the position detection results (that is, the servo pattern signals S1A and S2A) by the position detection device 30B, and adjusts the skew angle by operating the inclination mechanism 49 in accordance with the calculated servo band pitch SBP. The servo band pitch SBP is a distance between adjacent servo bands SB (see FIG. 11) in the width direction WD (see FIG. 11) (in the example shown in FIG. 11, the distance between the servo band SB2 and the servo band SB3 in the width direction WD). The servo band pitch SBP is an example of "width correspondence information" according to the technology of the present disclosure.

It should be noted that the control device 30A may perform the tension control in accordance with the calculated servo band pitch SBP. The tension control is realized by adjusting the rotation speed, rotation torque, and the like of each of the sending motor 36 (see FIG. 3) and the winding motor 40 (see FIG. 3).

In the present embodiment, the servo band pitch SBP is described as an example of a "width correspondence information" according to the technology of the present disclosure, but this is merely an example, and the technology of the present disclosure is established even in a case in which the width of the magnetic tape MT is used instead of the servo band pitch SBP as a "width correspondence information" according to the technology of the present disclosure.

Figure 14:
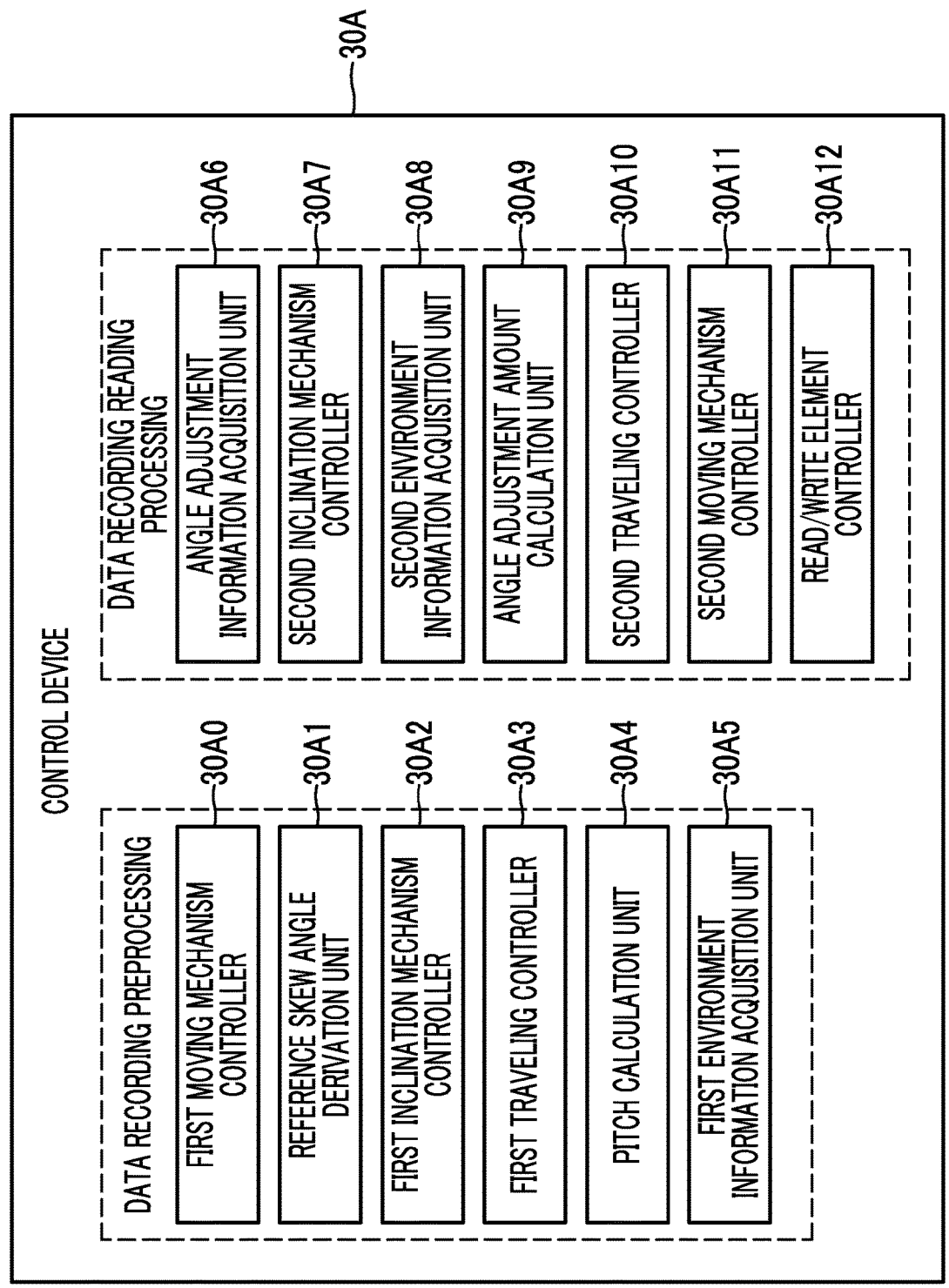
FIG. 14 is a conceptual diagram showing an example of a function of the control device.

As shown in FIG. 14 as an example, the control device 30A performs data recording preprocessing and data recording reading processing. The data recording preprocessing is processing that is performed in a stage before the data is recorded in the data band DB of the magnetic tape MT by the magnetic head 28. The data recording reading processing is processing that is performed in a case in which the magnetic processing is performed by the magnetic head 28 on the magnetic tape MT (that is, a timing at which the magnetic processing is performed).

The control device 30A includes a first moving mechanism controller 30A0, a reference skew angle derivation unit 30A1, a first inclination mechanism controller 30A2, a first traveling controller 30A3, a pitch calculation unit 30A4, and a first environment information acquisition unit 30A5. The data recording preprocessing is realized by the reference skew angle derivation unit 30A1, the first inclination mechanism controller 30A2, the first traveling controller 30A3, the pitch calculation unit 30A4, and the first environment information acquisition unit 30A5.

The control device 30A includes an angle adjustment information acquisition unit 30A6, a second inclination mechanism controller 30A7, a second environment information acquisition unit 30A8, an angle adjustment amount calculation unit 30A9, a second traveling controller 30A10, a second moving mechanism controller 30A11, and a read/write element controller 30A12. The data recording reading processing is realized by the angle adjustment information acquisition unit 30A6, the second inclination mechanism controller 30A7, the second environment information acquisition unit 30A8, the angle adjustment amount calculation unit 30A9, the second traveling controller 30A10, the second moving mechanism controller 30A11, and the read/write element controller 30A12.

Here, an example of the data recording preprocessing will be described with reference to FIGS. 15 and 16.

Figure 15:
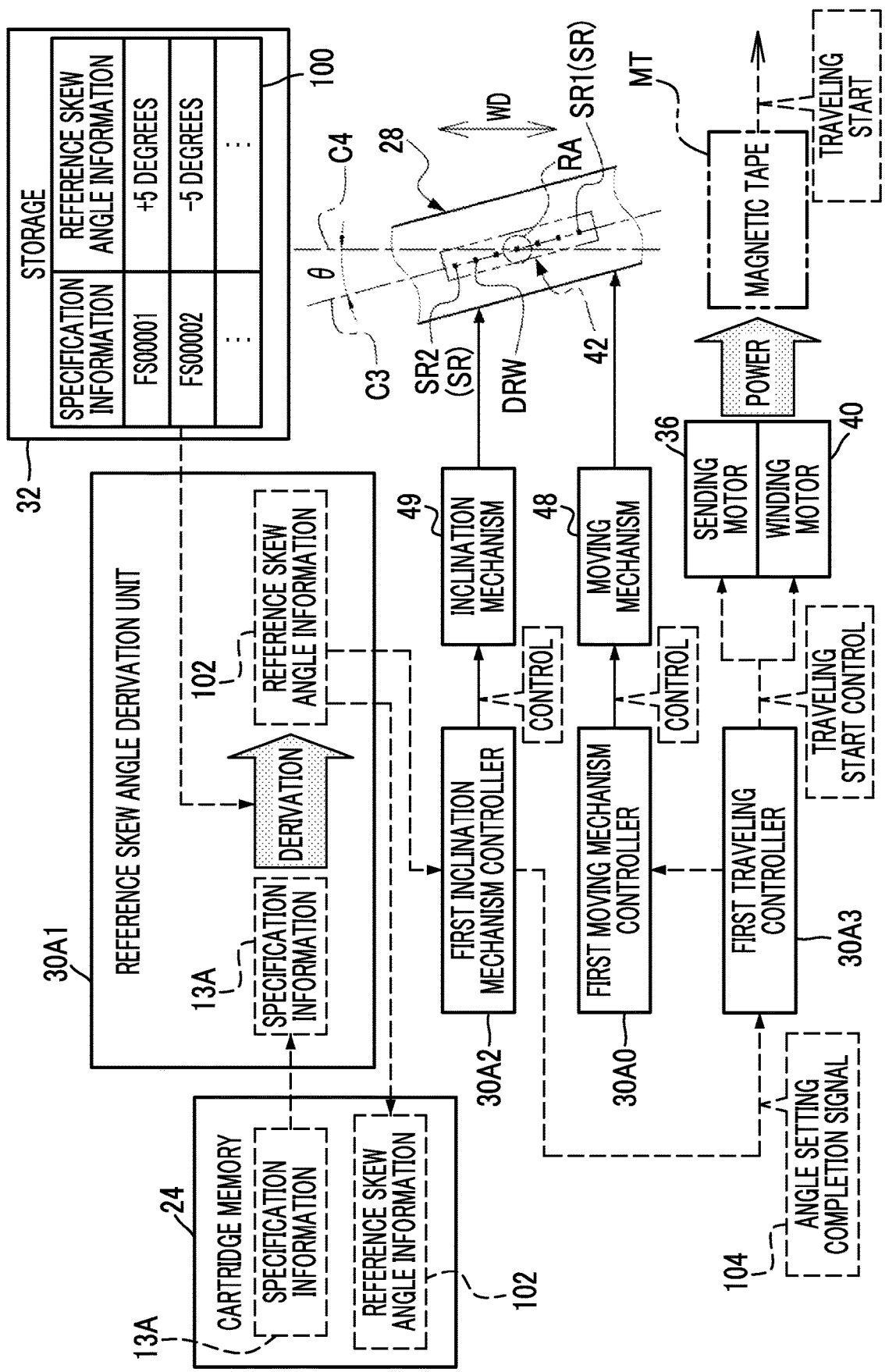
FIG. 15 is a conceptual diagram showing an example of processing contents of a reference skew angle derivation unit, a first inclination mechanism controller, and a first traveling controller.

As shown in FIG. 15 as an example, the reference skew angle derivation unit 30A1 acquires the specification information 13A from the cartridge memory 24 and derives reference skew angle information 102 by using a table 100. The reference skew angle information 102 is an example of "angle information" according to the technology of the present disclosure. The reference skew angle information 102 refers to information that indicates a reference skew angle. The reference skew angle refers to a skew angle used in a case in which the traveling of the magnetic tape MT is started in the data recording preprocessing. The table 100 is stored in the storage 32. The table 100 is information in which a plurality of specification information 13A and a plurality of reference skew angle information 102 are associated with each other on a one-to-one basis.

The reference skew angle derivation unit 30A1 derives, from the table 100, the reference skew angle information 102 corresponding to the specification information 13A acquired from the cartridge memory 24, and stores the derived reference skew angle information 102 in the cartridge memory 24. It should be noted that, here, the form example is described in which the reference skew angle information 102 is stored in the cartridge memory 24, but this is merely an example. For example, the reference skew angle information 102 does not have to be stored in the cartridge memory 24, and the reference skew angle information 102 corresponding to the specification information 13A may be derived from the table 100 each time a predetermined timing arrives (for example, each time the data recording preprocessing is performed).

By controlling the inclination mechanism 49 in accordance with the reference skew angle information 102 derived by the reference skew angle derivation unit 30A1, the first inclination mechanism controller 30A2 sets a skew angle θ of the magnetic head 28 to the reference skew angle indicated by the reference skew angle information 102 derived by the reference skew angle derivation unit 30A1.

In a case in which the skew angle θ of the magnetic head 28 is set to the reference skew angle, the first inclination mechanism controller 30A2 outputs an angle setting completion signal 104 to the first traveling controller 30A3. The angle setting completion signal 104 refers to a signal indicating that the skew angle θ is set to the reference skew angle. The first traveling controller 30A3 performs a traveling start control on the condition that the angle setting completion signal 104 is input. The traveling start control refers to a control of starting traveling (for example, traveling in the forward direction) of the magnetic tape MT via the sending motor 36 and the winding motor 40. That is, in a case in which the angle setting completion signal 104 is input, the first traveling controller 30A3 applies the power to the magnetic tape MT from the sending motor 36 and the winding motor 40 to start the traveling of the magnetic tape MT. In a case in which the traveling start control is started by the first traveling controller 30A3, the first moving mechanism controller 30A0 controls the moving mechanism 48 to move the magnetic head 28 in the width direction WD such that the servo reading element SR of the magnetic head 28 is positioned at a specific position (for example, a center portion of the servo pattern 52 in the width direction WD) of the servo pattern 52 (see FIG. 10).

Figure 16:
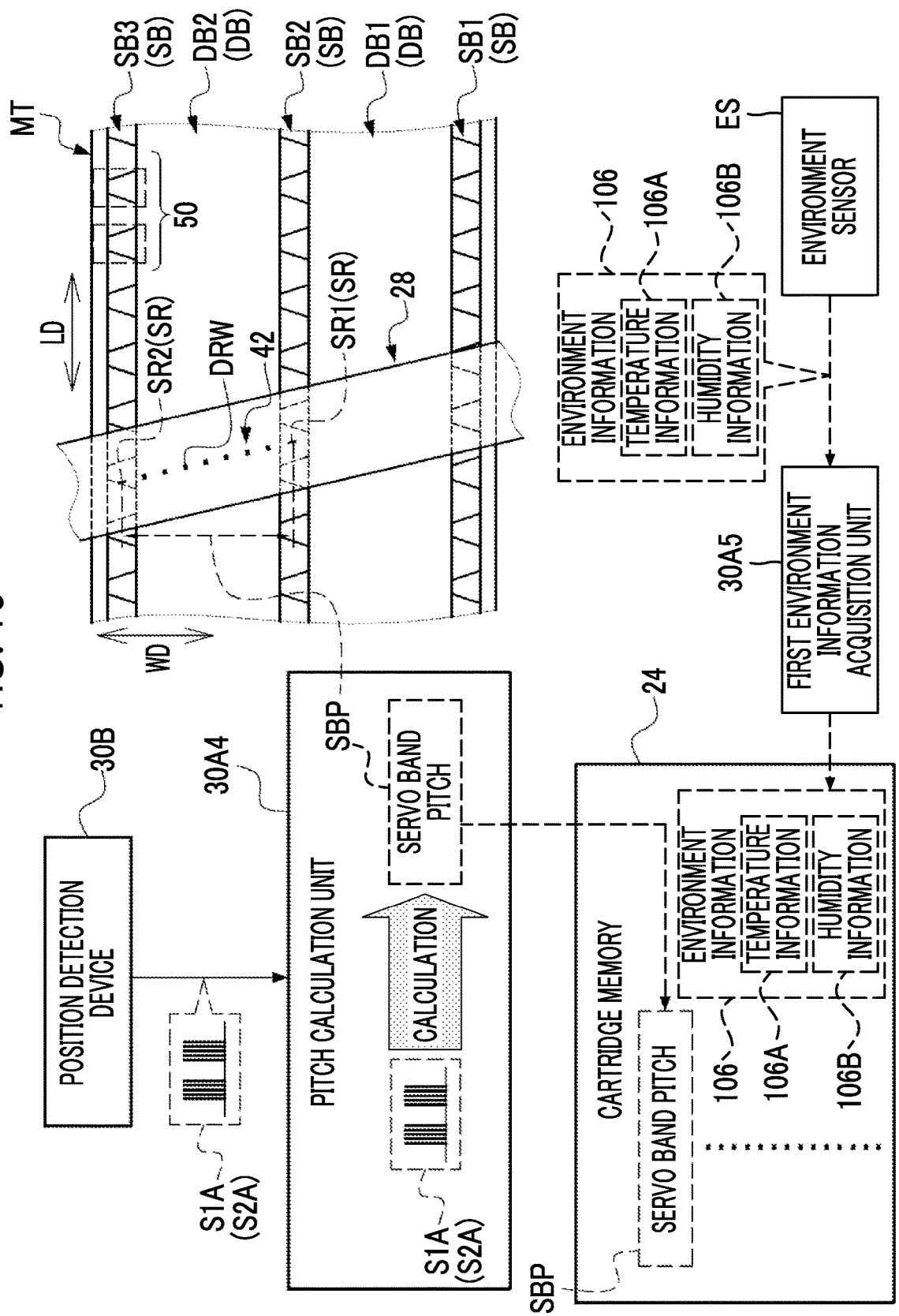
FIG. 16 is a conceptual diagram showing an example of processing contents of a pitch calculation unit.

As shown in FIG. 16 as an example, the pitch calculation unit 30A4 calculates the servo band pitch SBP in units of the frame 50 from the position detection results (that is, the servo pattern signals S1A and S2A) by the position detection device 30B. Each time the pitch calculation unit 30A4 calculates the servo band pitch SBP, the pitch calculation unit 30A4 stores the calculated servo band pitch SBP in the cartridge memory 24 in time series.

The servo band pitch SBP stored in the cartridge memory 24 is information acquired in a state in which the magnetic tape MT is made to travel before the data is recorded in the data band DB. The servo band pitch SBP is acquired at a plurality of points in the total length direction of the magnetic tape MT. That is, the servo band pitch SBP is calculated by the pitch calculation unit 30A4 at a plurality of points in the total length direction of the magnetic tape MT in a state in which the magnetic tape MT is made to travel before the data is recorded in the data band DB. Here, as an example, the servo band pitch SBP is calculated for all the points of the frames 50 in the total length direction of the magnetic tape MT. However, this is merely an example, and the servo band pitch SBP may be calculated, for example, in units of several meters, several tens of meters, or several hundred meters in the total length direction of the magnetic tape MT. That is, the servo band pitch SBP need only be calculated at regular intervals in the total length direction of the magnetic tape MT. In addition, in the total length direction of the magnetic tape MT, the servo band pitch SBP may be calculated at each of a plurality of predetermined points in a partial region of the magnetic tape MT, and the servo band pitch SBP may be estimated by using interpolation, extrapolation, or the like at points other than the point at which the servo band pitch SBP is calculated.

The first environment information acquisition unit 30A5 acquires environment information 106 from the environment sensor ES. The environment information 106 is information for specifying the environment (for example, information that indicates the physical quantity for specifying the environment). The environment information 106 is an example of "first environment information" and "second environment information" according to the technology of the present disclosure.

The environment information 106 includes temperature information 106A and humidity information 106B. The temperature information 106A is information that indicates the temperature measured by the environment sensor ES. The humidity information 106B is information that indicates the humidity measured by the environment sensor ES. The temperature information 106A is an example of "temperature information" according to the technology of the present disclosure, and the humidity information 106B is an example of "humidity information" according to the technology of the present disclosure. The first environment information acquisition unit 30A5 stores the environment information 106 acquired from the environment sensor ES in the cartridge memory 24.

Figure 17:
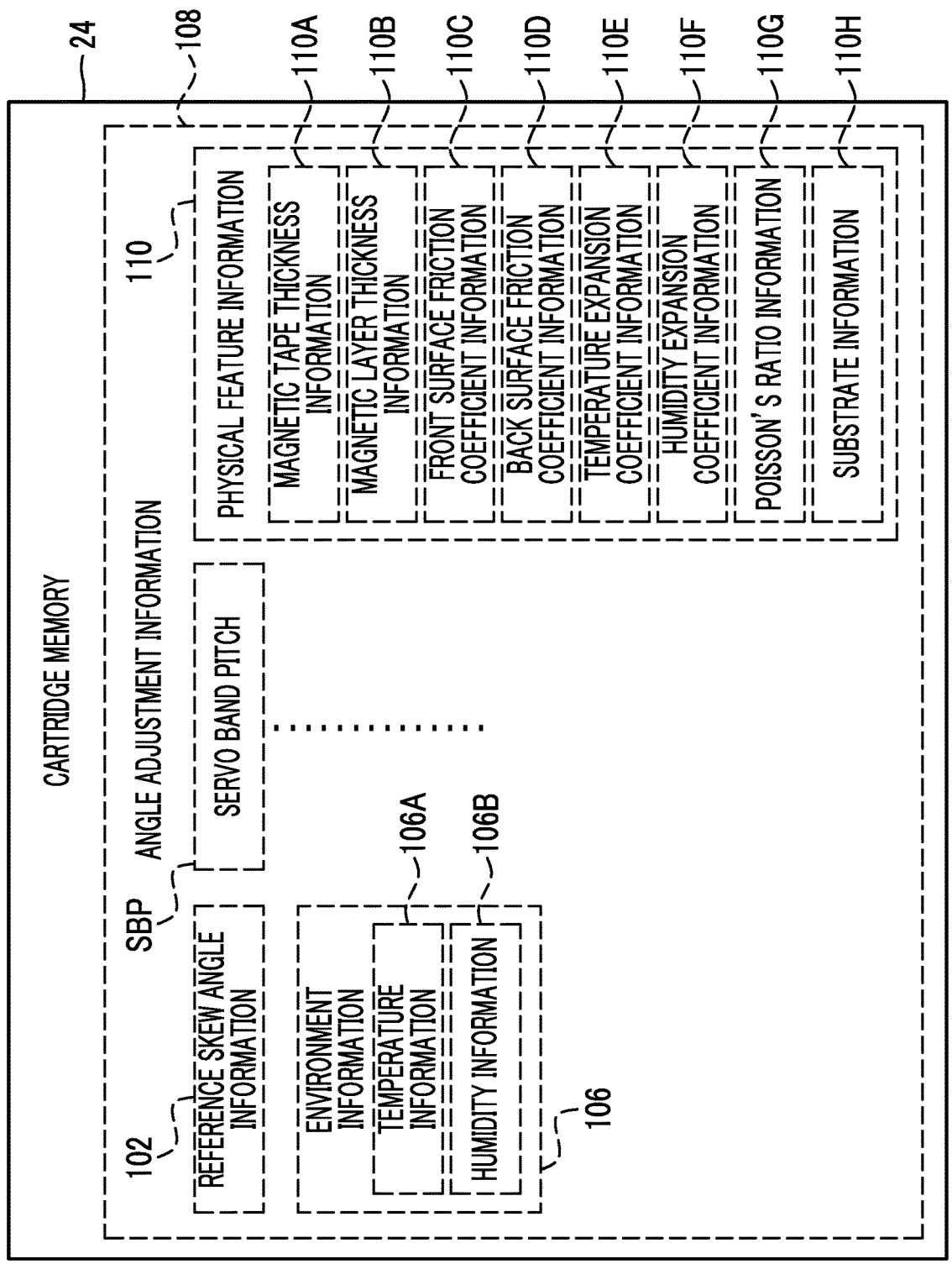
FIG. 17 is a block diagram showing an example of a content of angle adjustment information stored in a cartridge memory.

As shown in FIG. 17 as an example, the angle adjustment information 108 is stored in the cartridge memory 24. The angle adjustment information 108 is information for adjusting the skew angle θ (see FIG. 15). The angle adjustment information 108 is information obtained before the data is recorded in the data band DB of the front surface 31 of the magnetic tape MT.

The angle adjustment information 108 is information used by the control device 30A at a timing in which the magnetic processing is performed by the magnetic head 28 on the data band DB of the magnetic tape MT. That is, the skew angle θ is adjusted by using the angle adjustment information 108 by the control device 30A at a timing in which the magnetic processing is performed by the magnetic head 28 on the data band DB of the magnetic tape MT.

The angle adjustment information 108 includes the reference skew angle information 102, a plurality of servo band pitches SBP, the environment information 106, and physical feature information 110. The reference skew angle information 102 is stored in the cartridge memory 24 by the reference skew angle derivation unit 30A1 (see FIG. 15), the plurality of servo band pitches SBP are stored in the cartridge memory 24 by the pitch calculation unit 30A4 (see FIG. 16), and the environment information 106 is stored in the cartridge memory 24 by the first environment information acquisition unit 30A5 (see FIG. 16). The physical feature information 110 is information that indicates the physical feature of the magnetic tape MT. The physical feature information 110 is stored in the cartridge memory 24 in a manufacturing process of the magnetic tape cartridge 12 or the magnetic tape MT. It should be noted that a timing at which the physical feature information 110 is stored in the cartridge memory 24 may be any timing as long as the timing is in a stage before the magnetic processing is performed by the magnetic head 28 on the magnetic tape MT (for example, a stage before the data recording reading processing is performed).

The physical feature information 110 includes magnetic tape thickness information 110A, magnetic layer thickness information 110B, front surface friction coefficient information 110C, back surface friction coefficient information 110D, temperature expansion coefficient information 110E, humidity expansion coefficient information 110F, Poisson's ratio information 110G, substrate information 110H, and the like.

The magnetic tape thickness information 110A is information that indicates a thickness of the magnetic tape MT. The magnetic layer thickness information 110B is information that indicates a thickness of the magnetic layer 29A (see FIG. 3). The front surface friction coefficient information 110C is information that indicates a friction coefficient of the front surface 31 (see FIG. 3) of the magnetic tape MT. The back surface friction coefficient information 110D is information that indicates a friction coefficient of the back surface 33 (see FIG. 3) of the magnetic tape MT. The temperature expansion coefficient information 110E is information that indicates a temperature expansion coefficient of the magnetic tape MT (for example, a linear expansion coefficient indicating a degree of expansion and contraction of the magnetic tape MT along the width direction WD depending on the temperature). The humidity expansion coefficient information 110F is information that indicates a humidity expansion coefficient of the magnetic tape MT (for example, a linear expansion coefficient indicating a degree of expansion and contraction of the magnetic tape MT along the width direction WD depending on the humidity). The Poisson's ratio information 110G is information that indicates a Poisson's ratio of the magnetic tape MT. The substrate information 110H is information that indicates a substrate of the magnetic tape MT.

It should be noted that, here, the form example has been described in which the physical feature information 110 includes the magnetic tape thickness information 110A, the magnetic layer thickness information 110B, the front surface friction coefficient information 110C, the back surface friction coefficient information 110D, the temperature expansion coefficient information 110E, the humidity expansion coefficient information 110F, the Poisson's ratio information 110G, the substrate information 110H, and the like, but the technology of the present disclosure is not limited to this. For example, the physical feature information 110 need only include at least one of the magnetic tape thickness information 110A, the magnetic layer thickness information 110B, the front surface friction coefficient information 110C, the back surface friction coefficient information 110D, the temperature expansion coefficient information 110E, the humidity expansion coefficient information 110F, the Poisson's ratio information 110G, or the substrate information 110H.

Next, an example of the data recording reading processing will be described with reference to FIGS. 18 to 21.

Here, the description will be made on the premise that the data recording reading processing is performed at a timing at which the condition for performing the magnetic processing on the magnetic tape MT (here, as an example, processing of recording the data) (for example, a condition that a command to start recording the data in the data band DB is received by the UI system device 34) is satisfied. It should be noted that the timing at which the condition that the magnetic processing is performed on the magnetic tape MT is satisfied is an example of a "timing at which the magnetic processing is performed" and a "first timing at which the data is recorded in the recording surface" according to the technology of the present disclosure.

Figure 18:
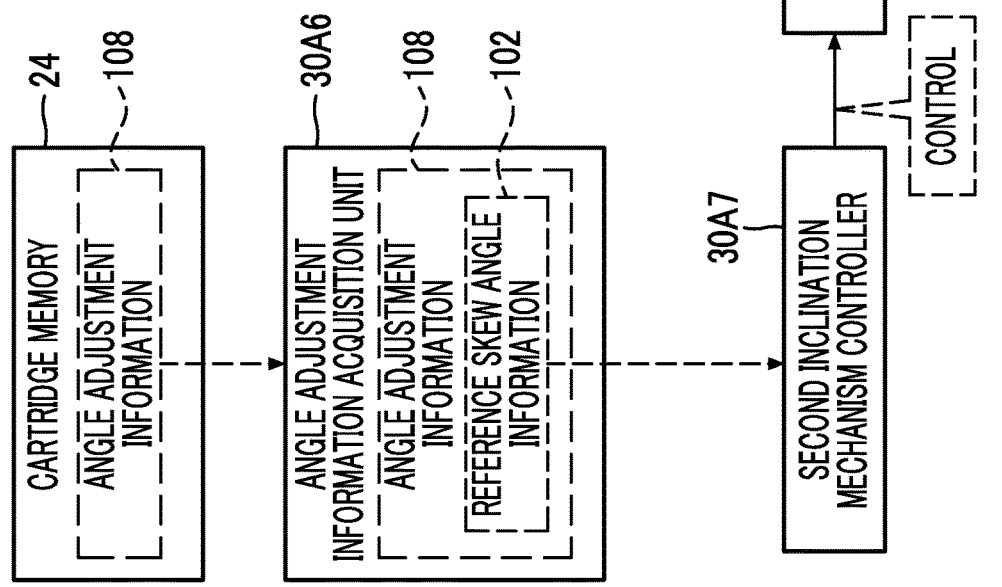
FIG. 18 is a conceptual diagram showing an example of processing contents of an angle adjustment information acquisition unit and a second inclination mechanism controller.

As shown in FIG. 18 as an example, the angle adjustment information acquisition unit 30A6 acquires the angle adjustment information 108 from the cartridge memory 24. The second inclination mechanism controller 30A7 extracts the reference skew angle information 102 from the angle adjustment information 108 acquired from the cartridge memory 24 by the angle adjustment information acquisition unit 30A6. By controlling the inclination mechanism 49 in accordance with the reference skew angle information 102 extracted from the angle adjustment information 108, the second inclination mechanism controller 30A7 sets the skew angle θ of the magnetic head 28 to the reference skew angle indicated by the reference skew angle information 102.

Figure 19:
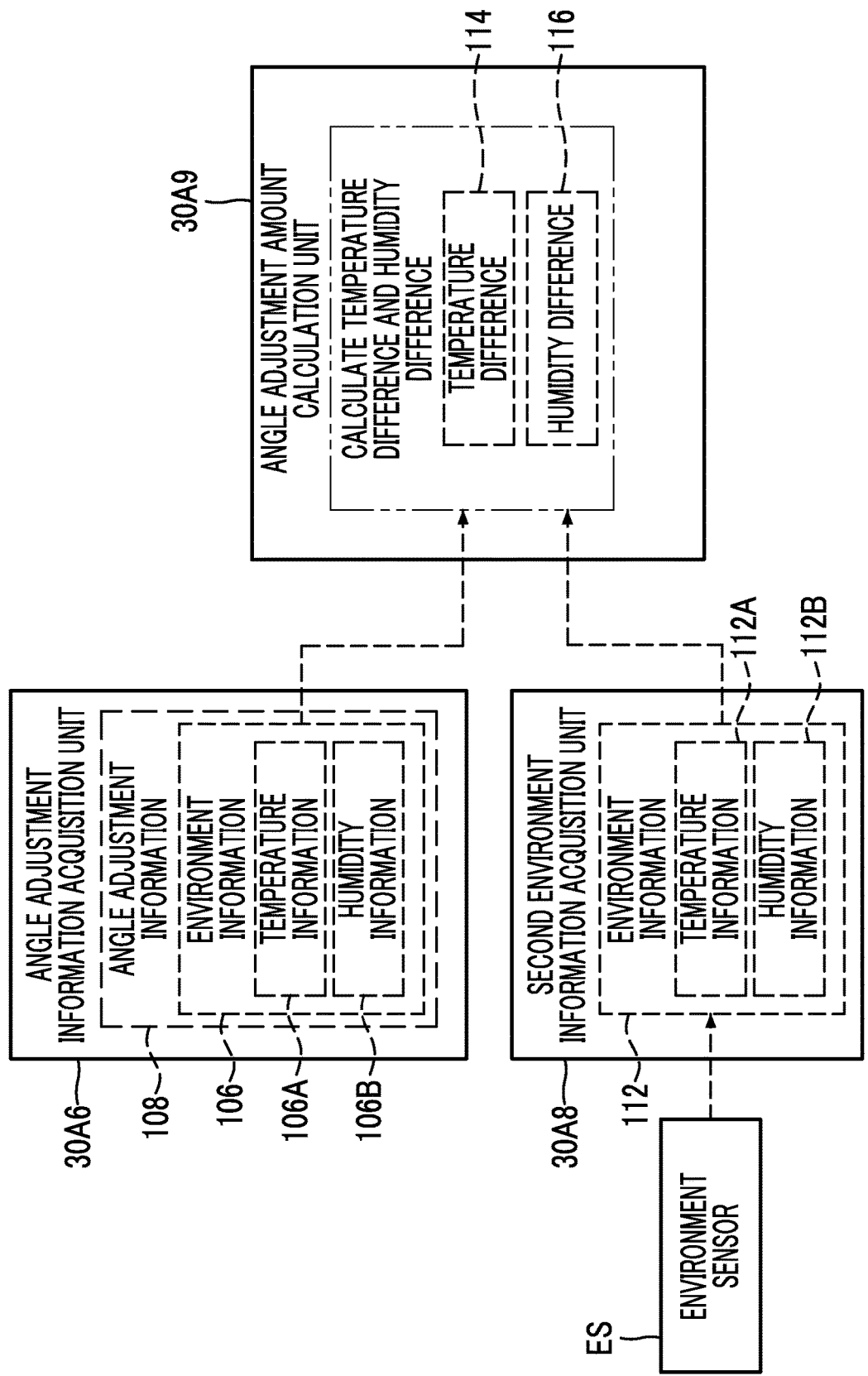
FIG. 19 is a conceptual diagram showing an example of processing contents of the angle adjustment information acquisition unit, a second environment information acquisition unit, and an angle adjustment amount calculation unit.

As shown in FIG. 19 as an example, the second environment information acquisition unit 30A8 acquires the environment information 112 from the environment sensor ES. The environment information 112 is information for specifying the environment (for example, information that indicates the physical quantity for specifying the environment). The environment information 112 is an example of "third environment information" and "fourth environment information" according to the technology of the present disclosure.

The environment information 112 includes temperature information 112A and humidity information 112B. The temperature information 112A is information that indicates the temperature measured by the environment sensor ES. The humidity information 112B is information that indicates the humidity measured by the environment sensor ES.

The angle adjustment amount calculation unit 30A9 calculates a degree of difference between the environment information 106 included in the angle adjustment information 108 acquired by the angle adjustment information acquisition unit 30A6 and the environment information 112 acquired by the second environment information acquisition unit 30A8. Examples of the degree of difference between the environment information 106 and the environment information 112 include a temperature difference 114 and a humidity difference 116.

The temperature difference 114 is a difference between the temperature indicated by the temperature information 106A included in the environment information 106 and the temperature indicated by the temperature information 112A included in the environment information 112 (for example, a value obtained by subtracting the temperature indicated by the temperature information 112A from the temperature indicated by the temperature information 106A). It should be noted that, the temperature difference 114 is shown here, but the technology of the present disclosure is not limited to this, and a ratio of one of the temperature indicated by the temperature information 106A or the temperature indicated by the temperature information 112A to the other may be applied instead of the temperature difference 114.

The humidity difference 116 is a difference between the humidity indicated by the humidity information 106B included in the environment information 106 and the humidity indicated by the humidity information 112B included in the environment information 112 (for example, a value obtained by subtracting the humidity indicated by the humidity information 112B from the humidity indicated by the humidity information 106B). It should be noted that, the humidity difference 116 is shown here, but the technology of the present disclosure is not limited to this, and a ratio of one of the humidity indicated by the humidity information 106B or the humidity indicated by the humidity information 112B to the other may be applied instead of the humidity difference 116.

Figure 20:
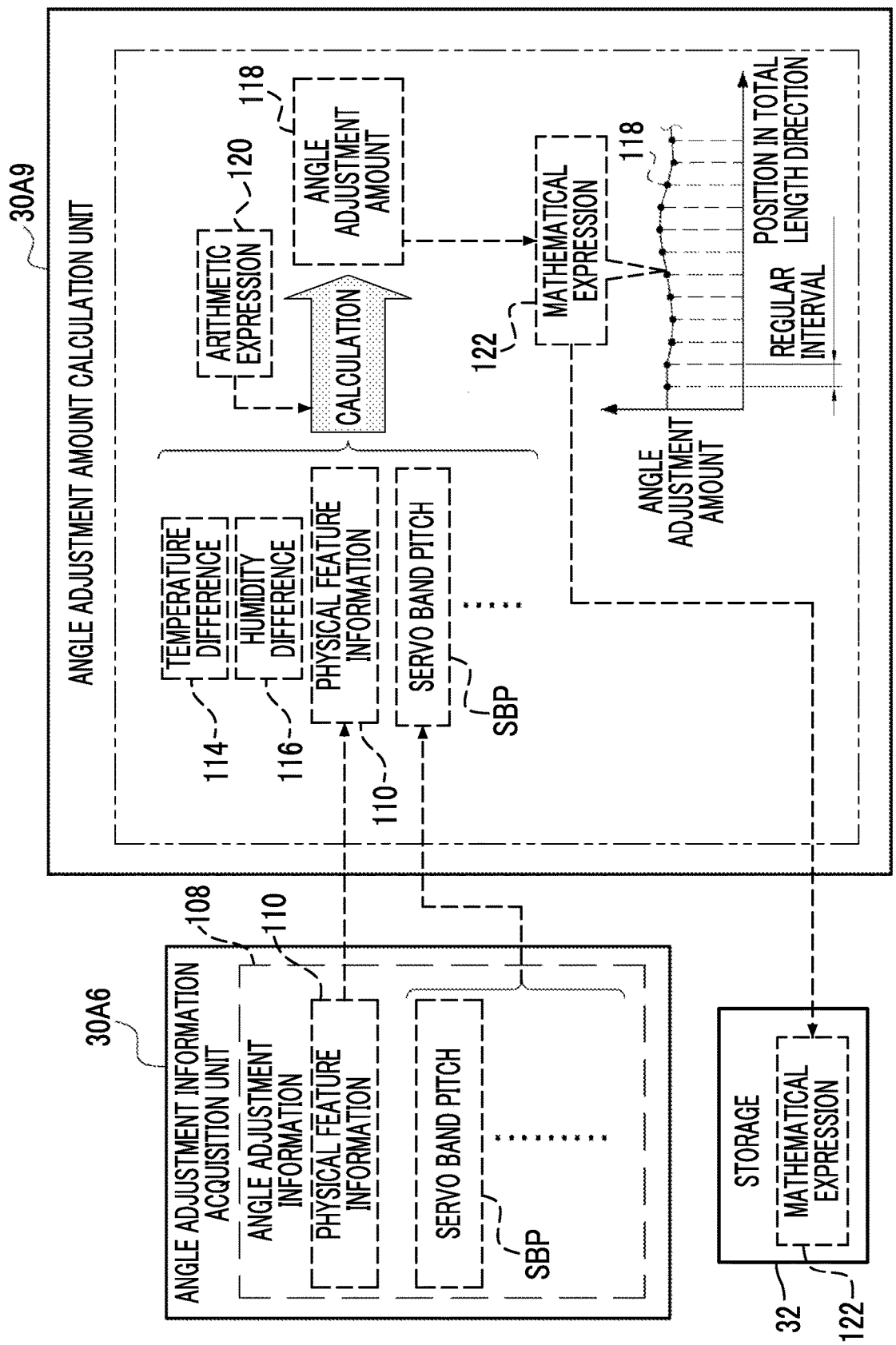
FIG. 20 is a conceptual diagram showing an example of processing contents of the angle adjustment amount calculation unit.

As shown in FIG. 20 as an example, the angle adjustment amount calculation unit 30A9 extracts the physical feature information 110 and the plurality of servo band pitches SBP (for example, all the servo band pitches SBP) from the angle adjustment information 108 acquired by the angle adjustment information acquisition unit 30A6. Moreover, the angle adjustment amount calculation unit 30A9 calculates the angle adjustment amount 118 based on the physical feature information 110, the temperature difference 114, the humidity difference 116, and the servo band pitch SBP. The angle adjustment amount 118 refers to an adjustment amount of the skew angle θ. For example, the angle adjustment amount 118 is calculated from an arithmetic expression 120. The arithmetic expression 120 is an arithmetic expression in which the physical feature information 110, the temperature difference 114, the humidity difference 116, and the servo band pitch SBP are used as independent variables, and the angle adjustment amount 118 in which the on-track is realized is used as a dependent variable. It should be noted that the arithmetic expression 120 is an arithmetic expression obtained in advance as an arithmetic expression for calculating the angle adjustment amount 118 in which the on-track is realized by a test and/or a computer simulation with an actual machine performed under various combinations of the physical feature information 110, the temperature difference 114, the humidity difference 116, and the servo band pitch SBP.

It should be noted that, here, the form example has been described in which the angle adjustment amount 118 is calculated from the arithmetic expression 120, but this is merely an example, and the angle adjustment amount 118 may be derived from a table (not shown) in which the physical feature information 110, the temperature difference 114, and the humidity difference 116 are used as input and the angle adjustment amount 118 is used as output.

The angle adjustment amount calculation unit 30A9 calculates the angle adjustment amount 118 for each servo band pitch SBP in accordance with the arithmetic expression 120, and generates a mathematical expression 122 that indicates the calculation result. The mathematical expression 122 indicates a correspondence relationship between the position in the total length direction of the magnetic tape MT and the angle adjustment amount 118. The correspondence relationship between the position in the total length direction of the magnetic tape MT and the angle adjustment amount 118 has continuity along the total length direction of the magnetic tape, and the continuity is realized by an interpolation method (for example, linear interpolation). The position in the total length direction of the magnetic tape MT is determined at a regular interval in the total length direction of the magnetic tape MT. Here, the regular interval refers to, for example, an interval defined by the frame 50 in the total length direction of the magnetic tape MT (that is, an interval at which the servo band pitch SBP is acquired). The angle adjustment amount calculation unit 30A9 stores the generated mathematical expression 122 in the storage 32.

Figure 21:
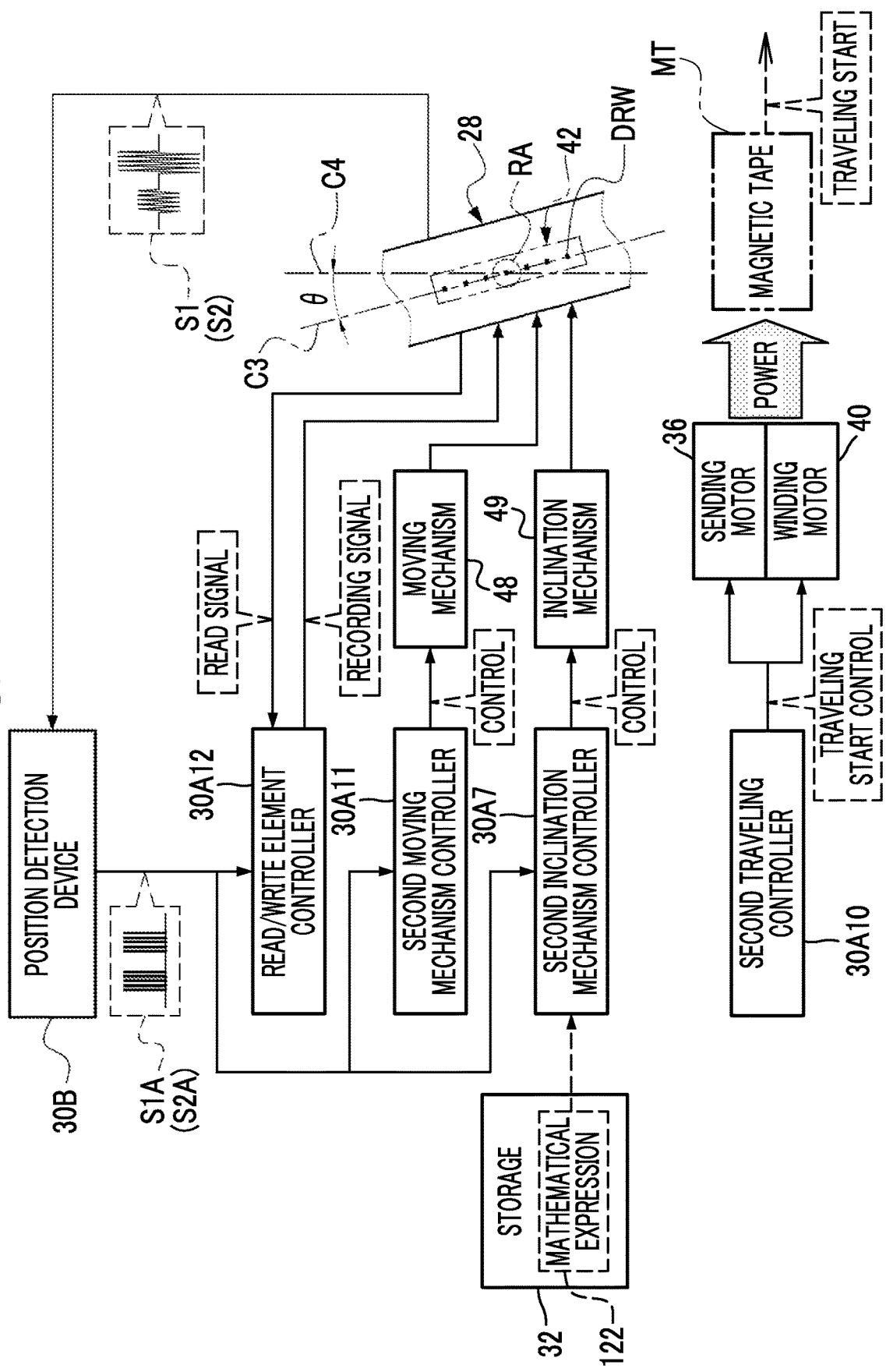
FIG. 21 is a conceptual diagram showing an example of processing contents of the second inclination mechanism controller, a second traveling controller, a second moving mechanism controller, and a read/write element controller.

As shown in FIG. 21 as an example, the second traveling controller 30A10 performs the traveling start control to start the traveling of the magnetic tape MT. The position detection results, that is, the servo pattern signals S1A and S2A are input from the position detection device 30B to the second inclination mechanism controller 30A7, the second moving mechanism controller 30A11, and the read/write element controller 30A12. The second inclination mechanism controller 30A7, the second moving mechanism controller 30A11, and the read/write element controller 30A12 are operated in synchronization with each other based on the servo pattern signals S1A and S2A input from the position detection device 30B.

In a case in which the magnetic tape MT starts traveling, the second inclination mechanism controller 30A7 controls the inclination mechanism 49 in accordance with the angle adjustment amount 118 obtained from the mathematical expression 122 stored in the storage 32 to adjust the skew angle θ by the angle adjustment amount 118 obtained from the mathematical expression 122. The second moving mechanism controller 30A11 performs the servo control based on the servo pattern signals S1A and S2A.

The servo pattern 52 is continuously read by the servo reading element SR, and along with this, the servo pattern signals S1A and S2A are continuously input to the read/write element controller 30A12 along with this. The read/write element controller 30A12 causes the magnetic head 28 to perform the magnetic processing in response to the input of the servo pattern signals S1A and S2A. That is, in a case in which the data is recorded in the data band DB (see FIG. 10) of the front surface 31 of the magnetic tape MT, the read/write element controller 30A12 supplies the recording signal to the magnetic element unit 42 in response to the input of the servo pattern signals S1A and S2A. As a result, the plurality of data read/write elements DRW provided in the magnetic element unit 42 record the data corresponding to the recording signal in the data band DB (see FIG. 10). In addition, in a case in which data is read from the data band DB after the data is recorded in the data band DB of the front surface 31 of the magnetic tape MT (for example, after the data is recorded in the data band DB over the total length of the magnetic tape MT), the read/write element controller 30A12 acquires the read signal in response to the input of the servo pattern signals S1A and S2A to read the data from the data band DB.

Next, an action of the magnetic tape system 10 will be described with reference to FIGS. 22 to 24.

FIG. 22 shows an example of a flow of the data recording preprocessing performed by the control device 30A. In a stage before the magnetic processing is performed by the magnetic head 28 on the magnetic tape MT (here, as an example, recording the data in the data band DB), in a case in which a start condition (for example, a condition that a command to start the execution of the data recording preprocessing is received by the UI system device 34) is satisfied, the data recording preprocessing shown in FIG. 22 is performed by the control device 30A.

In the data recording preprocessing shown in FIG. 22, first, in step ST10, the reference skew angle derivation unit 30A1 acquires the specification information 13A from the cartridge memory 24. After the processing of step ST10 is executed, the data recording preprocessing proceeds to step ST12.

In step ST12, the reference skew angle derivation unit 30A1 derives the reference skew angle information 102 corresponding to the specification information 13A which is acquired in step ST12 from the table 100. Moreover, the reference skew angle derivation unit 30A1 stores the derived reference skew angle information 102 in the cartridge memory 24. After the processing of step ST12 is executed, the data recording preprocessing proceeds to step ST14.

In step ST14, the first inclination mechanism controller 30A2 sets the skew angle θ to the reference skew angle indicated by the reference skew angle information 102 derived in step ST12. After the processing of step ST14 is executed, the data recording preprocessing proceeds to step ST16.

In step ST16, the first traveling controller 30A3 performs the traveling start control to start the traveling of the magnetic tape MT. After the processing of step ST16 is executed, the data recording preprocessing proceeds to step ST18.

In step ST18, the pitch calculation unit 30A4 determines whether or not the servo pattern signals S1A and S2A are input from the position detection device 30B. In step ST18, in a case in which the servo pattern signals S1A and S2A are not input from the position detection device 30B, a negative determination is made, and the data recording preprocessing proceeds to step ST21. In step ST18, in a case in which the servo pattern signals S1A and S2A are input from the position detection device 30B, a positive determination is made, and the data recording preprocessing proceeds to step ST20.

In step ST20, the pitch calculation unit 30A4 calculates the servo band pitch SBP based on the servo pattern signals S1A and S2A input from the position detection device 30B. Moreover, the pitch calculation unit 30A4 stores the calculated servo band pitch SBP in the cartridge memory 24. After the processing of step ST20 is executed, the data recording preprocessing proceeds to step ST21.

In step ST21, the pitch calculation unit 30A4 determines whether or not reading a predetermined servo pattern 52 (for example, all the servo patterns 52 included in a section between the BOT section 31A (see FIG. 26) and the EOT section 31B (see FIG. 26)) over the total length of the magnetic tape MT by the magnetic head 28 ends. In step ST21, in a case in which reading the predetermined servo pattern 52 over the total length of the magnetic tape MT by the magnetic head 28 does not end, a negative determination is made, and the data recording preprocessing proceeds to step ST18. In step ST21, in a case in which reading the predetermined servo pattern 52 over the total length of the magnetic tape MT by the magnetic head 28 ends, a positive determination is made, and the data recording preprocessing proceeds to step ST22.

In step ST22, the first traveling controller 30A3 controls the sending motor 36 and the winding motor 40 to stop the traveling of the magnetic tape MT. After the processing of step ST22 is executed, the data recording preprocessing proceeds to step ST24.

In step ST24, the first environment information acquisition unit 30A5 acquires the environment information 106 from the environment sensor ES. Moreover, the first environment information acquisition unit 30A5 stores the acquired environment information 106 in the cartridge memory 24. After the processing of step ST24 is executed, the data recording preprocessing ends.

Figure 23A:
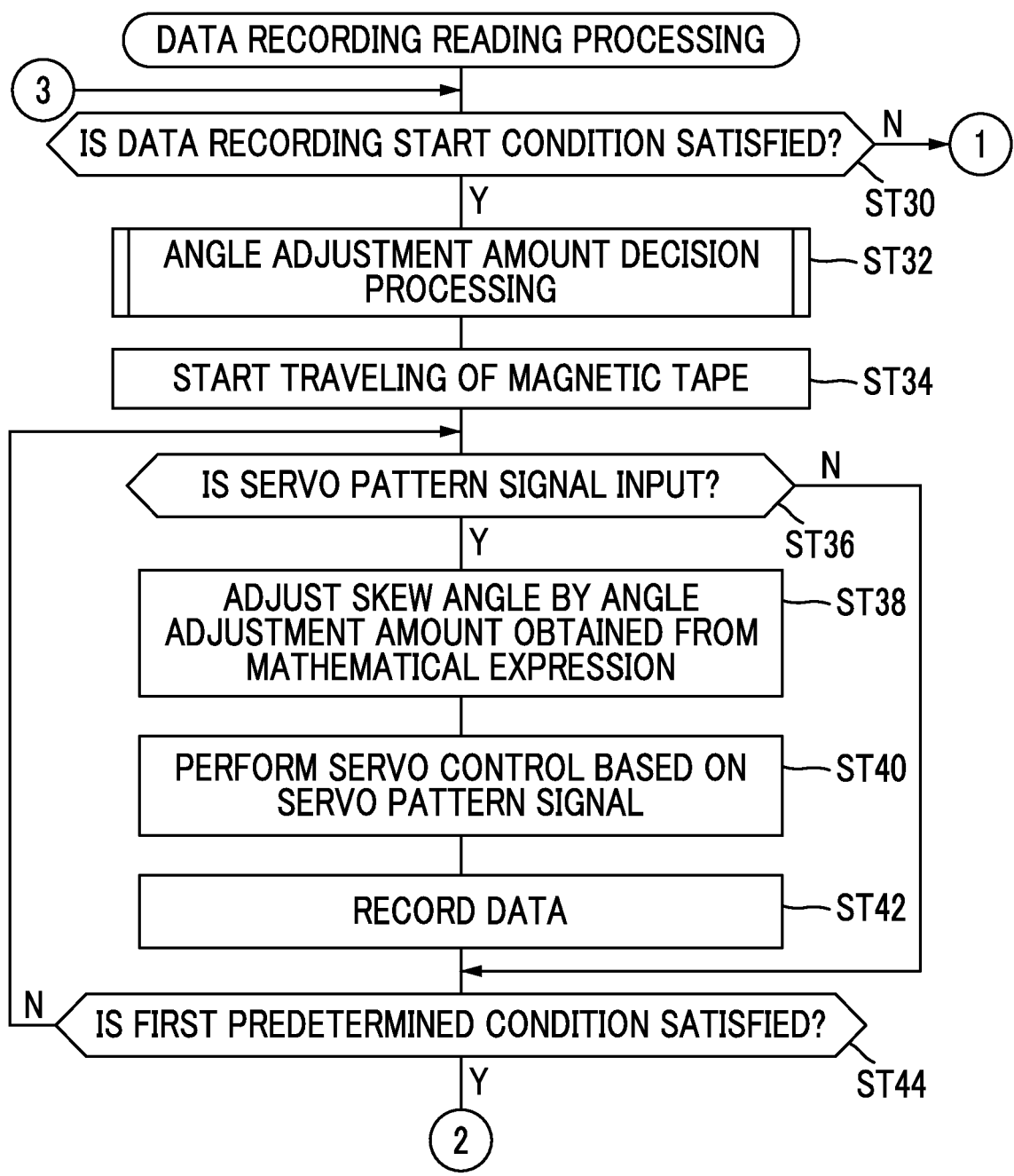
FIG. 23A is a flowchart showing an example of a flow of data recording reading processing.
Figure 23B:
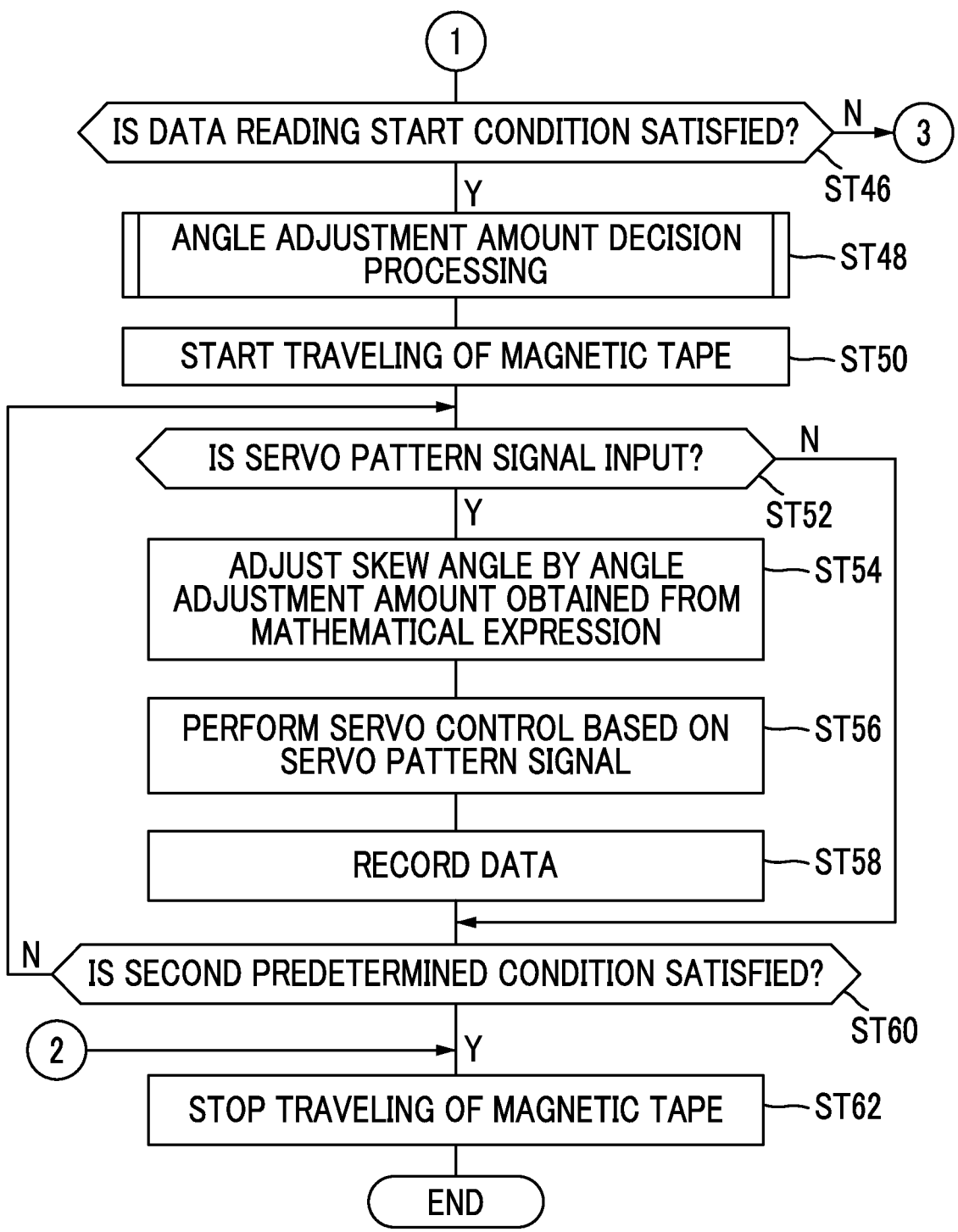
FIG. 23B is a continuation of the flowchart shown in FIG. 23A.

FIGS. 23A and 23B show an example of a flow of the data recording reading processing performed by the control device 30A.

In the data recording reading processing shown in FIG. 23A, first, in step ST30, the angle adjustment information acquisition unit 30A6 determines whether or not a data recording start condition is satisfied. Examples of the data recording start condition include a condition that a command to start recording the data in the data band DB of the magnetic tape MT is received by the UI system device 34. In step ST30, in a case in which the data recording start condition is not satisfied, a negative determination is made, and the data recording reading processing proceeds to step ST46 shown in FIG. 23B. In step ST30, in a case in which the data recording start condition is satisfied, a positive determination is made, and the data recording reading processing proceeds to step ST32.

Figure 24:
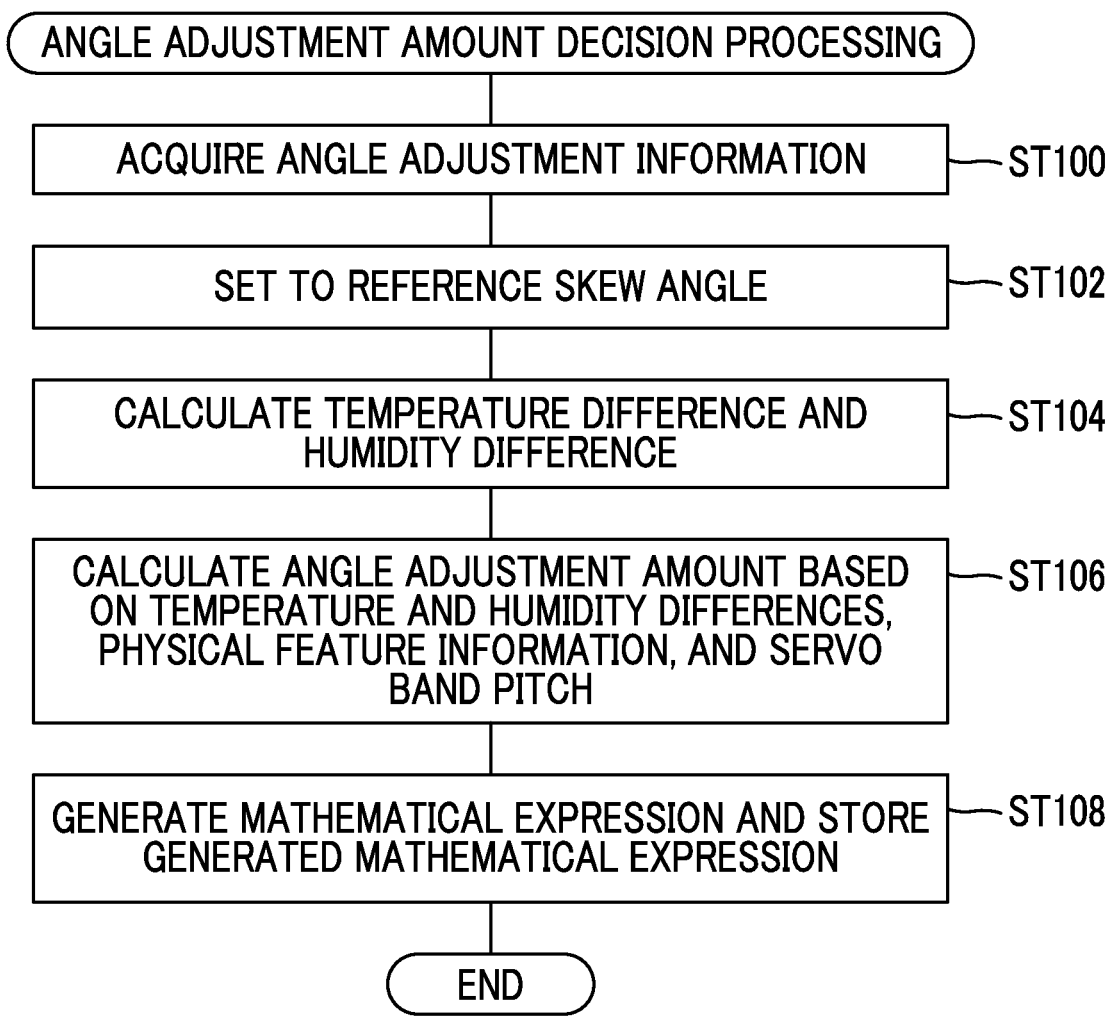
FIG. 24 is a flowchart showing an example of a flow of angle adjustment amount decision processing.

In step ST32, the control device 30A executes angle adjustment amount decision processing shown in FIG. 24 as an example. After the processing of step ST32 is executed, the data recording reading processing proceeds to step ST34.

In the angle adjustment amount decision processing shown in FIG. 24, first, in step ST100, the angle adjustment information acquisition unit 30A6 acquires the angle adjustment information 108 from the cartridge memory 24. After the processing of step ST100 is executed, the angle adjustment amount decision processing proceeds to step ST102.

In step ST102, the second inclination mechanism controller 30A7 extracts the reference skew angle information 102 from the angle adjustment information 108 acquired in step ST100. Moreover, the second inclination mechanism controller 30A7 controls the inclination mechanism 49 to set the skew angle θ to the reference skew angle indicated by the reference skew angle information 102. After the processing of step ST102 is executed, the angle adjustment amount decision processing proceeds to step ST104.

In step ST104, the second environment information acquisition unit 30A8 acquires the environment information 112 from the environment sensor ES. The angle adjustment amount calculation unit 30A9 calculates the temperature difference 114 and the humidity difference 116 based on the environment information 112 acquired by the second environment information acquisition unit 30A8 and the environment information 106 included in the angle adjustment information 108 acquired in step ST100. After the processing of step ST104 is executed, the angle adjustment amount decision processing proceeds to step ST106.

In step ST106, the angle adjustment amount calculation unit 30A9 calculates the angle adjustment amount 118 for each servo band pitch SBP by using the arithmetic expression 120 from the temperature difference 114 calculated in step ST104, the humidity difference 116 calculated in step ST104, the physical feature information 110 included in the angle adjustment information 108 acquired in step ST100, and the plurality of servo band pitches SBP included in the angle adjustment information 108 acquired in step ST100. After the processing of step ST106 is executed, the angle adjustment amount decision processing proceeds to step ST108.

In step ST108, the angle adjustment amount calculation unit 30A9 generates the mathematical expression 122 based on the calculation result in step ST106, and stores the generated mathematical expression 122 in the storage 32. After the processing of step ST108 is executed, the angle adjustment amount decision processing ends.

In step ST34 shown in FIG. 23A, the second traveling controller 30A10 performs the traveling start control to start the traveling of the magnetic tape MT. After the processing of step ST34 is executed, the data recording reading processing proceeds to step ST36.

In step ST36, the control device 30A determines whether or not the servo pattern signals S1A and S2A are input from the position detection device 30B. In step ST36, in a case in which the servo pattern signals S1A and S2A are not input from the position detection device 30B, a negative determination is made, and the data recording reading processing proceeds to step ST44. In step ST36, in a case in which the servo pattern signals S1A and S2A are input from the position detection device 30B, a positive determination is made, and the data recording reading processing proceeds to step ST38.

In step ST38, the second inclination mechanism controller 30A7 adjusts the skew angle θ by the angle adjustment amount 118 obtained from the mathematical expression 122 stored in the storage 32. After the processing of step ST38 is executed, the data recording reading processing proceeds to step ST40.

In step ST40, the second moving mechanism controller 30A11 performs the servo control in accordance with the servo pattern signals S1A and S2A input from the position detection device 30B. After the processing of step ST40 is executed, the data recording reading processing proceeds to step ST42.

In step ST42, the read/write element controller 30A12 supplies the recording signal to the magnetic element unit 42. As a result, the plurality of data read/write elements provided in the magnetic element unit 42 record the data corresponding to the recording signal in the data band DB. After the processing of step ST42 is executed, the data recording reading processing proceeds to step ST44.

In step ST44, the control device 30A determines whether or not a first predetermined condition is satisfied. Examples of the first predetermined condition include a condition that reading the predetermined servo pattern 52 over the total length of the magnetic tape MT by the servo reading element SR ends and a condition that predetermined data recording is completed (for example, a size of the recorded data reaches a predetermined size). In step ST44, in a case in which the first predetermined condition is not satisfied, a negative determination is made, and the data recording reading processing proceeds to step ST36. In step ST44, in a case in which the first predetermined condition is satisfied, a positive determination is made, and the data recording preprocessing proceeds to step ST62 shown in FIG. 23B.

In step ST46 shown in FIG. 23B, the angle adjustment information acquisition unit 30A6 determines whether or not a data reading start condition is satisfied. Examples of the data reading start condition include a condition that the data has been already recorded in the data band DB over the total length of the magnetic tape MT and a command to start reading the data from the data band DB of the magnetic tape MT is received by the UI system device 34. In step ST46, in a case in which the data reading start condition is not satisfied, a negative determination is made, and the data recording reading processing proceeds to step ST30 shown in FIG. 23A. In step ST46, in a case in which the data reading start condition is satisfied, a positive determination is made, and the data recording reading processing proceeds to step ST48.

In step ST48, the control device 30A executes angle adjustment amount decision processing shown in FIG. 24 as an example. After the processing of step ST48 is executed, the data recording reading processing proceeds to step ST50.

In step ST50, the second traveling controller 30A10 performs the traveling start control to start the traveling of the magnetic tape MT. After the processing of step ST50 is executed, the data recording reading processing proceeds to step ST52.

In step ST52, the control device 30A determines whether or not the servo pattern signals S1A and S2A are input from the position detection device 30B. In step ST52, in a case in which the servo pattern signals S1A and S2A are not input from the position detection device 30B, a negative determination is made, and the data recording reading processing proceeds to step ST60. In step ST52, in a case in which the servo pattern signals S1A and S2A are input from the position detection device 30B, a positive determination is made, and the data recording reading processing proceeds to step ST54.

In step ST54, the second inclination mechanism controller 30A7 adjusts the skew angle θ by the angle adjustment amount 118 obtained from the mathematical expression 122 stored in the storage 32. After the processing of step ST54 is executed, the data recording reading processing proceeds to step ST56.

In step ST56, the second moving mechanism controller 30A11 performs the servo control in accordance with the servo pattern signals S1A and S2A input from the position detection device 30B. After the processing of step ST56 is executed, the data recording reading processing proceeds to step ST58.

In step ST58, the read/write element controller 30A12 acquires the data from the data band DB by acquiring the read signals from the plurality of data read/write elements DRW provided in the magnetic element unit 42. After the processing of step ST58 is executed, the data recording reading processing proceeds to step ST60.

In step ST60, the control device 30A determines whether or not a second predetermined condition is satisfied. Examples of the second predetermined condition include a condition that reading the predetermined servo pattern 52 over the total length of the magnetic tape MT by the servo reading element SR ends and a condition that predetermined data reading is completed (for example, a size of the read data reaches a predetermined size). In step ST60, in a case in which the second predetermined condition is not satisfied, a negative determination is made, and the data recording reading processing proceeds to step ST52. In step ST60, in a case in which the second predetermined condition is satisfied, a positive determination is made, and the data recording reading processing proceeds to step ST62.

In step ST62, the second traveling controller 30A10 controls the sending motor 36 and the winding motor 40 to stop the traveling of the magnetic tape MT. After the processing of step ST22 is executed, the data recording reading processing ends.

As described above, in the magnetic tape system 10 according to the present embodiment, the angle adjustment information 108 which is obtained before the data is recorded in the data band DB of the magnetic tape MT is stored in the cartridge memory 24. This is the information for adjusting the skew angle θ (see FIG. 15). Moreover, the second inclination mechanism controller 30A7 adjusts the skew angle θ in accordance with the angle adjustment amount 118 (see FIG. 20) determined in accordance with the angle adjustment information 108 stored in the cartridge memory 24. Therefore, with the present configuration, it is possible to suppress the off-track caused by the deformation of the width of the magnetic tape MT with higher accuracy than in a case in which the off-track caused by the deformation of the width of the magnetic tape MT is suppressed by adjusting the tension applied to the magnetic tape MT.

In addition, in the magnetic tape system 10 according to the present embodiment, the angle adjustment information 108 includes the plurality of servo band pitches SBP acquired before the data is recorded in the data band DB. Moreover, the second inclination mechanism controller 30A7 adjusts the skew angle θ in accordance with the angle adjustment amount 118 determined in accordance with the plurality of servo band pitches SBP included in the angle adjustment information 108. Therefore, with the present configuration, it is possible to adjust the skew angle θ in consideration of the plurality of servo band pitches SBP before the data is recorded in the data band DB. As a result, it is possible to realize the tracking control with higher accuracy than in a case in which the on-track realization is attempted only by adjusting the tension applied to the magnetic tape MT. It should be noted that the angle adjustment information 108 may include the width of the magnetic tape MT instead of the servo band pitch SBP. In this case, it is possible to adjust the skew angle θ in consideration of a plurality of widths before the data is recorded in the data band DB.

In addition, in the magnetic tape system 10 according to the present embodiment, the servo band pitches SBP are acquired at a plurality of points of the magnetic tape MT in the total length direction of the magnetic tape MT, and the acquired servo band pitches SBP are included in the angle adjustment information 108. Moreover, the second inclination mechanism controller 30A7 adjusts the skew angle θ in accordance with the angle adjustment amount 118 determined in accordance with the plurality of servo band pitches SBP included in the angle adjustment information 108. Therefore, with the present configuration, it is possible to adjust the skew angle θ in consideration of in consideration of the servo band pitches SBP acquired at a plurality of points of the magnetic tape MT in the total length direction of the magnetic tape MT. As a result, it is possible to realize the tracking control with higher accuracy than in a case in which the on-track realization is attempted only by adjusting the tension applied to the magnetic tape MT. It should be noted that the angle adjustment information 108 may include the widths of the magnetic tape MT acquired at a plurality of points of the magnetic tape MT in the total length direction of the magnetic tape MT. In this case, it is possible to adjust the skew angle θ in consideration of the width of the magnetic tape MT acquired at a plurality of points of the magnetic tape MT in the total length direction of the magnetic tape MT.

In addition, in the magnetic tape system 10 according to the present embodiment, the environment information 106 is included in the angle adjustment information 108. Moreover, the second inclination mechanism controller 30A7 adjusts the skew angle θ in accordance with the angle adjustment amount 118 determined in accordance with the environment information 106 included in the angle adjustment information 108. Therefore, with the present configuration, it is possible to adjust the skew angle θ in consideration of the environment of the magnetic tape drive 14 before the data is recorded in the data band DB. As a result, it is possible to realize the tracking control with higher accuracy than in a case in which the on-track realization is attempted only by adjusting the tension applied to the magnetic tape MT.

In addition, in the magnetic tape system 10 according to the present embodiment, the environment information 106 is included in the angle adjustment information 108. The environment information 106 includes temperature information 106A and humidity information 106B. Moreover, the second inclination mechanism controller 30A7 adjusts the skew angle θ in accordance with the angle adjustment amount 118 determined in accordance with the temperature information 106A and the humidity information 106B included in the environment information 106. Therefore, with the present configuration, it is possible to adjust the skew angle θ in consideration of the temperature and the humidity of the magnetic tape drive 14 before the data is recorded in the data band DB. As a result, it is possible to realize the tracking control with higher accuracy than in a case in which the on-track realization is attempted only by adjusting the tension applied to the magnetic tape MT.

In addition, in the magnetic tape system 10 according to the present embodiment, the reference skew angle information 102 is included in the angle adjustment information 108. Moreover, the second inclination mechanism controller 30A7 adjusts the skew angle θ in accordance with the angle adjustment amount 118 determined in accordance with the reference skew angle information 102 included in the angle adjustment information 108. Therefore, with the present configuration, it is possible to adjust the skew angle θ in consideration of the reference skew angle before the data is recorded in the data band DB. As a result, it is possible to realize the tracking control with higher accuracy than in a case in which the on-track realization is attempted only by adjusting the tension applied to the magnetic tape MT.

In addition, in the magnetic tape system 10 according to the present embodiment, the physical feature information 110 is included in the angle adjustment information 108. Moreover, the second inclination mechanism controller 30A7 adjusts the skew angle θ in accordance with the angle adjustment amount 118 determined in accordance with the physical feature information 110 included in the angle adjustment information 108. Therefore, with the present configuration, it is possible to adjust the skew angle θ in consideration of the physical feature of the magnetic tape MT before the data is recorded in the data band DB. As a result, it is possible to realize the tracking control with higher accuracy than in a case in which the on-track realization is attempted only by adjusting the tension applied to the magnetic tape MT.

In addition, in the magnetic tape system 10 according to the present embodiment, the physical feature information 110 includes the magnetic tape thickness information 110A, the magnetic layer thickness information 110B, the front surface friction coefficient information 110C, the back surface friction coefficient information 110D, the temperature expansion coefficient information 110E, the humidity expansion coefficient information 110F, the Poisson's ratio information 110O and the substrate information 110H. Moreover, the second inclination mechanism controller 30A7 adjusts the skew angle θ in accordance with the angle adjustment amount 118 determined in accordance with the magnetic tape thickness information 110A, the magnetic layer thickness information 110B, the front surface friction coefficient information 110C, the back surface friction coefficient information 110D, the temperature expansion coefficient information 110E, the humidity expansion coefficient information 110F, the Poisson's ratio information 110O and the substrate information 110H which are included in the physical feature information 110. Therefore, with the present configuration, it is possible to adjust the skew angle θ in consideration of the thickness of the magnetic tape MT, the thickness of the magnetic layer 29A, the friction coefficient of the front surface 31 of the magnetic tape MT, the friction coefficient of the back surface 33 of the magnetic tape MT, the temperature expansion coefficient of the magnetic tape MT, the humidity expansion coefficient of the magnetic tape MT, the Poisson's ratio of the magnetic tape MT, and the substrate of the magnetic tape MT before the data is recorded in the data band DB. As a result, it is possible to realize the tracking control with higher accuracy than in a case in which the on-track realization is attempted only by adjusting the tension applied to the magnetic tape MT.

In addition, in the magnetic tape system 10 according to the present embodiment, the angle adjustment information 108 is stored in the cartridge memory 24. Therefore, with the present configuration, it is possible to acquire the angle adjustment information 108 from the cartridge memory 24 in a noncontact manner.

In addition, in the magnetic tape system 10 according to the present embodiment, in a case in which the data is recorded in the data band DB, the skew angle θ is adjusted by the inclination mechanism 49 based on the angle adjustment information 108, so that the position of the servo band SB (specifically, for example, the designated division data track among the division data tracks DT1_1, DT1_2, DT1_3, DT1_4, ..., DT1_11, and DT1_12) and the position of the servo reading element SR match. Therefore, with the present configuration, it is possible to match the position of the servo band SB in a case in which the data is recorded in the data band DB with the position of the servo reading element SR with higher accuracy than in a case in which the position of the servo band SB in a case in which the data is recorded in the data band DB and the position of the servo reading element SR match only by adjusting the tension applied to the magnetic tape MT. As a result, as compared with a case in which the on-track realization is attempted only by adjusting the tension applied to the magnetic tape MT, it is possible to improve the on-track accuracy, that is, the accuracy of the registration of the data read/write element DRW with the division data tracks DT1_1, DT1_2, DT1_3, DT1_4, ..., DT1_11, and DT1_12.

In addition, in the magnetic tape system 10 according to the present embodiment, the environment information 106 is included in the angle adjustment information 108 stored in the cartridge memory 24. The environment information 106 is information acquired in a stage before the data is recorded in the magnetic tape MT. In addition, the environment information 112 is acquired at a timing at which the magnetic processing is performed on the magnetic tape MT. Moreover, the skew angle $\theta$ is adjusted based on the degree of difference between the environment information 106 and the environment information 112 (for example, the temperature difference 114 and the humidity difference 116). Therefore, with the present configuration, the off-track caused by the deformation of the width of the magnetic tape MT due in part to the difference between the environment before the data is recorded in the magnetic tape MT and the environment at the timing at which the magnetic processing is performed on the magnetic tape MT can be suppressed with higher accuracy than in a case in which the skew angle $\theta$ is adjusted depending only on the environment information 112 acquired the timing at which the magnetic processing is performed on the magnetic tape MT.

It should be noted that, in the embodiment described above, the form example has been described in which the environment information 106 includes the temperature information 106A and the humidity information 106B and the environment information 112 includes the temperature information 112A and the humidity information 112B, but the technology of the present disclosure is not limited to this. For example, the environment information 106 may include the temperature information 106A without including the humidity information 106B, and the environment information 112 may include the temperature information 112A without including the humidity information 112B. In this case, the angle adjustment amount calculation unit 30A9 calculates the temperature difference 114 without calculating the humidity difference 116 but. Moreover, the angle adjustment amount calculation unit 30A9 calculates the angle adjustment amount 118 without using the humidity difference 116. In addition, for example, the environment information 106 may include the humidity information 106B without including the temperature information 106A, and the environment information 112 may include the humidity information 112B without including the temperature information 112A. In this case, the angle adjustment amount calculation unit 30A9 calculates the humidity difference 116 without calculating the temperature difference 114. Moreover, the angle adjustment amount calculation unit 30A9 calculates the angle adjustment amount 118 without using the temperature difference 114.

In addition, in the embodiment described above, the form example has been described in which the inclination mechanism 49 is caused to adjust the skew angle $\theta$ based on the degree of difference between the environment information 106 acquired at a timing before the data is recorded in the data band DB and the environment information 112 acquired at a timing at which the data is recorded in the data band DB, but the technology of the present disclosure is not limited to this. For example, the inclination mechanism 49 may be caused to adjust the skew angle $\theta$ based on the degree of difference between the environment information 112 acquired at the first timing which is the timing at which the data is recorded in the data band DB and environment information 124 (see FIG. 25) acquired at a second timing different from the first timing. In this case, the off-track caused by the deformation of the width of the magnetic tape MT due in part to the difference between the environment of the first timing and the environment of the second timing can be suppressed with higher accuracy than in a case in which the skew angle $\theta$ is adjusted depending only on the environment information 112 acquired at the first timing. It should be noted that the environment information 124 (see FIG. 25) is an example of "fifth environment information" according to the technology of the present disclosure.

Figure 25:
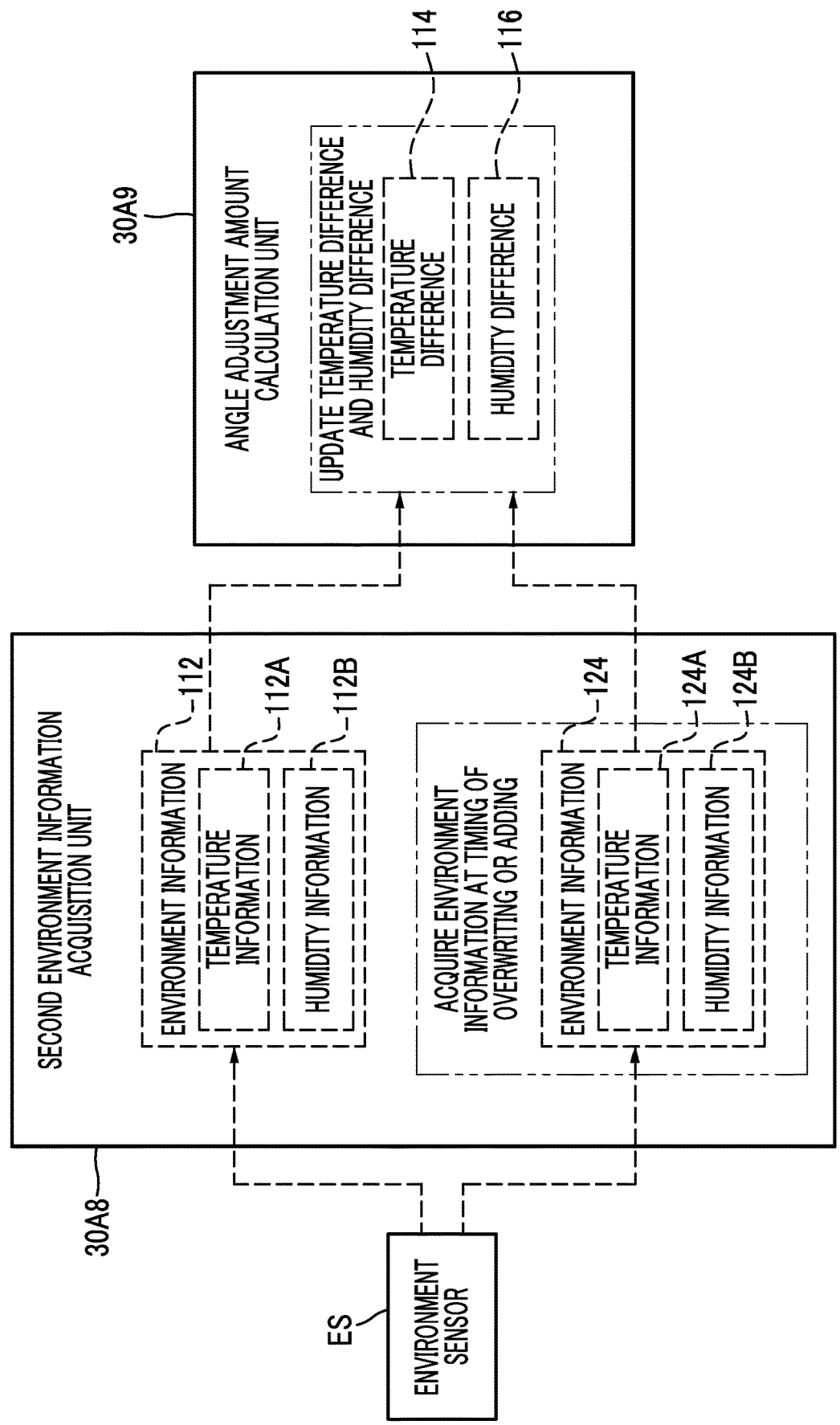
FIG. 25 is a conceptual diagram showing an example of processing contents of the second environment information acquisition unit and the angle adjustment amount calculation unit in a case in which a temperature difference and a humidity difference are updated.

As shown in FIG. 25 as an example, the environment information 124 includes the temperature information 124A that indicates the temperature measured by the environment sensor ES and the humidity information 124B that indicates the humidity measured by the environment sensor ES. The second timing at which the environment information 124 is acquired may be a timing at which the data recorded in the data band DB is updated by performing overwriting to the data band DB, or may be a timing at which new data is added to the data band DB in which the data has already been recorded. That is, the environment information 124 may be acquired from the environment sensor ES by the second environment information acquisition unit 30A8 at the timing at which the data recorded in the data band DB is updated by performing overwriting to the data band DB, or may be acquired from the environment sensor ES by the second environment information acquisition unit 30A8 at the timing at which new data is added to the data band DB in which the data has already been recorded.

In this case, the angle adjustment amount calculation unit 30A9 updates the temperature difference 114 by calculating the difference between the temperature indicated by the temperature information 112A and the temperature indicated by the temperature information 124A, and updates the humidity difference 116 by calculating the difference between the humidity indicated by the humidity information 112B and the humidity indicated by the humidity information 124B. Moreover, the angle adjustment amount calculation unit 30A9 calculates the angle adjustment amount 118 (see FIG. 20) in the same manner as in the embodiment described above. Therefore, with the present configuration, the off-track caused by the deformation of the width of the magnetic tape MT due in part to the difference between the environment of the first timing and the environment of the timing at which the data in the data band DB is updated by performing overwriting to the data band DB can be suppressed with higher accuracy than in a case in which the skew angle $\theta$ is adjusted depending only on the environment information 112 acquired at the first timing. In addition, with the present configuration, the off-track caused by the deformation of the width of the magnetic tape MT due in part to the difference between the environment of the first timing and the environment of the timing at which new data is added to the data band DB in which the data has already been recorded can be suppressed with higher accuracy than in a case in which the skew angle θ is adjusted depending only on the environment information 112 acquired at the first timing.

It should be noted that, in the embodiment described above, the form example has been described in which the angle adjustment information 108 is stored in the cartridge memory 24, but the technology of the present disclosure is not limited to this. For example, the angle adjustment information 108 may be stored in a part of the magnetic tape MT, in addition to the cartridge memory 24 or instead of the cartridge memory 24. In this case, the angle adjustment information 108 can be acquired from the magnetic tape MT. In addition, even in a situation in which the angle adjustment information 108 cannot be read out from the cartridge memory 24, the angle adjustment information 108 can be acquired from the magnetic tape MT.

Figure 26:
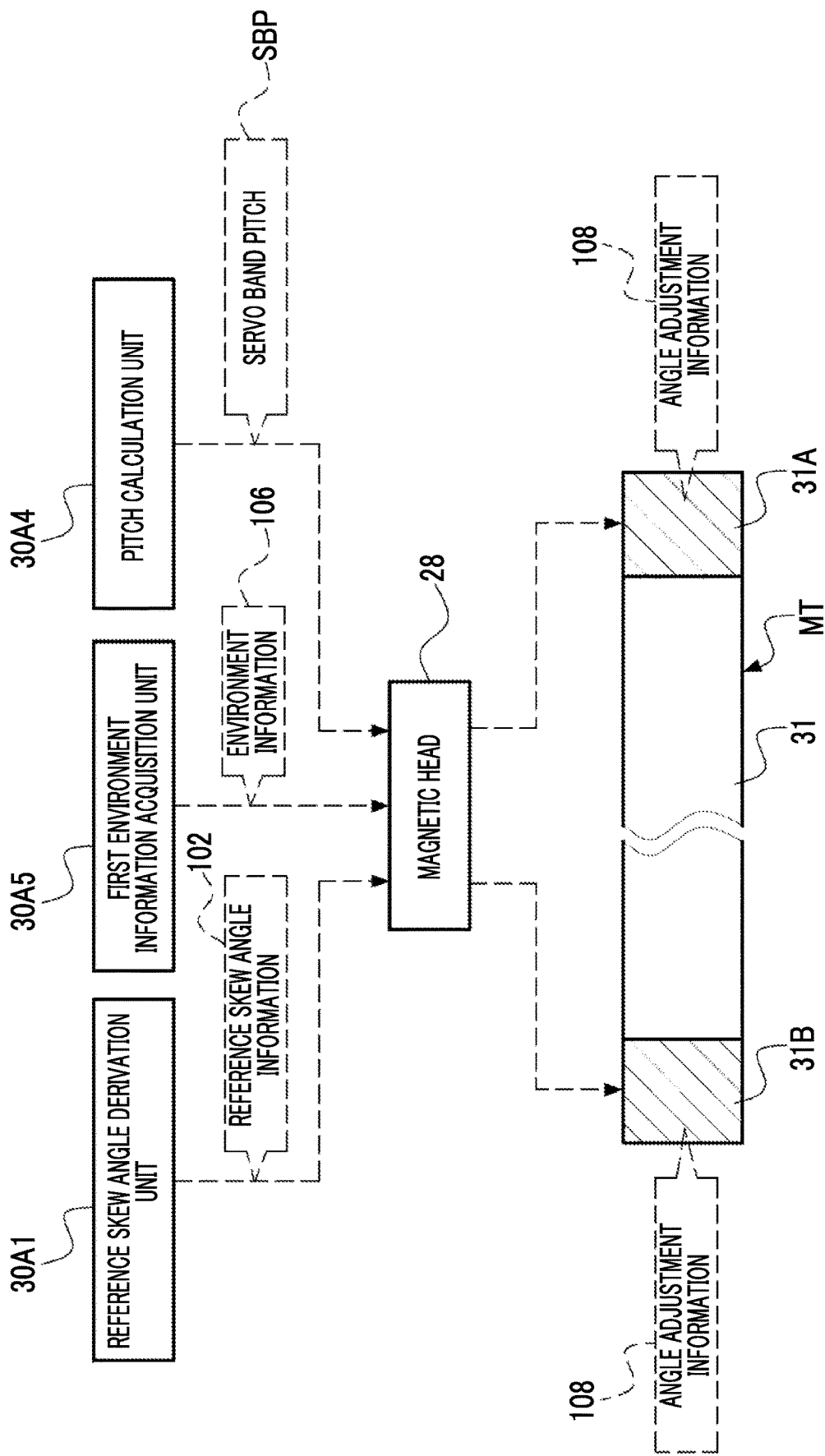
FIG. 26 is a conceptual diagram showing an example of an aspect in which the angle adjustment information is stored in a part of the magnetic tape.

It should be noted that, in a case in which the angle adjustment information 108 is stored in a part of the magnetic tape MT, for example, as shown in FIG. 26, the angle adjustment information 108 need only be stored in the BOT section 31A and/or the EOT section 31B. The BOT section 31A refers to a region provided at the beginning of the magnetic tape MT. The EOT section 31B refers to a region provided at the end of the magnetic tape MT.

In a case in which the angle adjustment information 108 is stored in the BOT section 31A and/or the EOT section 31B, for example, the physical feature information 110 (see FIG. 17) is stored in the BOT section 31A and/or the EOT section 31B in the manufacturing process of the magnetic tape MT or the magnetic tape cartridge 12. The reference skew angle information 102, the environment information 106, and the servo band pitch SBP are recorded in the BOT section 31A and/or the EOT section 31B by the magnetic head 28 at the same timing as the timing at which the reference skew angle information 102, the environment information 106, and the servo band pitch SBP are stored in the cartridge memory 24 in the embodiment described above (that is, a stage before the magnetic processing is performed by the magnetic head 28 on the data band DB of the magnetic tape MT).

In addition, in the embodiment described above, the servo pattern 52 is described as an example, but the servo pattern 52 is merely an example, and the technology of the present disclosure is established even in a case in which other types of servo patterns (that is, servo patterns having the geometrical characteristic different from the geometrical characteristic of the servo pattern 52) are used. In the following first modification example to eighth modification example, an aspect example of the magnetic tape MT in which a servo pattern of a type different from that of the servo pattern 52 is recorded will be described.

First Modification Example

Figure 27:
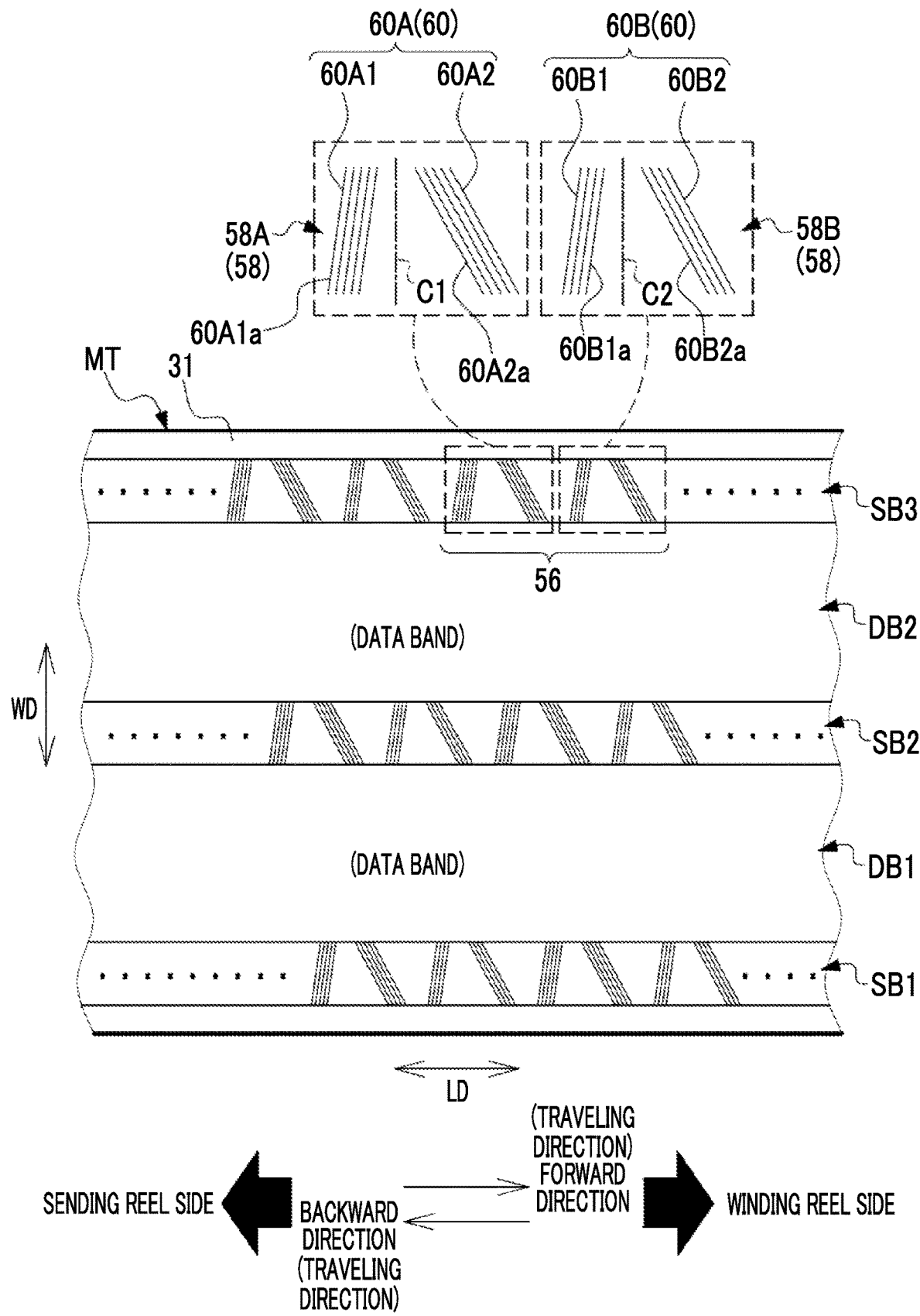
FIG. 27 is a conceptual diagram showing a first modification example, and is a conceptual diagram showing a modification example of the magnetic tape according to the embodiment (conceptual diagram showing an example of an aspect in which the magnetic tape is observed from the front surface side of the magnetic tape)

As shown in FIG. 27 as an example, the magnetic tape MT according to the first modification example is different from the magnetic tape MT shown in FIG. 6 in that a frame 56 is provided instead of the frame 50. The frame 56 is defined by a set of servo patterns 58. A plurality of servo patterns 58 are recorded in the servo band SB along the longitudinal direction LD of the magnetic tape MT. The plurality of servo patterns 58 are disposed at regular intervals along the longitudinal direction LD of the magnetic tape MT, similarly to the plurality of servo patterns 52 recorded in the magnetic tape MT shown in FIG. 6.

In the example shown in FIG. 27, servo patterns 58A and 58B are shown as an example of the set of servo patterns 58 included in the frame 56. The servo patterns 58A and 58B are adjacent to each other along the longitudinal direction LD of the magnetic tape MT, and the servo pattern 58A is positioned on the upstream side in the forward direction and the servo pattern 58B is positioned on the downstream side in the forward direction in the frame 56.

The servo pattern 58 consists of a linear magnetization region pair 60. The linear magnetization region pair 60 is classified into a linear magnetization region pair 60A and a linear magnetization region pair 60B.

The servo pattern 58A consists of the linear magnetization region pair 60A. In the example shown in FIG. 27, a pair of linear magnetization regions 60A1 and 60A2 is shown as an example of the linear magnetization region pair 60A. Each of the linear magnetization regions 60A1 and 60A2 is a linearly magnetized region.

The linear magnetization regions 60A1 and 60A2 are inclined in opposite directions with respect to the imaginary straight line C1. The linear magnetization regions 60A1 and 60A2 are not parallel to each other and are inclined at different angles with respect to the imaginary straight line C1. The linear magnetization region 60A1 has a steeper inclined angle with respect to the imaginary straight line C1 than the linear magnetization region 60A2. Here, "steep" means that, for example, an angle of the linear magnetization region 60A1 with respect to the imaginary straight line C1 is smaller than an angle of the linear magnetization region 60A2 with respect to the imaginary straight line C1. In addition, a total length of the linear magnetization region 60A1 is shorter than a total length of the linear magnetization region 60A2.

In the servo pattern 58A, a plurality of magnetization straight lines 60A1a are included in the linear magnetization region 60A1, and a plurality of magnetization straight lines 60A2a are included in the linear magnetization region 60A2. The number of the magnetization straight lines 60A1a included in the linear magnetization region 60A1 is the same as the number of the magnetization straight lines 60A2a included in the linear magnetization region 60A2.

The linear magnetization region 60A1 is a set of magnetization straight lines 60A1a, which are five magnetized straight lines, and the linear magnetization region 60A2 is a set of magnetization straight lines 60A2a, which are five magnetized straight lines. In the servo band SB, the positions of both ends of the linear magnetization region 60A1 (that is, the positions of both ends of each of the five magnetization straight lines 60A1a) and the positions of both ends of the linear magnetization region 60A2 (that is, the positions of both ends of each of the five magnetization straight lines 60A2a) are aligned in the width direction WD. It should be noted that, here, the example has been described in which the positions of both ends of each of the five magnetization straight lines 60A1a and the positions of both ends of each of the five magnetization straight lines 60A2a are aligned, but this is merely an example, and the positions of both ends of one or more magnetization straight lines 60A1a among the five magnetization straight lines 60A1a and the positions of both ends of one or more magnetization straight lines 60A2a among the five magnetization straight lines 60A2a need only be aligned. In addition, in the present embodiment, the concept of "aligned" also includes meaning of "aligned" including an error generally allowed in the technical field to which the technology of the present disclosure belongs, which is the error to the extent that it does not contradict the purpose of the technology of the present disclosure, in addition to the meaning of being exactly aligned.

The servo pattern 58B consists of the linear magnetization region pair 60B. In the example shown in FIG. 27, a pair of linear magnetization regions 60B1 and 60B2 is shown as an example of the linear magnetization region pair 60B. Each of the linear magnetization regions 60B1 and 60B2 is a linearly magnetized region.

The linear magnetization regions 60B1 and 60B2 are inclined in opposite directions with respect to the imaginary straight line C2. The linear magnetization regions 60B1 and 60B2 are not parallel to each other and are inclined at different angles with respect to the imaginary straight line C2. The linear magnetization region 60B1 has a steeper inclined angle with respect to the imaginary straight line C2 than the linear magnetization region 60B2. Here, "steep" means that, for example, an angle of the linear magnetization region 60B1 with respect to the imaginary straight line C2 is smaller than an angle of the linear magnetization region 60B2 with respect to the imaginary straight line C2. In addition, a total length of the linear magnetization region 60B1 is shorter than a total length of the linear magnetization region 60B2.

In the servo pattern 58B, a plurality of magnetization straight lines 60B1a are included in the linear magnetization region 60B1, and a plurality of magnetization straight lines 60B2a are included in the linear magnetization region 60B2. The number of the magnetization straight lines 60B1a included in the linear magnetization region 60B1 is the same as the number of the magnetization straight lines 60B2a included in the linear magnetization region 60B2.

The total number of the magnetization straight lines 60B1a and 60B2a included in the servo pattern 58B is different from the total number of the magnetization straight lines 60A1a and 60A2a included in the servo pattern 58A. In the example shown in FIG. 27, the total number of the magnetization straight lines 60A1a and 60A2a included in the servo pattern 58A is ten, whereas the total number of the magnetization straight lines 60B1a and 60B2a included in the servo pattern 58B is eight.

The linear magnetization region 60B1 is a set of magnetization straight lines 60B1a, which are four magnetized straight lines, and the linear magnetization region 60B2 is a set of magnetization straight lines 60B2a, which are four magnetized straight lines. In the servo band SB, the positions of both ends of the linear magnetization region 60B1 (that is, the positions of both ends of each of the four magnetization straight lines 60B1a) and the positions of both ends of the linear magnetization region 60B2 (that is, the positions of both ends of each of the four magnetization straight lines 60B2a) are aligned in the width direction WD.

It should be noted that, here, the example has been described in which the positions of both ends of each of the four magnetization straight lines 60B1a and the positions of both ends of each of the four magnetization straight lines 60B2a are aligned, but this is merely an example, and the positions of both ends of one or more magnetization straight lines 60B1a among the four magnetization straight lines 60B1a and the positions of both ends of one or more magnetization straight lines 60B2a among of the four magnetization straight lines 60B2a need only be aligned.

In addition, here, the set of magnetization straight lines 60A1a, which are five magnetized straight lines, is described as an example of the linear magnetization region 60A1, the set of magnetization straight lines 60A2a, which are five magnetized straight lines, is described as an example of the linear magnetization region 60A2, the set of magnetization straight lines 60B1a, which are four magnetized straight lines, is described as an example of the linear magnetization region 60B1, and the set of magnetization straight lines 60B2a, which are four magnetized straight lines, is described as an example of the linear magnetization region 60B2, but the technology of the present disclosure is not limited thereto. For example, the linear magnetization region 60A1 need only have the number of the magnetization straight lines 60A1a that contribute to specifying the position of the magnetic head 28 on the magnetic tape MT, the linear magnetization region 60A2 need only have the number of the magnetization straight lines 60A2a that contribute to specifying the position of the magnetic head 28 on the magnetic tape MT, the linear magnetization region 60B1 need only have the number of the magnetization straight lines 60B1a that contribute to specifying the position of the magnetic head 28 on the magnetic tape MT, and the linear magnetization region 60B2 need only have the number of the magnetization straight lines 60B2a that contribute to specifying the position of the magnetic head 28 on the magnetic tape MT.

Here, the geometrical characteristic of the linear magnetization region pair 60A on the magnetic tape MT will be described with reference to FIG. 28.

Figure 28:
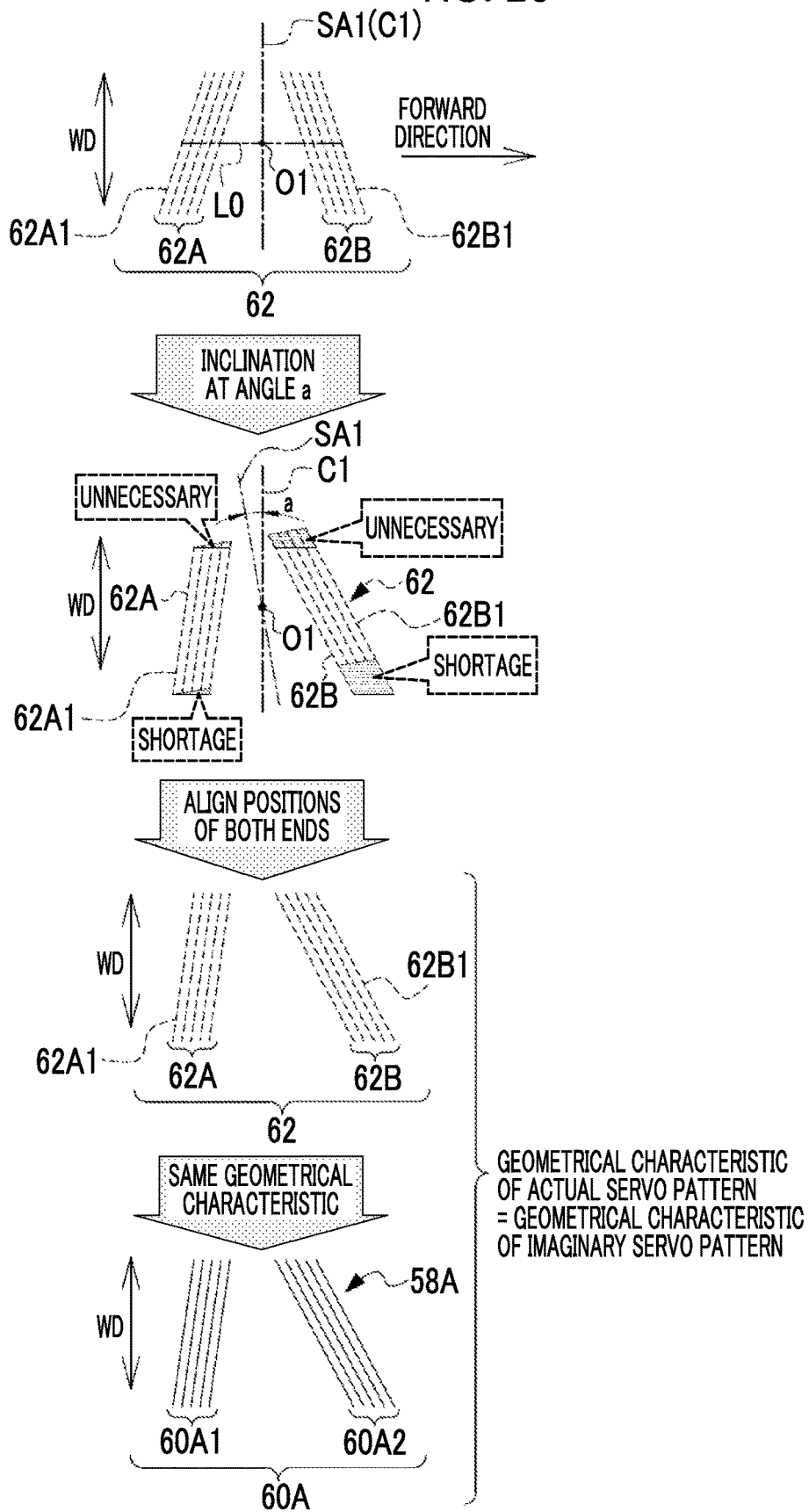
FIG. 28 is a conceptual diagram showing the first modification example, and is a conceptual diagram showing a relationship between a geometrical characteristic of an actual servo pattern and a geometrical characteristic of an imaginary servo pattern.

As an example, as shown in FIG. 28, the geometrical characteristic of the linear magnetization region pair 60A on the magnetic tape MT can be expressed by using an imaginary linear region pair 62. The imaginary linear region pair 62 consists of an imaginary linear region 62A and an imaginary linear region 62B. The geometrical characteristic of the linear magnetization region pair 60A on the magnetic tape MT corresponds to the geometrical characteristic based on the imaginary linear region pair 62 inclined line-symmetrically with respect to the imaginary straight line C1 in a case in which an entirety of the imaginary linear region pair 62 is inclined with respect to the imaginary straight line C1 by inclining a symmetry axis SA1 of the imaginary linear region 62A and the imaginary linear region 62B with respect to the imaginary straight line C1.

The imaginary linear region pair 62 is an imaginary linear magnetization region pair having the same geometrical characteristic as the linear magnetization region pair 54A shown in FIG. 6. The imaginary linear region pair 62 is an imaginary magnetization region used for convenience for describing the geometrical characteristic of the linear magnetization region pair 60A on the magnetic tape MT, and is not an actually present magnetization region.

The imaginary linear region 62A has the same geometrical characteristic as the linear magnetization region 54A1 shown in FIG. 6, and consists of five imaginary straight lines 62A1 corresponding to the five magnetization straight lines 54A1a shown in FIG. 6. The imaginary linear region 62B has the same geometrical characteristic as the linear magnetization region 54B1 shown in FIG. 6, and consists of five imaginary straight lines 62B1 corresponding to the five magnetization straight lines 54A2a shown in FIG. 6.

A center O1 is provided in the imaginary linear region pair 62. For example, the center O1 is a center of a line segment L0 connecting a center of the straight line 62A1 positioned on the most upstream side of the five straight lines 62A1 in the forward direction and a center of the straight line 62B1 positioned on the most downstream side of the five straight lines 62B1 in the forward direction.

Since the imaginary linear region pair 62 has the same geometrical characteristic as the linear magnetization region pair 54A shown in FIG. 6, the imaginary linear region 62A and the imaginary linear region 62B are inclined line-symmetrically with respect to the imaginary straight line C1. Here, a case will be considered in which reading by the servo reading element SR is performed tentatively with respect to the imaginary linear region pair 62 in a case in which the entirety of the imaginary linear region pair 62 is inclined with respect to the imaginary straight line C1 by inclining the symmetry axis SA1 of the imaginary linear regions 62A and 62B at an angle α (for example, 10 degrees) with respect to the imaginary straight line C1 with the center O1 as the rotation axis. In this case, in the imaginary linear region pair 62, in the width direction WD, a portion is generated in which the imaginary linear region 62A is read but the imaginary linear region 62B is not read or the imaginary linear region 62A is not read is read but the imaginary linear region 62B. That is, in each of the imaginary linear regions 62A and 62B, in a case in which reading by the servo reading element SR is performed, a shortage part and an unnecessary part are generated.

Therefore, by compensating for the shortage part and removing the unnecessary part, the positions of both ends of the imaginary linear region 62A (that is, the positions of both ends of each of the five straight lines 62A1) and the positions of both ends of the imaginary linear region 62B (that is, the positions of both ends of each of the five straight lines 62B1) are aligned in the width direction WD.

The geometrical characteristic of the imaginary linear region pair 62 (that is, the geometrical characteristic of the imaginary servo pattern) obtained as described above corresponds to the geometrical characteristic of the actual servo pattern 58A. That is, the linear magnetization region pair 60A having the geometrical characteristic corresponding to the geometrical characteristic of the imaginary linear region pair 62 obtained by aligning the positions of both ends of the imaginary linear region 62A and the positions of both ends of the imaginary linear region 62B in the width direction WD is recorded in the servo band SB.

It should be noted that the linear magnetization region pair 60B is different from the linear magnetization region pair 60A only in that the four magnetization straight lines 60B1a are provided instead of the five magnetization straight lines 60A1a and the four magnetization straight lines 60B2a are provided instead of the five magnetization straight lines 60A2a. Therefore, the linear magnetization region pair 60B having the geometrical characteristic corresponding to the geometrical characteristic of the imaginary linear region pair (not shown) obtained by aligning the positions of both ends of each of the four straight lines 62A1 and the positions of both ends of each of the four straight lines 62B1 in the width direction WD is recorded in the servo band SB.

Figure 29:
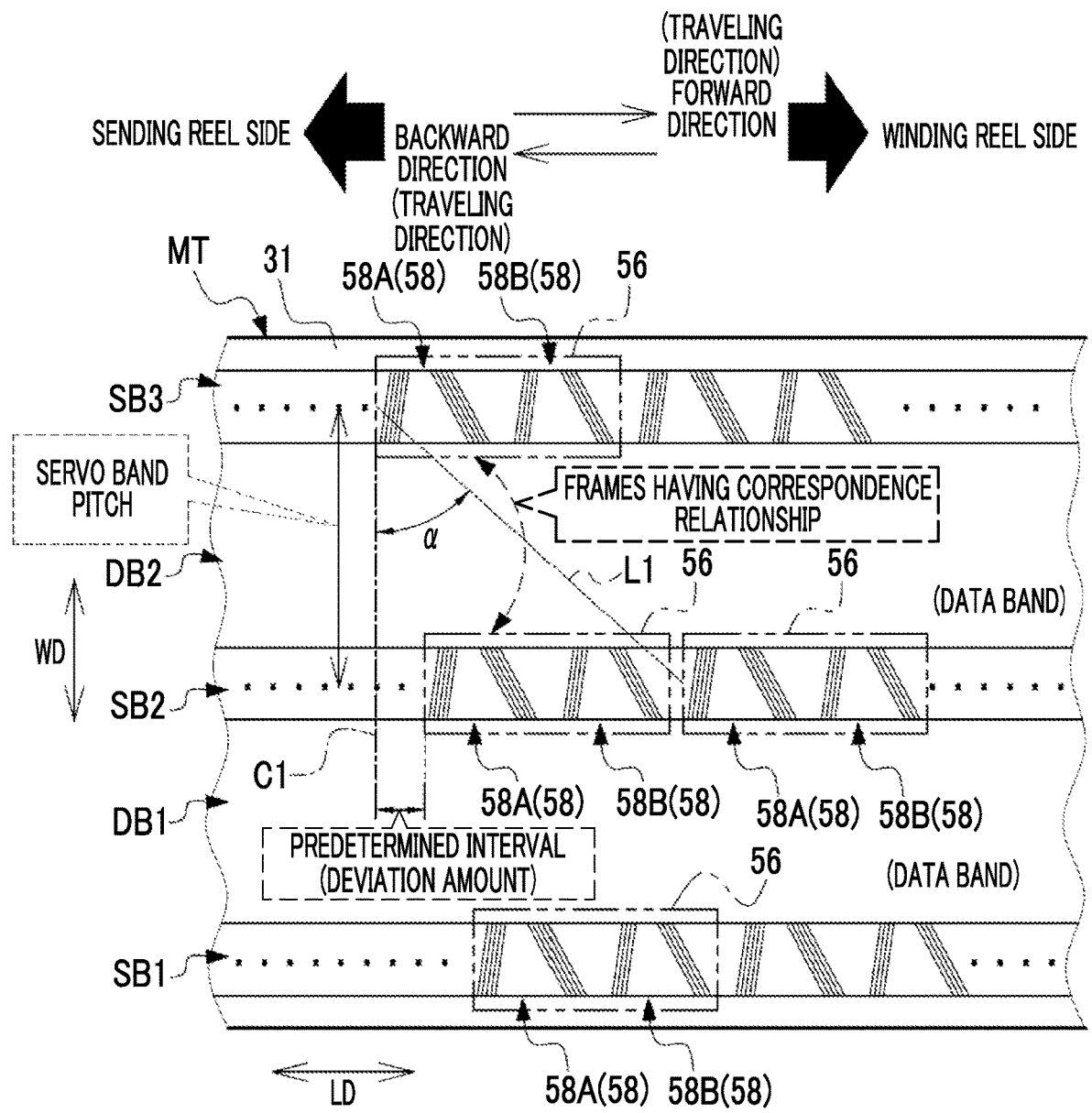
FIG. 29 is a conceptual diagram showing the first modification example, and is a conceptual diagram showing an example of an aspect in which a state in which frames corresponding to each other between the servo bands adjacent to each other in a width direction of the magnetic tape according to the embodiment deviate from each other at a predetermined interval is observed from the front surface side of the magnetic tape.

As an example, as shown in FIG. 29, the plurality of servo bands SB are formed on the magnetic tape MT in the width direction WD, and the frames 56 having a correspondence relationship between the servo bands SB deviate from each other at predetermined intervals in the longitudinal direction LD, between the servo bands SB adjacent to each other in the width direction WD of the magnetic tape MT. This means that the servo patterns 58 having a correspondence relationship between the servo bands SB deviate from each other at the predetermined interval in the longitudinal direction LD between the servo bands SB adjacent to each other in the width direction WD of the magnetic tape MT.

The predetermined interval is defined based on an angle α, a pitch between the servo bands SB adjacent to each other in the width direction WD (hereinafter, also referred to as "servo band pitch"), and a frame length. In the example shown in FIG. 29, the angle α is exaggerated in order to make it easier to visually grasp the angle α, but in reality, the angle α is, for example, about 15 degrees. The angle α is an angle formed by the frames 56 having no correspondence relationship between the servo bands SB adjacent to each other in the width direction WD and the imaginary straight line C1. In the example shown in FIG. 29, as an example of the angle α, an angle formed by an interval (in the example shown in FIG. 29, a line segment L1) between one frame 56 of a pair of frames 56 having the correspondence relationship between the servo bands SB adjacent to each other in the width direction WD (in the example shown in FIG. 29, one frame 56 of the servo band SB3) and the frame 56 adjacent to the other frame 56 of the pair of frames 56 (in the example shown in FIG. 29, the frame 56 having the correspondence relationship with one frame 56 of the servo band SB3 among a plurality of frames 56 in the servo band SB2), and the imaginary straight line C1 is shown. In this case, the frame length refers to the total length of the frame 56 with respect to the longitudinal direction LD of the magnetic tape MT. The predetermined interval is defined by Expression (1). It should be noted that Mod (A/B) means a remainder generated in a case in which "A" is divided by "B".

$$\text{(Predetermined interval)} = \text{Mod}\{(\text{Servo band pitch} \times \tan \alpha)/(\text{Frame length})\} \quad (1)$$

It should be noted that, in the example shown in FIG. 29, the angle formed by the interval between one frame 56 of the pair of frames 56 having the correspondence relationship between the servo bands SB adjacent to each other in the width direction WD (hereinafter, also referred to as "first frame") and the frame 56 adjacent to the other frame 56 of the pair of frames 56 (hereinafter, also referred to as "second frame"), and the imaginary straight line C1 has been described as the angle α, but the technology of the present disclosure is not limited to this. For example, as the angle α, an angle formed by an interval between the first frame and the frame 56 away from the second frame by two or more frames (hereinafter, also referred to as "third frame") in the same servo band SB as the second frame, and the imaginary straight line C1 may be used. In this case, the "frame length" used in Expression (1) is the pitch between the second frame and the third frame in the longitudinal direction LD of the magnetic tape MT (for example, a distance from the distal end of the second frame to the distal end of the third frame).

Figure 30:
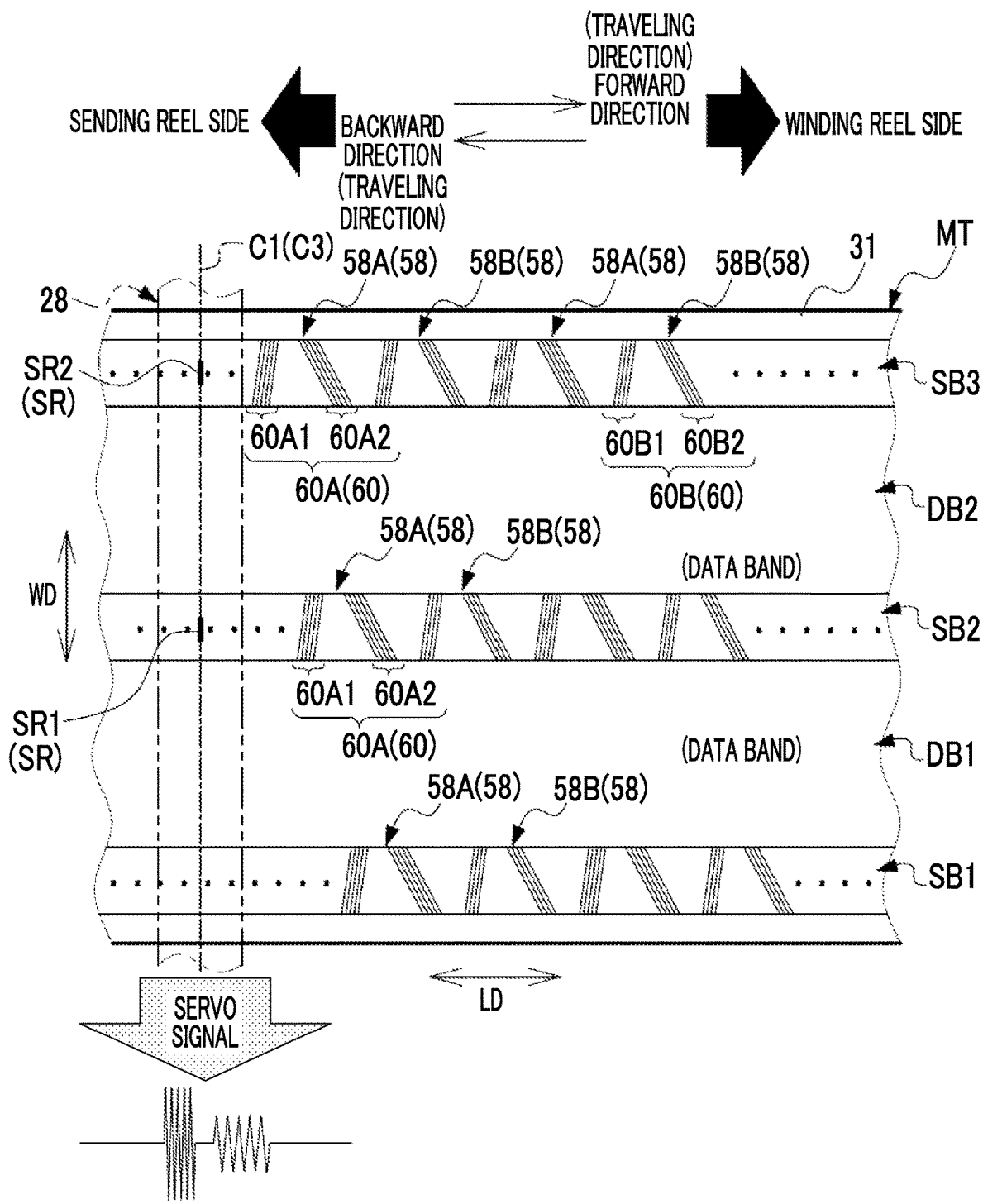
FIG. 30 is a conceptual diagram showing the first modification example, and is a conceptual diagram showing an example of an aspect in which a state in which the servo pattern is read by a servo reading element provided in the magnetic head that is not skewed on the magnetic tape according to the embodiment is observed from the front surface side of the magnetic tape.

As an example, as shown in FIG. 30, in a case in which the servo pattern 58A (that is, the linear magnetization region pair 60A) is read by the servo reading element SR in a state in which the direction of the imaginary straight line C1 and the direction of the imaginary straight line C3 match (that is, a state in which the longitudinal direction of the magnetic head 28 and the width direction WD match), the variation due to the azimuth loss occurs between the servo pattern signal derived from the linear magnetization region 60A1 and the servo pattern signal derived from the linear magnetization region 60A2. In addition, also in a case in which the servo pattern 58B (that is, the linear magnetization region pair 60B) is read by the servo reading element SR in a state in which the direction of the imaginary straight line C1 and the direction of the imaginary straight line C3 match (that is, a state in which the longitudinal direction of the magnetic head 28 and the width direction WD match), a similar phenomenon occurs.

Figure 31:
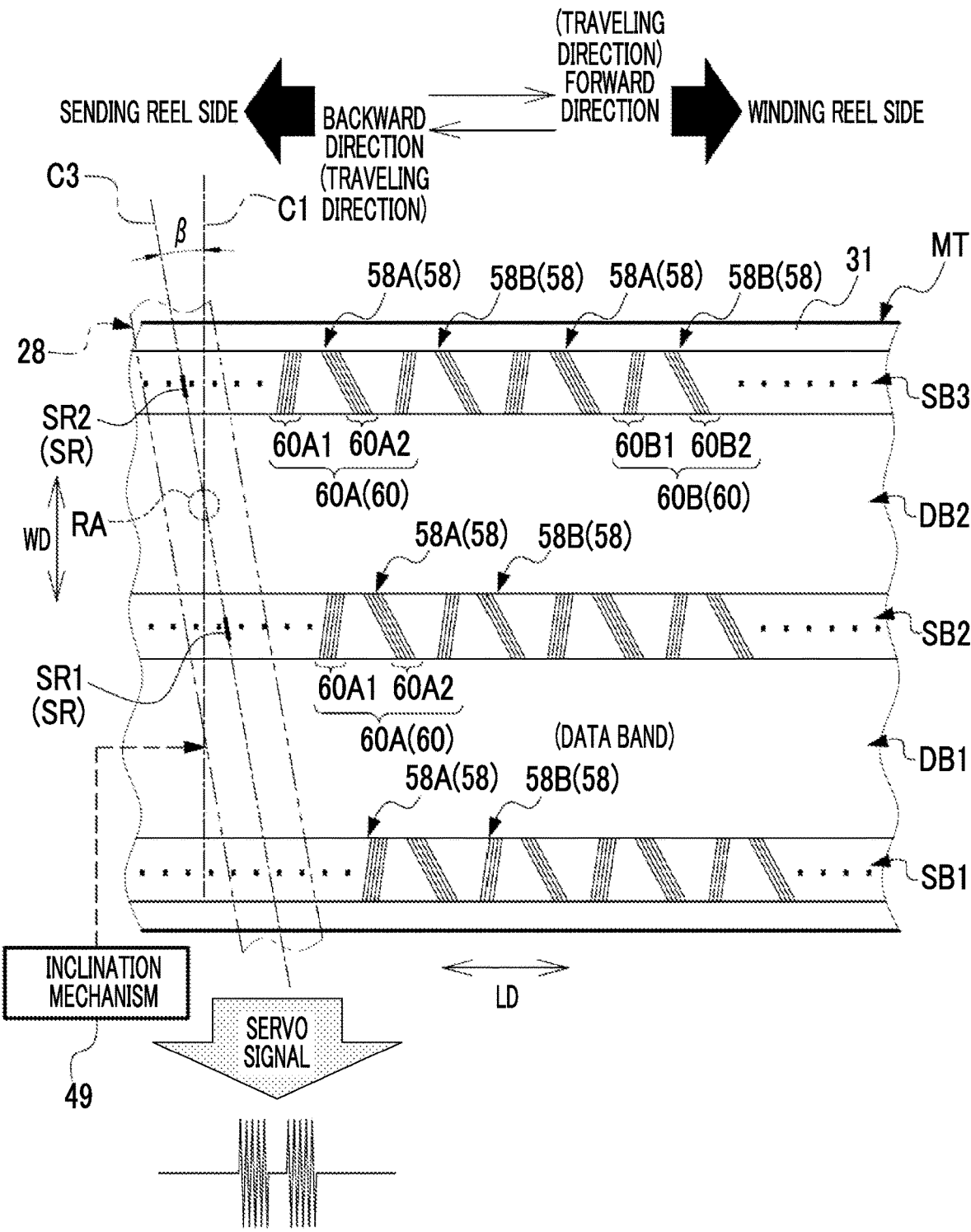
FIG. 31 is a conceptual diagram showing the first modification example, and is a conceptual diagram showing an example of an aspect in which a state in which the servo pattern is read by the servo reading element provided in the magnetic head that is skewed on the magnetic tape according to the embodiment is observed from the front surface side of the magnetic tape.

Therefore, as an example, as shown in FIG. 31, the inclination mechanism 49 skews the magnetic head 28 on the magnetic tape MT around the rotation axis RA such that the imaginary straight line C3 is inclined with respect to the imaginary straight line C1 to the upstream side in the forward direction at an angle β (that is, the angle β counterclockwise as viewed from the paper surface side of FIG. 31). As described above, since the magnetic head 28 is inclined to the upstream side in the forward direction at the angle β on the magnetic tape MT, the variation due to the azimuth loss between the servo pattern signal derived from the linear magnetization region 60A1 and the servo pattern signal derived from the linear magnetization region 60A2 is smaller than that in the example shown in FIG. 30. In addition, also in a case in which the servo pattern 58B (that is, the linear magnetization region pair 60B) is read by the servo reading element SR, similarly, the variation due to the azimuth loss between the servo pattern signal derived from the linear magnetization region 60B1 and the servo pattern signal derived from the linear magnetization region 60B2 is small.

Second Modification Example

Figure 32:
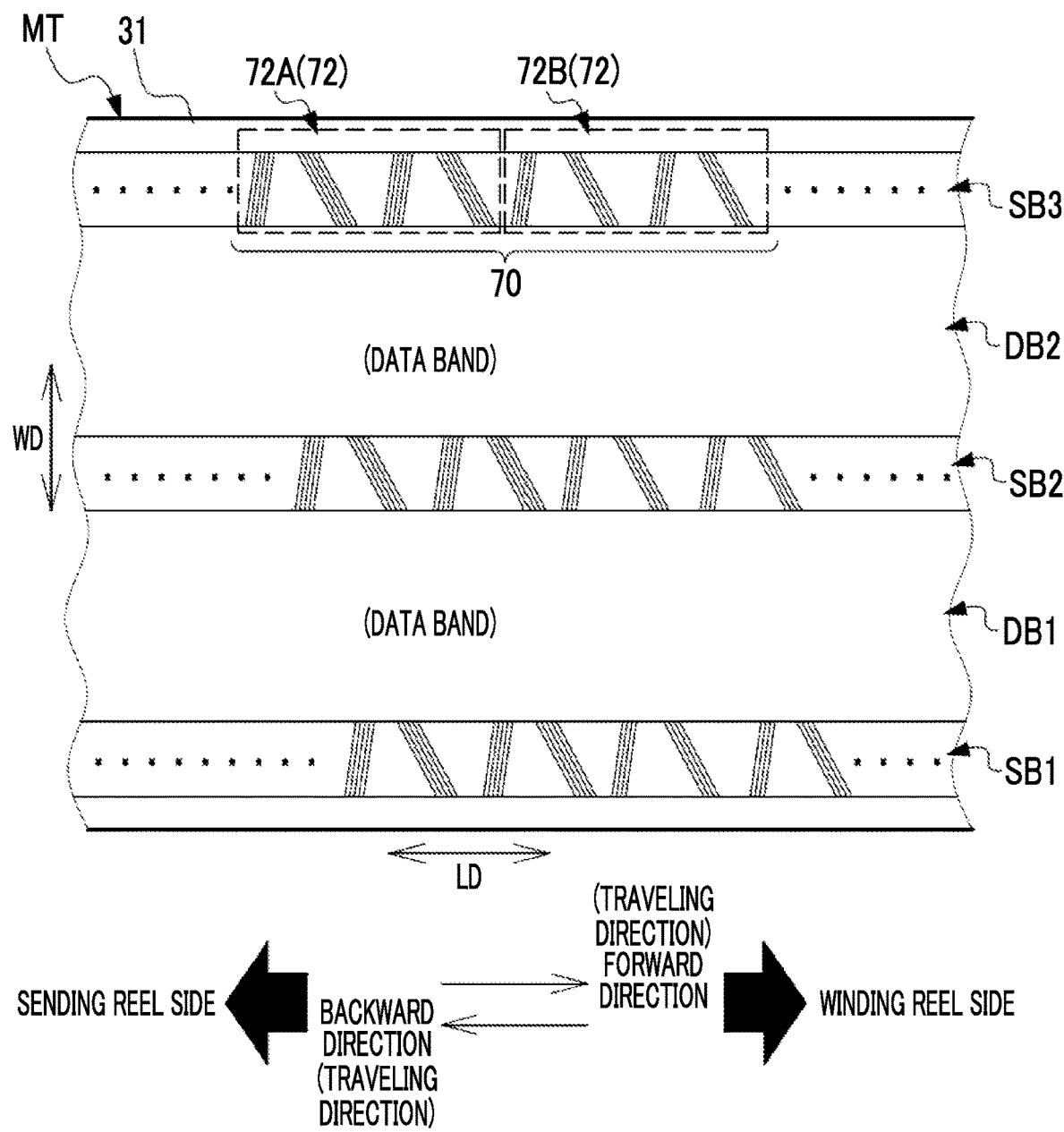
FIG. 32 is a conceptual diagram showing a second modification example, and is a conceptual diagram showing a modification example of the magnetic tape according to the embodiment (conceptual diagram showing an example of an aspect in which the magnetic tape is observed from the front surface side of the magnetic tape)

It should be noted that, in the first modification example described above, the form example has been described in which the servo band SB is divided by the plurality of frames 56 along the longitudinal direction LD of the magnetic tape MT, but the technology of the present disclosure is not limited to this. For example, as shown in FIG. 32, the servo band SB may be divided by a frame 70 along the longitudinal direction LD of the magnetic tape MT. The frame 70 is defined by a set of servo patterns 72. A plurality of servo patterns 72 are recorded in the servo band SB along the longitudinal direction LD of the magnetic tape MT. The plurality of servo patterns 72 are disposed at regular intervals along the longitudinal direction LD of the magnetic tape MT, similarly to the plurality of servo patterns 58.

In the example shown in FIG. 32, a pair of servo patterns 72A and 72B is shown as an example of the set of servo patterns 72. Each of the servo patterns 72A and 72B is an M-shaped magnetized servo pattern. The servo patterns 72A and 72B are adjacent to each other along the longitudinal direction LD of the magnetic tape MT, and the servo pattern 72A is positioned on the upstream side in the forward direction and the servo pattern 72B is positioned on the downstream side in the forward direction in the frame 70.

Figure 33:
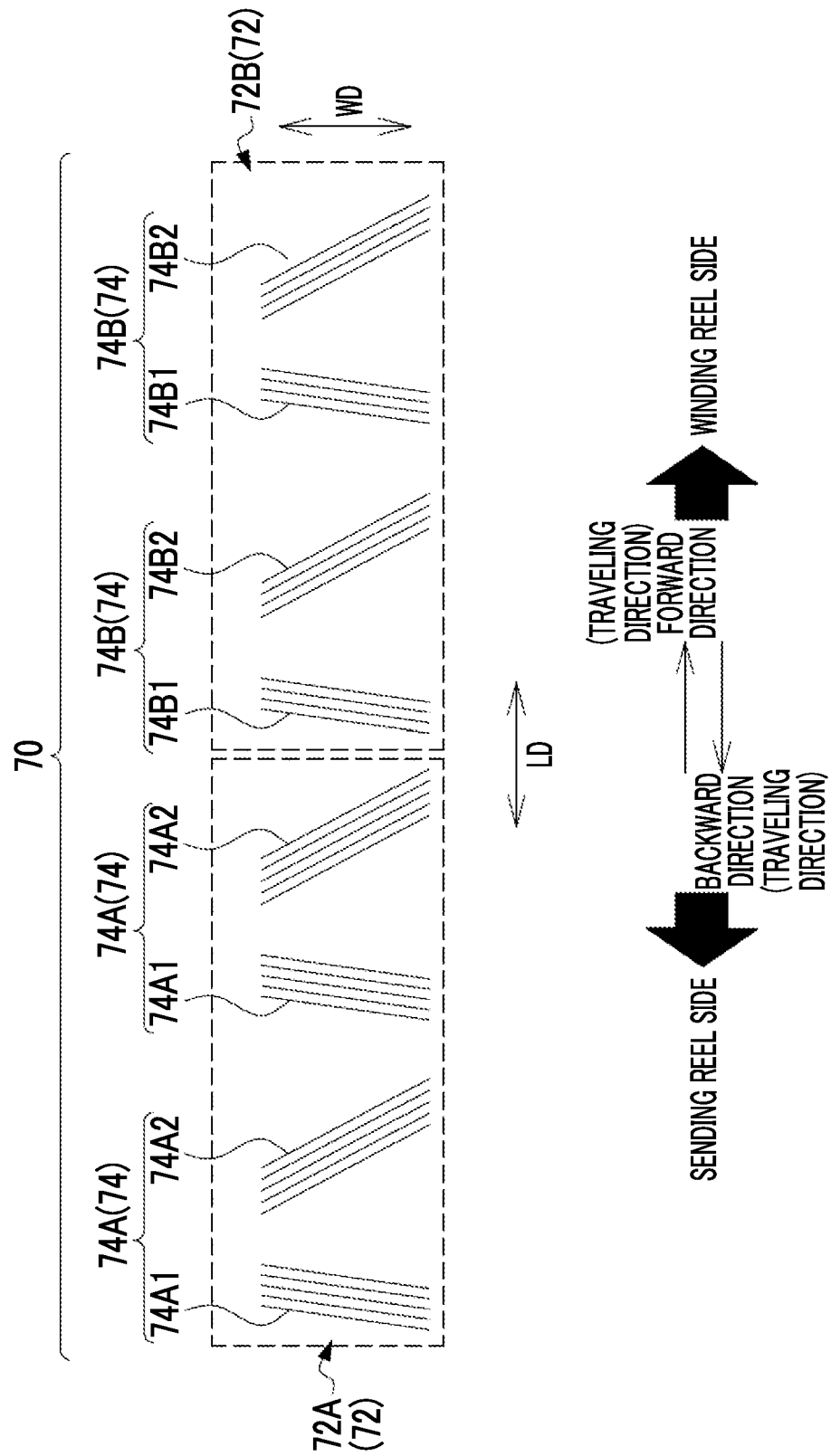
FIG. 33 is a conceptual diagram showing the second modification example, and is a conceptual diagram showing an example of an aspect of the servo pattern included in the magnetic tape.

As an example, as shown in FIG. 33, the servo pattern 72 consists of a linear magnetization region pair 74. The linear magnetization region pair 74 is classified into a linear magnetization region pair 74A and a linear magnetization region pair 74B.

The servo pattern 72A consists of a set of linear magnetization region pairs 74A. The set of linear magnetization region pairs 74A are disposed in a state of being adjacent to each other along the longitudinal direction LD of the magnetic tape MT.

In the example shown in FIG. 33, a pair of linear magnetization regions 74A1 and 74A2 is shown as an example of the linear magnetization region pair 74A. The linear magnetization region pair 74A is configured in the same manner as the linear magnetization region pair 60A described in the above first modification example, and has the same geometrical characteristic as the linear magnetization region pair 60A. That is, the linear magnetization region 74A1 is configured in the same manner as the linear magnetization region 60A1 described in the above first modification example, and has the same geometrical characteristic as the linear magnetization region 60A1, and the linear magnetization region 74A2 is configured in the same manner as the linear magnetization region 60A2 described in the above first modification example, and has the same geometrical characteristic as the linear magnetization region 60A2.

The servo pattern 72B consists of a set of linear magnetization region pairs 74B. The set of linear magnetization region pairs 74B are disposed in a state of being adjacent to each other along the longitudinal direction LD of the magnetic tape MT.

In the example shown in FIG. 33, a pair of linear magnetization regions 74B1 and 74B2 is shown as an example of the linear magnetization region pair 74B. The linear magnetization region pair 74B is configured in the same manner as the linear magnetization region pair 60B described in the above first modification example, and has the same geometrical characteristic as the linear magnetization region pair 60B. That is, the linear magnetization region 74B1 is configured in the same manner as the linear magnetization region 60B1 described in the above first modification example, and has the same geometrical characteristic as the linear magnetization region 60B1, and the linear magnetization region 74B2 is configured in the same manner as the linear magnetization region 60B2 described in the above first modification example, and has the same geometrical characteristic as the linear magnetization region 60B2.

Third Modification Example

Figure 34:
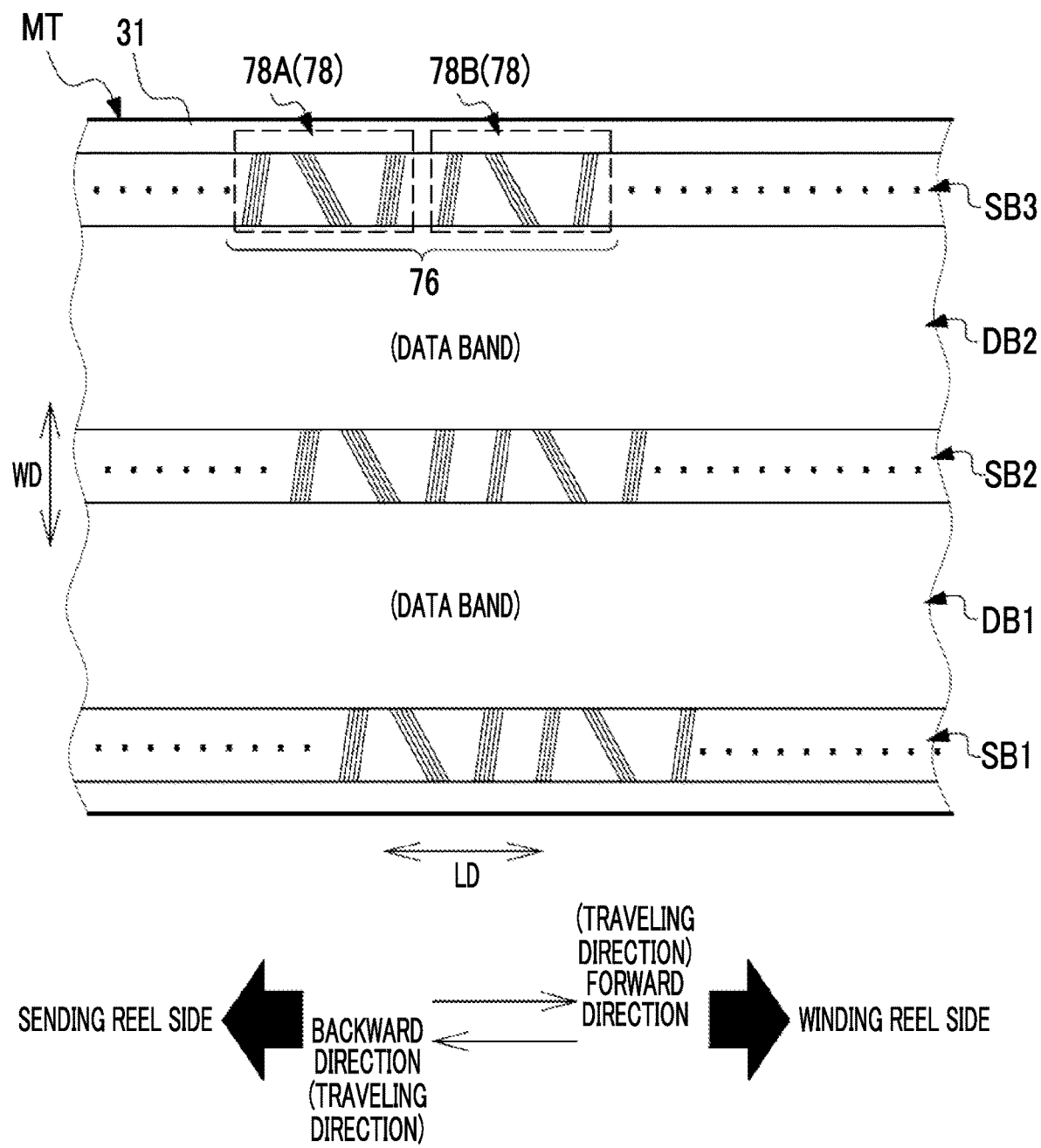
FIG. 34 is a conceptual diagram showing a third modification example, and is a conceptual diagram showing a modification example of the magnetic tape according to the embodiment (conceptual diagram showing an example of an aspect in which the magnetic tape is observed from the front surface side of the magnetic tape)

In the example shown in FIG. 32, the form example has been described in which the servo band SB is divided by a plurality of frames 70 along the longitudinal direction LD of the magnetic tape MT, but the technology of the present disclosure is not limited to this. For example, as shown in FIG. 34, the servo band SB may be divided by a frame 76 along the longitudinal direction LD of the magnetic tape MT. The frame 76 is defined by a set of servo patterns 78. A plurality of servo patterns 78 are recorded in the servo band SB along the longitudinal direction LD of the magnetic tape MT. Similarly to the plurality of servo patterns 72 (see FIG. 32), the plurality of servo patterns 78 are disposed at regular intervals along the longitudinal direction LD of the magnetic tape MT.

In the example shown in FIG. 34, servo patterns 78A and 78B are shown as an example of the set of servo patterns 78. Each of the servo patterns 78A and 78B is an N-shaped magnetized servo pattern. The servo patterns 78A and 78B are adjacent to each other along the longitudinal direction LD of the magnetic tape MT, and the servo pattern 78A is positioned on the upstream side in the forward direction and the servo pattern 78B is positioned on the downstream side in the forward direction in the frame 76.

Figure 35:
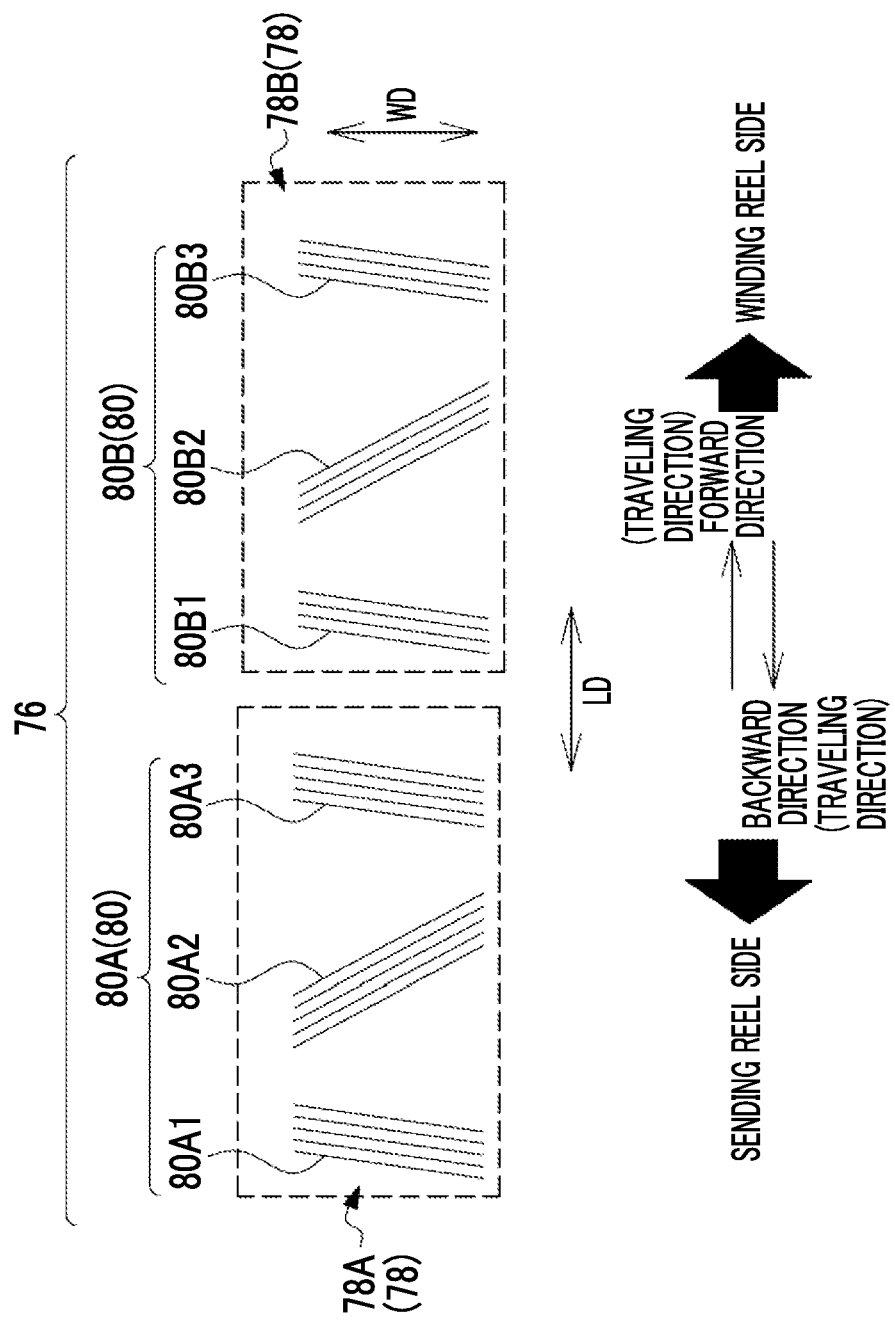
FIG. 35 is a conceptual diagram showing the third modification example, and is a conceptual diagram showing an example of an aspect of the servo pattern included in the magnetic tape.

As an example, as shown in FIG. 35, the servo pattern 78 consists of a linear magnetization region group 80. The linear magnetization region group 80 is classified into a linear magnetization region group 80A and a linear magnetization region group 80B.

The servo pattern 78A consists of the linear magnetization region group 80A. The linear magnetization region group 80A consists of linear magnetization regions 80A1, 80A2, and 80A3. The linear magnetization regions 80A1, 80A2, and 80A3 are disposed in a state of being adjacent to each other along the longitudinal direction LD of the magnetic tape MT. The linear magnetization regions 80A1, 80A2, and 80A3 are disposed in the order of the linear magnetization regions 80A1, 80A2, and 80A3 from the upstream side in the forward direction.

The linear magnetization regions 80A1 and 80A2 are configured in the same manner as the linear magnetization region pair 74A shown in FIG. 33, and have the same geometrical characteristics as the linear magnetization region pair 74A. That is, the linear magnetization region 80A1 is configured in the same manner as the linear magnetization region 74A1 shown in FIG. 33, and have the same geometrical characteristic as the linear magnetization region 74A1, and the linear magnetization region 80A2 is configured in the same manner as the linear magnetization region 74A2 shown in FIG. 33, and have the same geometrical characteristic as the linear magnetization region 74A2. In addition, the linear magnetization region 80A3 is configured in the same manner as the linear magnetization region 80A1, and has the same geometrical characteristic as the linear magnetization region 80A1.

The servo pattern 78B consists of the linear magnetization region group 80B. The linear magnetization region group 80B consists of linear magnetization regions 80B1, 80B2, and 80B3. The linear magnetization regions 80B1, 80B2, and 80B3 are disposed in a state of being adjacent to each other along the longitudinal direction LD of the magnetic tape MT. The linear magnetization regions 80B1, 80B2, and 80B3 are disposed in the order of the linear magnetization regions 80B1, 80B2, and 80B3 from the upstream side in the forward direction.

The linear magnetization regions 80B1 and 80B2 are configured in the same manner as the linear magnetization region pair 74B shown in FIG. 33, and have the same geometrical characteristics as the linear magnetization region pair 74B. That is, the linear magnetization region 80B1 is configured in the same manner as the linear magnetization region 74B1 shown in FIG. 33, and have the same geometrical characteristic as the linear magnetization region 74B1, and the linear magnetization region 80B2 is configured in the same manner as the linear magnetization region 74B2 shown in FIG. 33, and have the same geometrical characteristic as the linear magnetization region 74B2. In addition, the linear magnetization region 80B3 is configured in the same manner as the linear magnetization region 80B1, and has the same geometrical characteristic as the linear magnetization region 80B1.

Fourth Modification Example

Figure 36:
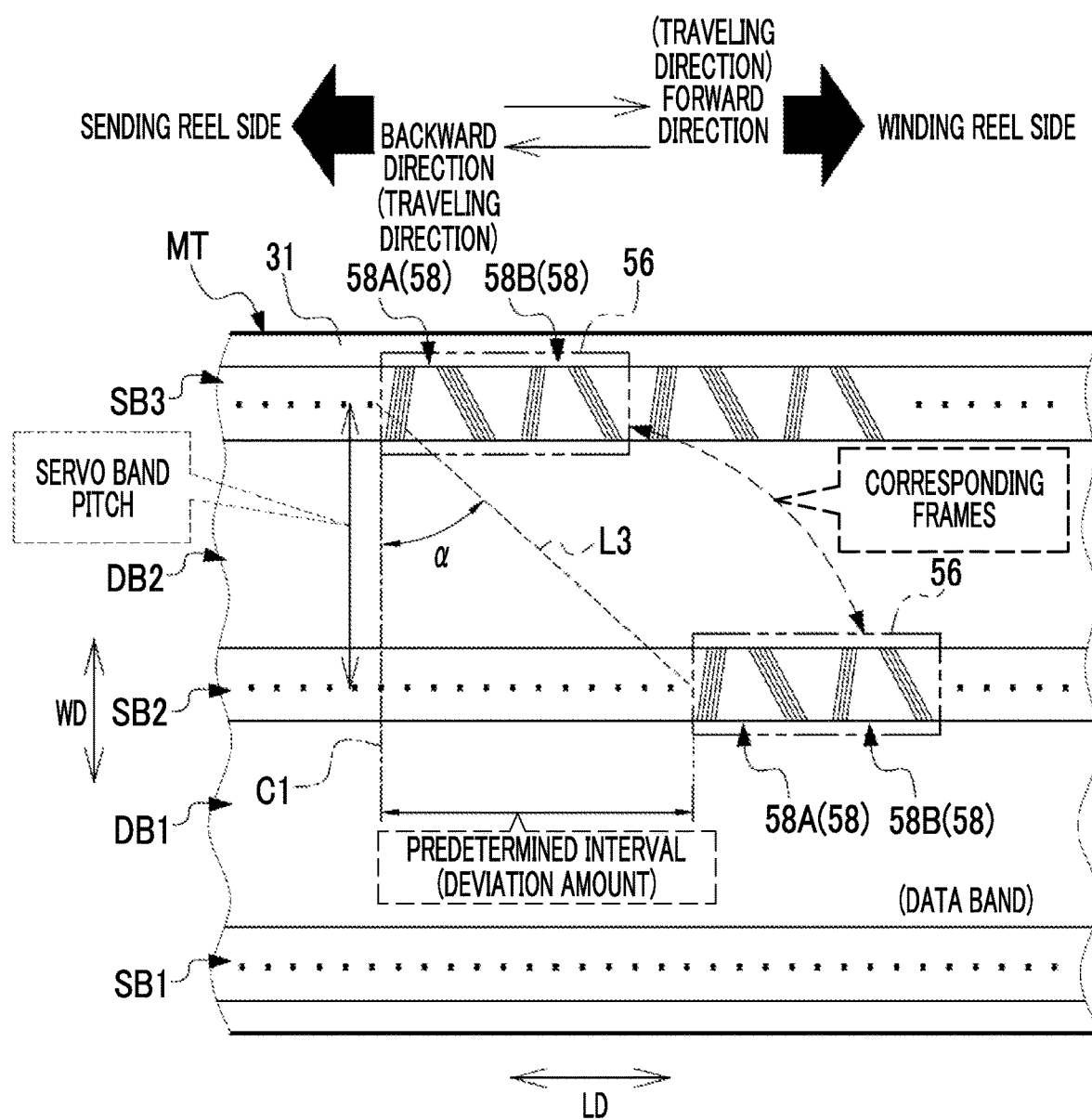
FIG. 36 is a conceptual diagram showing a fourth modification example, and is a conceptual diagram showing an example of an aspect in which a state in which frames corresponding to each other between the servo bands adjacent to each other in the width direction of the magnetic tape according to the embodiment deviate from each other at a predetermined interval is observed from the front surface side of the magnetic tape.

In the first modification example described above, the form example has been described in which the predetermined interval is defined based on the angle α, the servo band pitch, and the frame length, but the technology of the present disclosure is not limited to this, and the predetermined interval may be defined without using the frame length. For example, as shown in FIG. 36, the predetermined interval is defined based on the angle α formed by the interval between the frames 56 having the correspondence relationship between the servo bands SB adjacent to each other in the width direction WD (in the example shown in FIG. 36, a line segment L3) and the imaginary straight line C1, and the pitch between the servo bands SB adjacent to each other in the width direction WD (that is, the servo band pitch). In this case, for example, the predetermined interval is calculated from Expression (2).

$$\text{(Predetermined interval)}=\text{(Servo band pitch)}\times\tan\alpha \quad (2)$$

As described above, Expression (2) does not include the frame length. This means that the predetermined interval is calculated even in a case in which the frame length is not considered. Therefore, with the present configuration, the predetermined interval can be calculated more easily than in a case of calculating the predetermined interval from Expression (1).

Fifth Modification Example

It should be noted that, in the first modification example described above, the form example has been described in which the servo band SB is divided by the plurality of frames 56 along the longitudinal direction LD of the magnetic tape MT, but the technology of the present disclosure is not limited to this. For example, as shown in FIG. 37, the servo band SB may be divided by a frame 82 along the longitudinal direction LD of the magnetic tape MT.

The frame 82 is defined by a set of servo patterns 84. A plurality of servo patterns 84 are recorded in the servo band SB along the longitudinal direction LD of the magnetic tape MT. The plurality of servo patterns 84 are disposed at regular intervals along the longitudinal direction LD of the magnetic tape MT, similarly to the plurality of servo patterns 52 (see FIG. 6) recorded in the magnetic tape MT.

Figure 37:
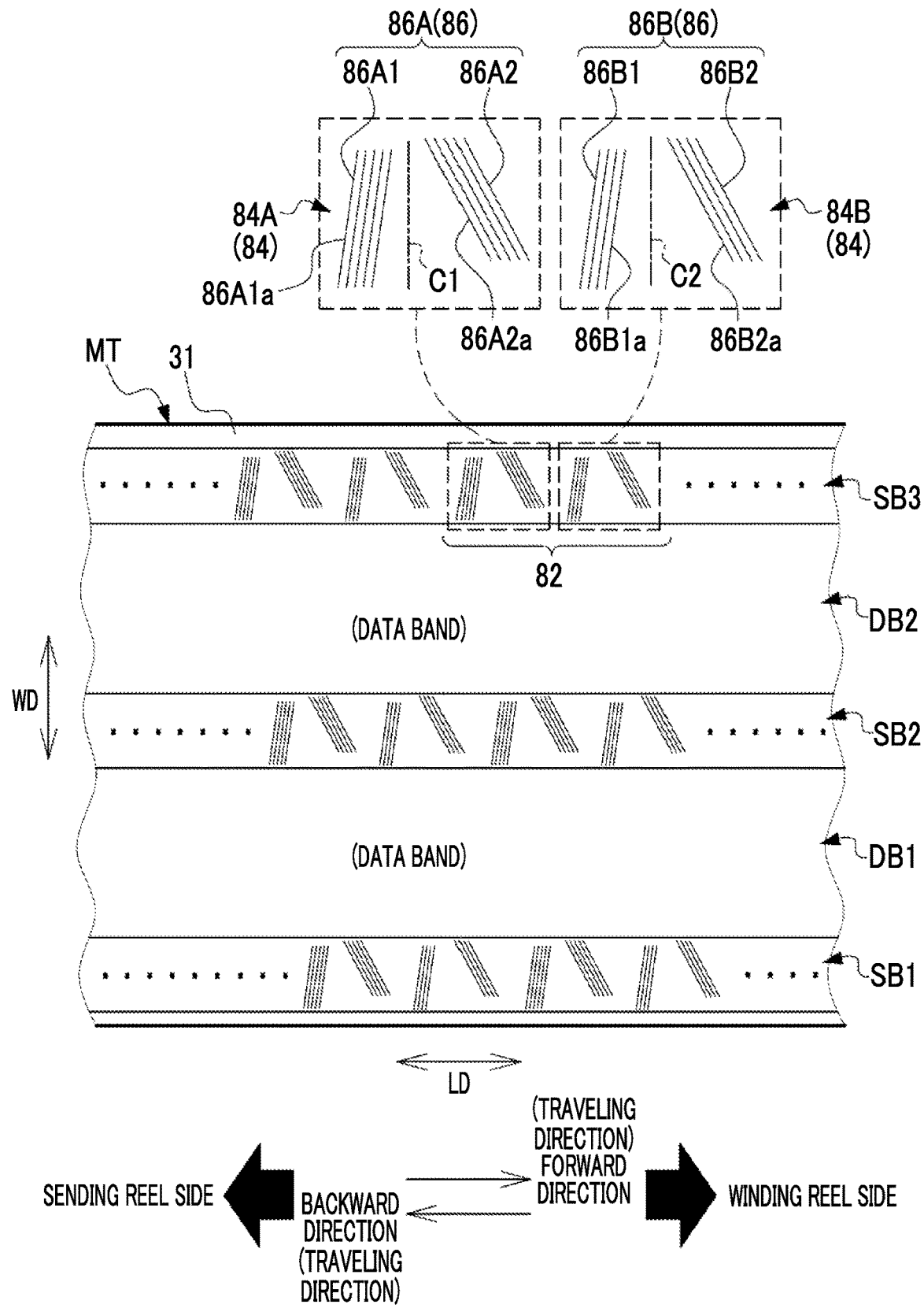
FIG. 37 is a conceptual diagram showing a fifth modification example, and is a conceptual diagram showing a modification example of the magnetic tape according to the embodiment (conceptual diagram showing an example of an aspect in which the magnetic tape is observed from the front surface side of the magnetic tape)

In the example shown in FIG. 37, servo patterns 84A and 84B are shown as an example of the set of servo patterns 84 included in the frame 82. The servo patterns 84A and 84B are adjacent to each other along the longitudinal direction LD of the magnetic tape MT, and the servo pattern 84A is positioned on the upstream side in the forward direction in the frame 82, and the servo pattern 84B is positioned on the downstream side in the forward direction.

The servo pattern 84A consists of the linear magnetization region pair 86A. In the example shown in FIG. 37, a pair of linear magnetization regions 86A1 and 86A2 is shown as an example of the linear magnetization region pair 86A. Each of the linear magnetization regions 86A1 and 86A2 is a linearly magnetized region.

The linear magnetization regions 86A1 and 86A2 are inclined in opposite directions with respect to the imaginary straight line C1. The linear magnetization regions 86A1 and 86A2 are not parallel to each other and are inclined at different angles with respect to the imaginary straight line C1. The linear magnetization region 86A1 has a steeper inclined angle with respect to the imaginary straight line C1 than the linear magnetization region 86A2. Here, "steep" means that, for example, an angle of the linear magnetization region 86A1 with respect to the imaginary straight line C1 is smaller than an angle of the linear magnetization region 86A2 with respect to the imaginary straight line C1.

In addition, the overall position of the linear magnetization region 86A1 and the overall position of the linear magnetization region 86A2 deviate from each other in the width direction WD. That is, the position of one end of the linear magnetization region 86A1 and the position of one end of the linear magnetization region 86A2 are not uniform in the width direction WD, and the position of the other end of the linear magnetization region 86A1 and the position of the other end of the linear magnetization region 86A2 are not uniform in the width direction WD.

In the servo pattern 84A, a plurality of magnetization straight lines 86A1a are included in the linear magnetization region 86A1, and a plurality of magnetization straight lines 86A2a are included in the linear magnetization region 86A2. The number of the magnetization straight lines 86A1a included in the linear magnetization region 86A1 is the same as the number of the magnetization straight lines 86A2a included in the linear magnetization region 86A2.

The linear magnetization region 86A1 is a set of magnetization straight lines 86A1a, which are five magnetized straight lines, and the linear magnetization region 86A2 is a set of magnetization straight lines 86A2a, which are five magnetized straight lines.

In the servo band SB, the position of one end of each of all the magnetization straight lines 86A1a included in the linear magnetization region 86A1 in the width direction WD is aligned, and the position of the other end of each of all the magnetization straight lines 86A1a included in the linear magnetization region 86A1 in the width direction WD is also aligned. In addition, in the servo band SB, the position of one end of each of all the magnetization straight lines 86A2a included in the linear magnetization region 86A2 in the width direction WD is aligned, and the position of the other end of each of all the magnetization straight lines 86A2a included in the linear magnetization region 86A2 in the width direction WD is also aligned.

The servo pattern 84B consists of the linear magnetization region pair 86B. In the example shown in FIG. 37, a pair of linear magnetization regions 86B1 and 86B2 is shown as an example of the linear magnetization region pair 86B. Each of the linear magnetization regions 86B1 and 86B2 is a linearly magnetized region.

The linear magnetization regions 86B1 and 86B2 are inclined in opposite directions with respect to the imaginary straight line C2. The linear magnetization regions 86B1 and 86B2 are not parallel to each other and are inclined at different angles with respect to the imaginary straight line C2. The linear magnetization region 86B1 has a steeper inclined angle with respect to the imaginary straight line C2 than the linear magnetization region 86B2. Here, "steep" means that, for example, an angle of the linear magnetization region 86B1 with respect to the imaginary straight line C2 is smaller than an angle of the linear magnetization region 86B2 with respect to the imaginary straight line C2.

In addition, the overall position of the linear magnetization region 86B1 and the overall position of the linear magnetization region 86B2 deviate from each other in the width direction WD. That is, the position of one end of the linear magnetization region 86B1 and the position of one end of the linear magnetization region 86B2 are not uniform in the width direction WD, and the position of the other end of the linear magnetization region 86B1 and the position of the other end of the linear magnetization region 86B2 are not uniform in the width direction WD.

In the servo pattern 84B, a plurality of magnetization straight lines 86B1a are included in the linear magnetization region 86B1, and a plurality of magnetization straight lines 86B2a are included in the linear magnetization region 86B2. The number of the magnetization straight lines 86B1a included in the linear magnetization region 86B1 is the same as the number of the magnetization straight lines 86B2a included in the linear magnetization region 86B2.

The total number of the magnetization straight lines 86B1a and 86B2a included in the servo pattern 84B is different from the total number of the magnetization straight lines 86A1a and 86A2a included in the servo pattern 84A. In the example shown in FIG. 37, the total number of the magnetization straight lines 86A1a and 86A2a included in the servo pattern 84A is ten, whereas the total number of the magnetization straight lines 86B1a and 86B2a included in the servo pattern 84B is eight.

The linear magnetization region 86B1 is a set of magnetization straight lines 86B1a, which are four magnetized straight lines, and the linear magnetization region 86B2 is a set of magnetization straight lines 86B2a, which are four magnetized straight lines.

In the servo band SB, the position of one end of each of all the magnetization straight lines 86B1a included in the linear magnetization region 86B1 in the width direction WD is aligned, and the position of the other end of each of all the magnetization straight lines 86B 1a included in the linear magnetization region 86B1 in the width direction WD is also aligned. In addition, in the servo band SB, the position of one end of each of all the magnetization straight lines 86B2a included in the linear magnetization region 86B2 in the width direction WD is aligned, and the position of the other end of each of all the magnetization straight lines 86B2a included in the linear magnetization region 86B2 in the width direction WD is also aligned.

It should be noted that, here, the set of magnetization straight lines 86A1a, which are five magnetized straight lines, is described as an example of the linear magnetization region 86A1, the set of magnetization straight lines 86A2a, which are five magnetized straight lines, is described as an example of the linear magnetization region 86A2, the set of magnetization straight lines 86B1a, which are four magnetized straight lines, is described as an example of the linear magnetization region 86B1, and the set of magnetization straight lines 86B2a, which are four magnetized straight lines, is described as an example of the linear magnetization region 86B2, but the technology of the present disclosure is not limited thereto. For example, the linear magnetization region 86A1 need only have the number of the magnetization straight lines 86A1a that contribute to specifying the position of the magnetic head 28 on the magnetic tape MT, the linear magnetization region 86A2 need only have the number of the magnetization straight lines 86A2a that contribute to specifying the position of the magnetic head 28 on the magnetic tape MT, the linear magnetization region 86B1 need only have the number of the magnetization straight lines 86B1a that contribute to specifying the position of the magnetic head 28 on the magnetic tape MT, and the linear magnetization region 86B2 need only have the number of the magnetization straight lines 86B2a that contribute to specifying the position of the magnetic head 28 on the magnetic tape MT.

Here, the geometrical characteristic of the linear magnetization region pair 86A on the magnetic tape MT will be described with reference to FIG. 38.

Figure 38:
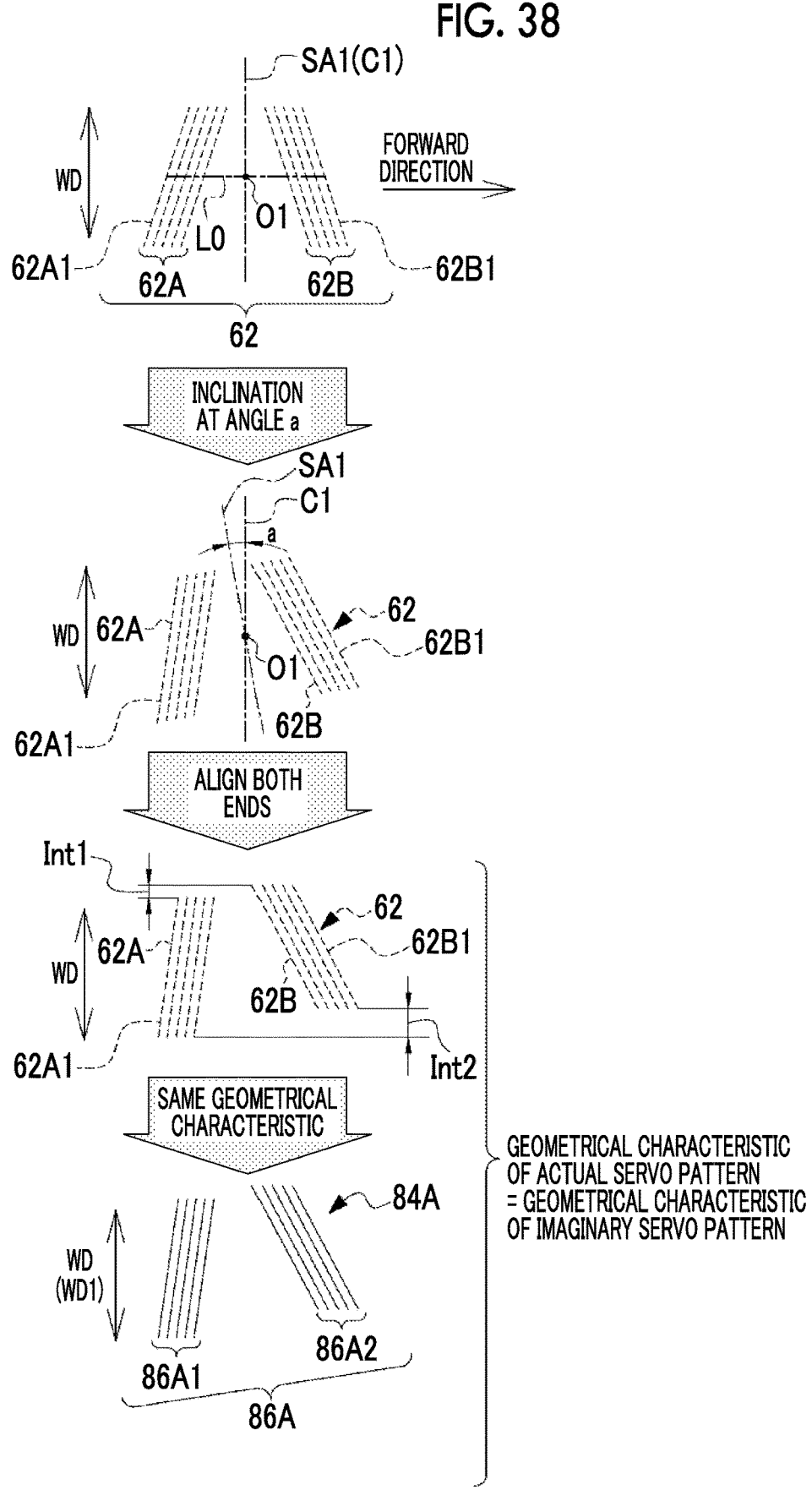
FIG. 38 is a conceptual diagram showing the fifth modification example, and is a conceptual diagram showing a relationship between a geometrical characteristic of an actual servo pattern and a geometrical characteristic of an imaginary servo pattern.

As an example, as shown in FIG. 38, the geometrical characteristic of the linear magnetization region pair 86A on the magnetic tape MT can be expressed by using an imaginary linear region pair 62. Here, the entirety of the imaginary linear region pair 62 is inclined with respect to the imaginary straight line C1 by inclining the symmetry axis SA1 of the imaginary linear regions 62A and 62B at an angle α (for example, 10 degrees) with respect to the imaginary straight line C1 with the center O1 as the rotation axis. Moreover, the position of one end of each of all the straight lines 62A1 included in the imaginary linear region 62A of the imaginary linear region pair 62 in this state in the width direction WD is aligned, and the position of the other end of each of all the straight lines 62A1 included in the imaginary linear region 62A in the width direction WD is also aligned. In addition, similarly, the position of one end of each of all the straight lines 62B1 included in the imaginary linear region 62B of the imaginary linear region pair 62 in the width direction WD is aligned, and the position of the other end of each of all the straight lines 62B1 included in the imaginary linear region 62B in the width direction WD is also aligned. As a result, the imaginary linear region 62A and the imaginary linear region 62B deviate from each other in the width direction WD.

That is, one end of the imaginary linear region 62A and one end of the imaginary linear region 62B deviate from each other in the width direction WD at a regular interval Int1, and the other end of the imaginary linear region 62A and the other end of the imaginary linear region 62B deviate from each other in the width direction WD at a regular interval Int2.

The geometrical characteristic of the imaginary linear region pair 62 (that is, the geometrical characteristic of the imaginary servo pattern) obtained as described above corresponds to the geometrical characteristic of the actual servo pattern 84A. That is, the geometrical characteristic of the linear magnetization region pair 86A on the magnetic tape MT corresponds to the geometrical characteristic based on the imaginary linear region pair 62 inclined line-symmetrically with respect to the imaginary straight line C1 in a case in which the entirety of the imaginary linear region pair 62 is inclined with respect to the imaginary straight line C1 by inclining a symmetry axis SA1 of the imaginary linear region 62A and the imaginary linear region 62B with respect to the imaginary straight line C1.

The imaginary linear region 62A corresponds to the linear magnetization region 86A1 of the servo pattern 84A, and the imaginary linear region 62B corresponds to the linear magnetization region 86A2 of the servo pattern 84A. Therefore, in the servo band SB, the servo pattern 84A consisting of the linear magnetization region pair 86A in which one end of the linear magnetization region 86A1 and one end of the linear magnetization region 86A2 deviate from each other in the width direction WD at the regular interval Int1, and the other end of the linear magnetization region 86A1 and the other end of the linear magnetization region 86A2 deviate from each other in the width direction WD at the regular interval Int2 is recorded (see FIG. 37).

It should be noted that the linear magnetization region pair 86B is different from the linear magnetization region pair 86A only in that the four magnetization straight lines 86B 1a are provided instead of the five magnetization straight lines 86A1a and the four magnetization straight lines 86B2a are provided instead of the five magnetization straight lines 86A2a (see FIG. 37). Therefore, in the servo band SB, the servo pattern 84B consisting of the linear magnetization region pair 86B in which one end of the linear magnetization region 86B1 and one end of the linear magnetization region 86B2 deviate from each other in the width direction WD at the regular interval Int1, and the other end of the linear magnetization region 86B1 and the other end of the linear magnetization region 86B2 deviate from each other in the width direction WD at the regular interval Int2 is recorded (see FIG. 37).

Figure 39:
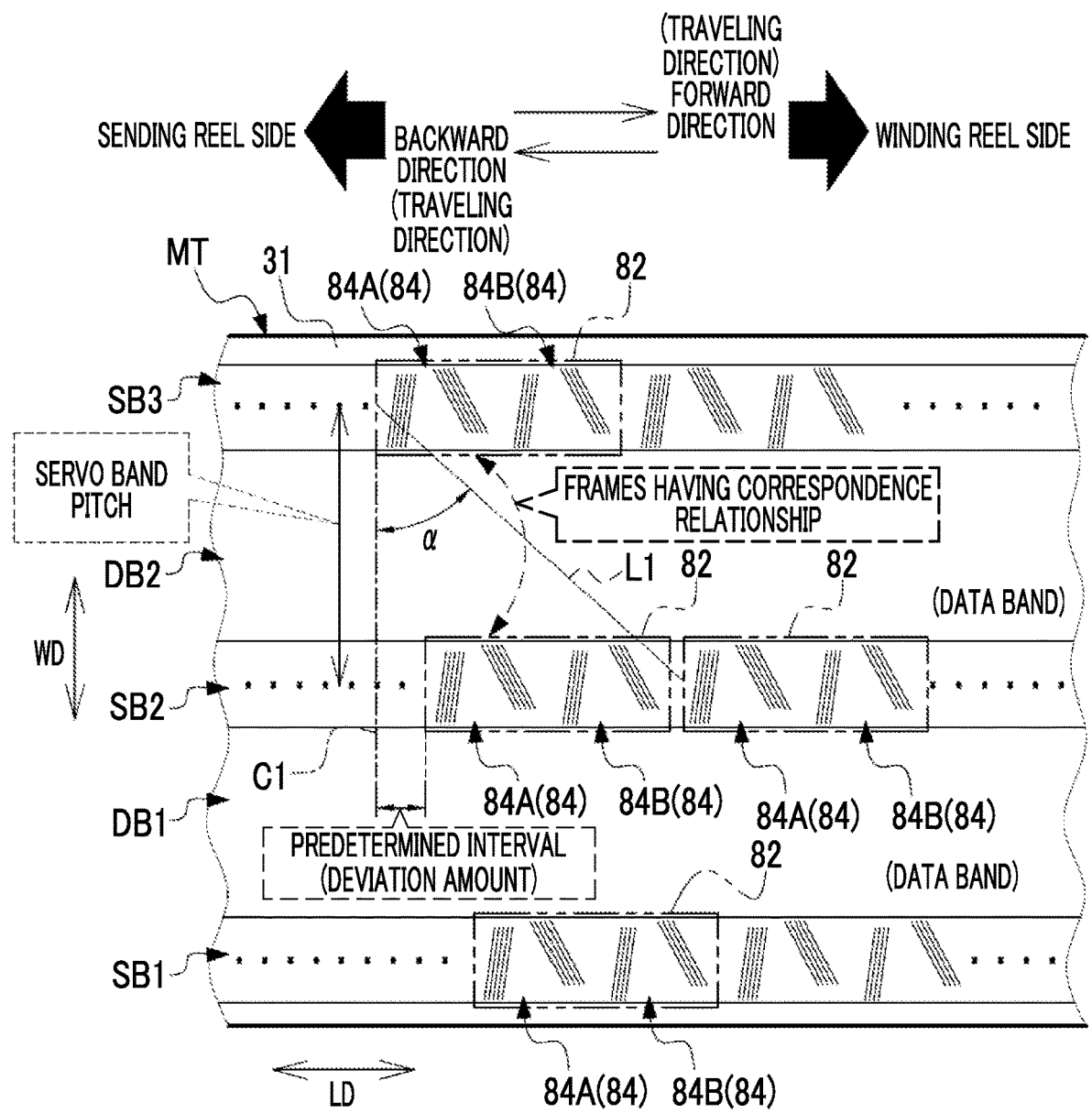
FIG. 39 is a conceptual diagram showing the fifth modification example, and is a conceptual diagram showing an example of an aspect in which a state in which frames corresponding to each other between the servo bands adjacent to each other in a width direction of the magnetic tape according to the embodiment deviate from each other at a predetermined interval is observed from the front surface side of the magnetic tape.

As an example, as shown in FIG. 39, the plurality of servo bands SB are formed on the magnetic tape MT in the width direction WD, and the frames 82 having a correspondence relationship between the servo bands SB deviate from each other at predetermined intervals in the longitudinal direction LD, between the servo bands SB adjacent to each other in the width direction WD of the magnetic tape MT. This means that the servo patterns 84 having a correspondence relationship between the servo bands SB deviate from each other at the predetermined interval described in the above first modification example in the longitudinal direction LD between the servo bands SB adjacent to each other in the width direction WD of the magnetic tape MT. The predetermined interval is defined by Expression (1) described in the first modification example.

Figure 40:
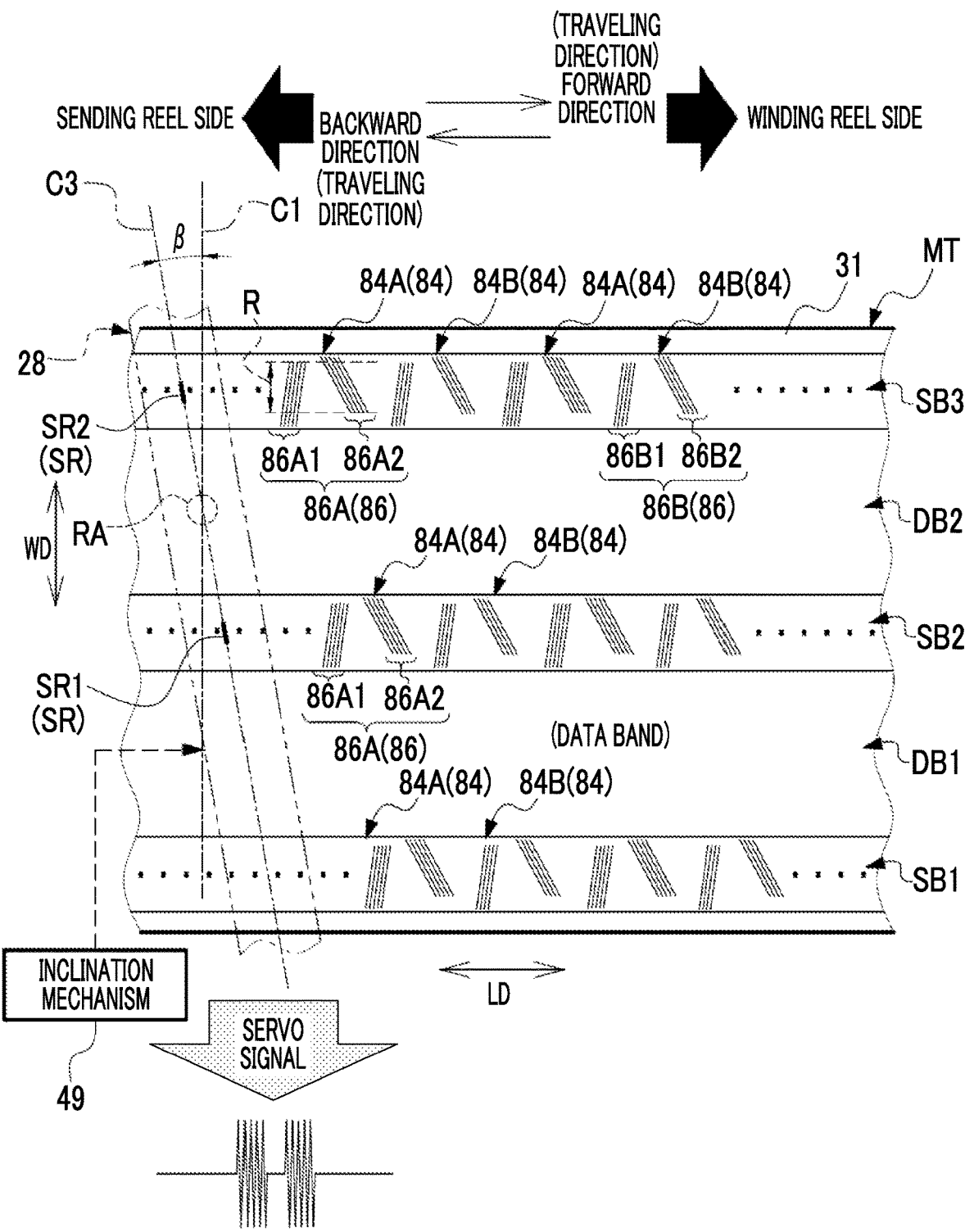
FIG. 40 is a conceptual diagram showing the fifth modification example, and is a conceptual diagram showing an example of an aspect in which a state in which the servo pattern is read by the servo reading element provided in the magnetic head that is skewed on the magnetic tape according to the embodiment is observed from the front surface side of the magnetic tape.

Similarly to the first modification example described above, in the fifth modification example, as shown in FIG. 40 as an example, the inclination mechanism 49 skews the magnetic head 28 on the magnetic tape MT around the rotation axis RA such that the imaginary straight line C3 is inclined with respect to the imaginary straight line C1 to the upstream side in the forward direction at an angle β (that is, the angle β counterclockwise as viewed from the paper surface side of FIG. 40). That is, the magnetic head 28 is inclined at the angle β to the upstream side in the forward direction on the magnetic tape MT. In this state, in a case in which the servo pattern 84A is read by the servo reading element SR along the longitudinal direction LD within a range R in which the linear magnetization regions 86A1 and 86A2 overlap with each other in the width direction WD, the variation due to the azimuth loss between the servo pattern signal derived from the linear magnetization region 86A1 and the servo pattern signal derived from the linear magnetization region 86A2 is smaller than in the examples shown in FIG. 30. In addition, also in a case in which the servo pattern 84B (that is, the linear magnetization region pair 86B) is read by the servo reading element SR, similarly, the variation due to the azimuth loss between the servo pattern signal derived from the linear magnetization region 86B1 and the servo pattern signal derived from the linear magnetization region 86B2 is small.

Sixth Modification Example

Figure 41:
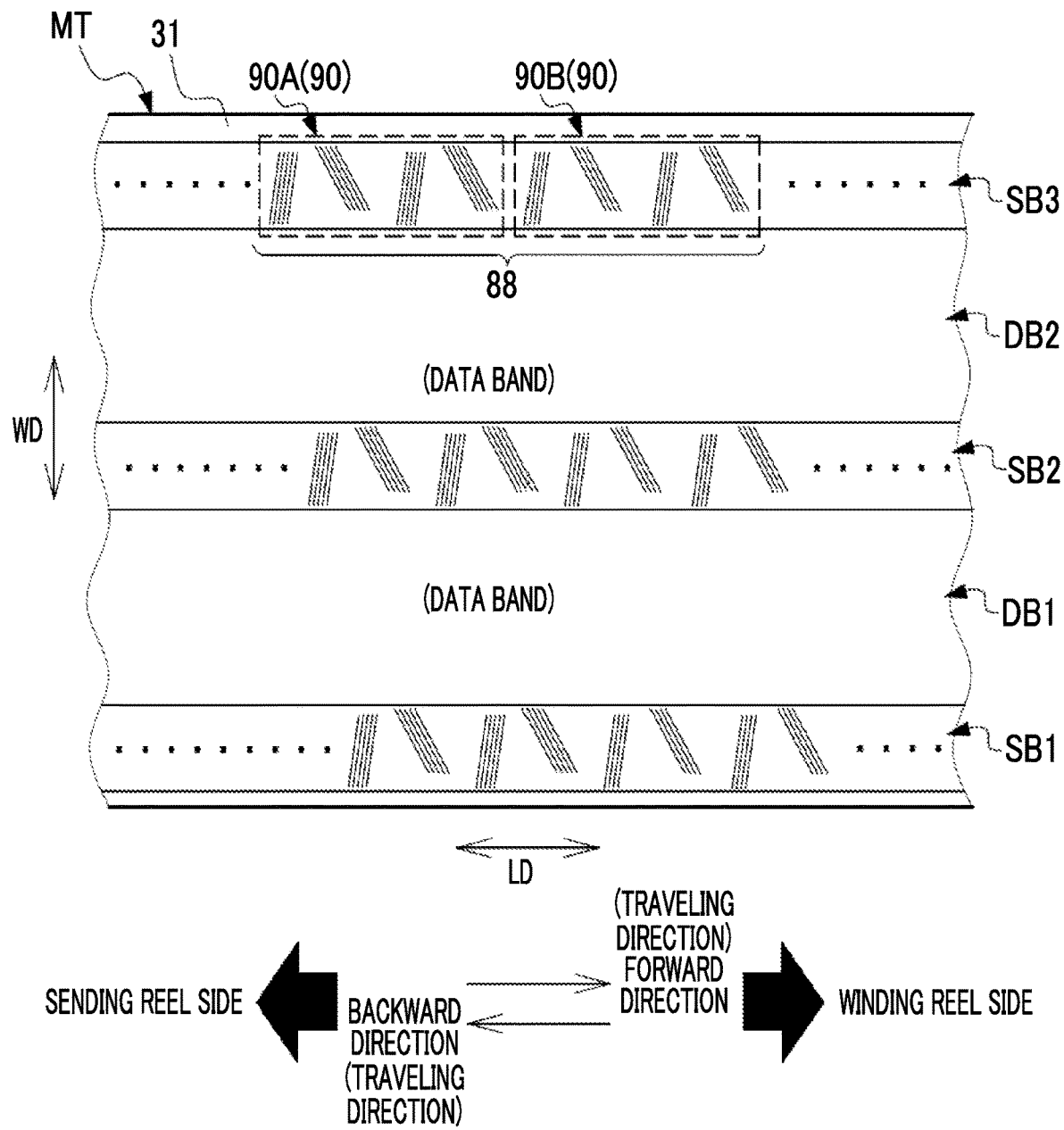
FIG. 41 is a conceptual diagram showing a sixth modification example, and is a conceptual diagram showing a modification example of the magnetic tape according to the embodiment (conceptual diagram showing an example of an aspect in which the magnetic tape is observed from the front surface side of the magnetic tape)

It should be noted that, in the fifth modification example described above, the form example has been described in which the servo band SB is divided by a plurality of frames 82 along the longitudinal direction LD of the magnetic tape MT, but the technology of the present disclosure is not limited to this. For example, as shown in FIG. 41, the servo band SB may be divided by a frame 88 along the longitudinal direction LD of the magnetic tape MT. The frame 88 is defined by a set of servo patterns 90. A plurality of servo patterns 90 are recorded in the servo band SB along the longitudinal direction LD of the magnetic tape MT. Similarly to the plurality of servo patterns 84 (see FIG. 37), the plurality of servo patterns 90 are disposed at regular intervals along the longitudinal direction LD of the magnetic tape MT.

In the example shown in FIG. 41, a pair of servo patterns 90A and 90B is shown as an example of the set of servo patterns 90. Each of the servo patterns 90A and 90B is an M-shaped magnetized servo pattern. The servo patterns 90A and 90B are adjacent to each other along the longitudinal direction LD of the magnetic tape MT, and the servo pattern 90A is positioned on the upstream side in the forward direction in the frame 88, and the servo pattern 90B is positioned on the downstream side in the forward direction.

Figure 42:
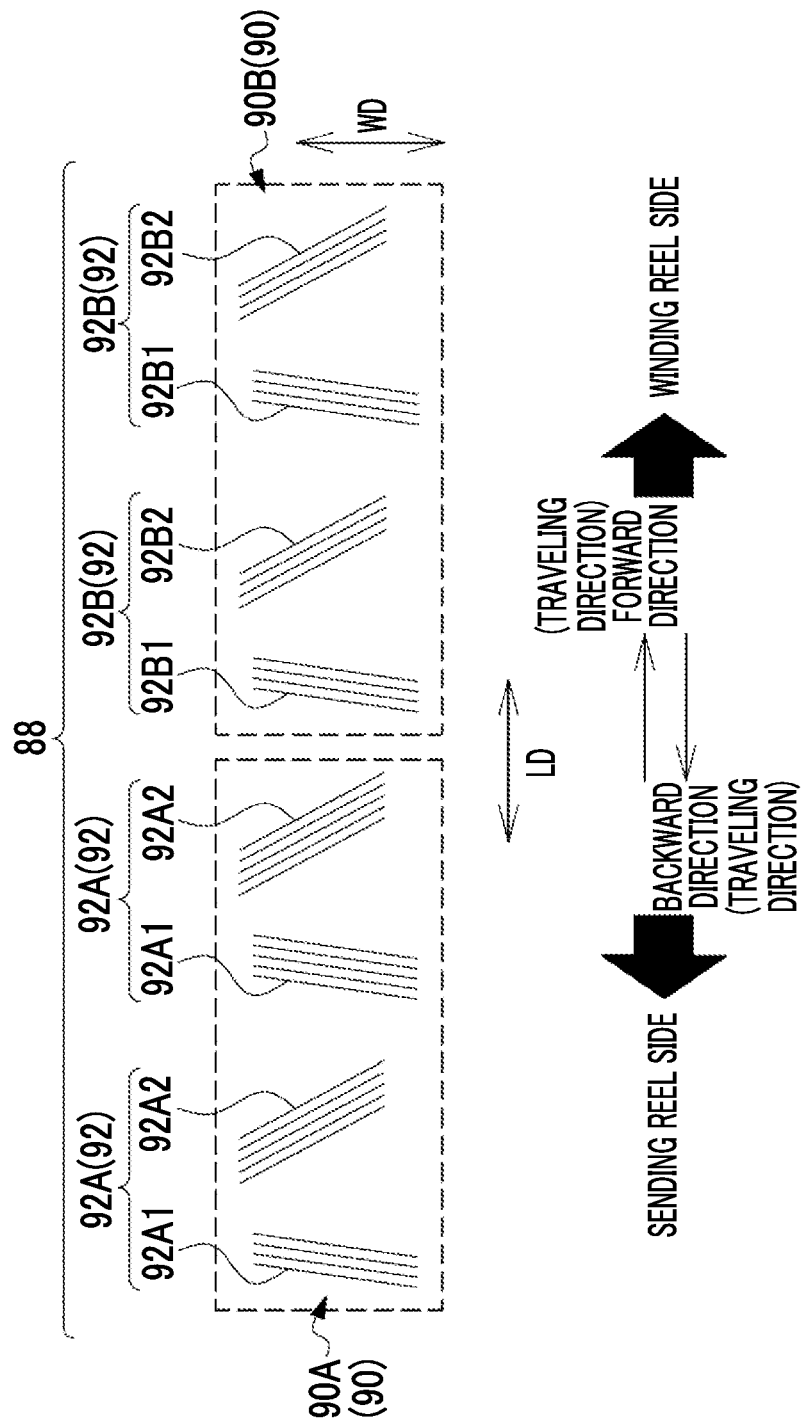
FIG. 42 is a conceptual diagram showing the sixth modification example, and is a conceptual diagram showing an example of an aspect of the servo pattern included in the magnetic tape.

As an example, as shown in FIG. 42, the servo pattern 90 consists of a linear magnetization region pair 92. The linear magnetization region pair 92 is classified into a linear magnetization region pair 92A and a linear magnetization region pair 92B.

The servo pattern 90A consists of a set of linear magnetization region pairs 92A. The set of linear magnetization region pairs 92A are disposed in a state of being adjacent to each other along the longitudinal direction LD of the magnetic tape MT.

In the example shown in FIG. 42, a pair of linear magnetization regions 92A1 and 92A2 is shown as an example of the linear magnetization region pair 92A. The linear magnetization region pair 92A is configured in the same manner as the linear magnetization region pair 86A (see FIG. 37) described in the fifth modification example, and has the same geometrical characteristic as the linear magnetization region pair 86A. That is, the linear magnetization region 92A1 is configured in the same manner as the linear magnetization region 86A1 (see FIG. 37) described in the fifth modification example and has the same geometrical characteristic as the linear magnetization region 86A1, and the linear magnetization region 92A2 is configured in the same manner as the linear magnetization region 86A2 (see FIG. 37) described in the fifth modification example and has the same geometrical characteristic as the linear magnetization region 86A2.

The servo pattern 90B consists of a set of linear magnetization region pairs 92B. The set of linear magnetization region pairs 92B are disposed in a state of being adjacent to each other along the longitudinal direction LD of the magnetic tape MT.

In the example shown in FIG. 42, a pair of linear magnetization regions 92B1 and 92B2 is shown as an example of the linear magnetization region pair 92B. The linear magnetization region pair 92B is configured in the same manner as the linear magnetization region pair 86B (see FIG. 37) described in the fifth modification example, and has the same geometrical characteristic as the linear magnetization region pair 86B. That is, the linear magnetization region 92B1 is configured in the same manner as the linear magnetization region 86B1 (see FIG. 37) described in the fifth modification example and has the same geometrical characteristic as the linear magnetization region 86B1, and the linear magnetization region 92B2 is configured in the same manner as the linear magnetization region 86B2 (see FIG. 37) described in the fifth modification example and has the same geometrical characteristic as the linear magnetization region 86B2.

Seventh Modification Example

Figure 43:
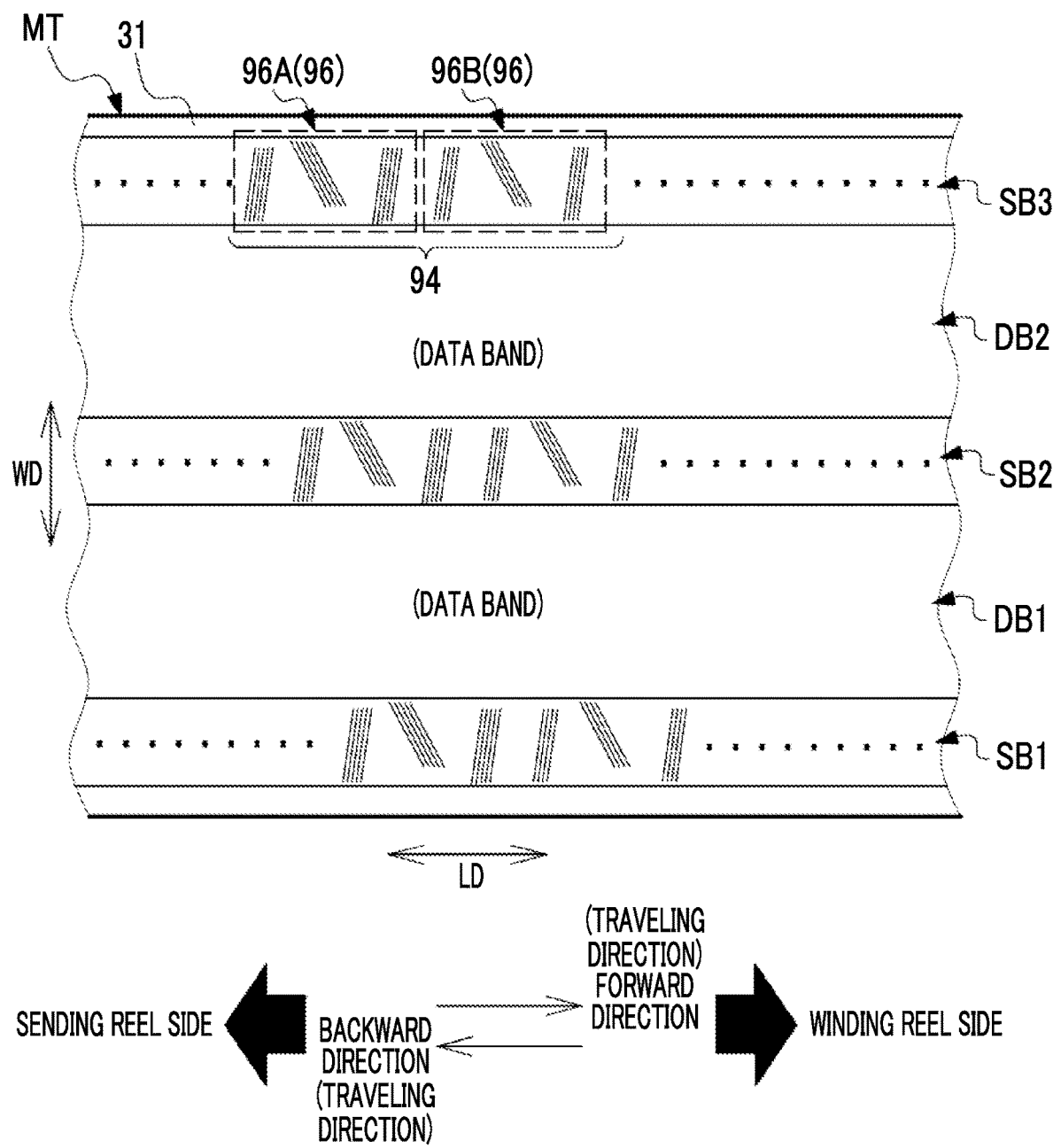
FIG. 43 is a conceptual diagram showing a seventh modification example, and is a conceptual diagram showing a modification example of the magnetic tape according to the embodiment (conceptual diagram showing an example of an aspect in which the magnetic tape is observed from the front surface side of the magnetic tape)

In the example shown in FIG. 41, the form example has been described in which the servo band SB is divided by a plurality of frames 88 along the longitudinal direction LD of the magnetic tape MT, but the technology of the present disclosure is not limited to this. For example, as shown in FIG. 43, the servo band SB may be divided by a frame 94 along the longitudinal direction LD of the magnetic tape MT. The frame 94 is defined by a set of servo patterns 96. A plurality of servo patterns 96 are recorded in the servo band SB along the longitudinal direction LD of the magnetic tape MT. Similarly to the plurality of servo patterns 90 (see FIG. 41), the plurality of servo patterns 96 are disposed at regular intervals along the longitudinal direction LD of the magnetic tape MT.

In the example shown in FIG. 43, servo patterns 96A and 96B are shown as an example of the set of servo patterns 96. Each of the servo patterns 96A and 96B is an N-shaped magnetized servo pattern. The servo patterns 96A and 96B are adjacent to each other along the longitudinal direction LD of the magnetic tape MT, and the servo pattern 96A is positioned on the upstream side in the forward direction in the frame 94, and the servo pattern 96B is positioned on the downstream side in the forward direction.

Figure 44:
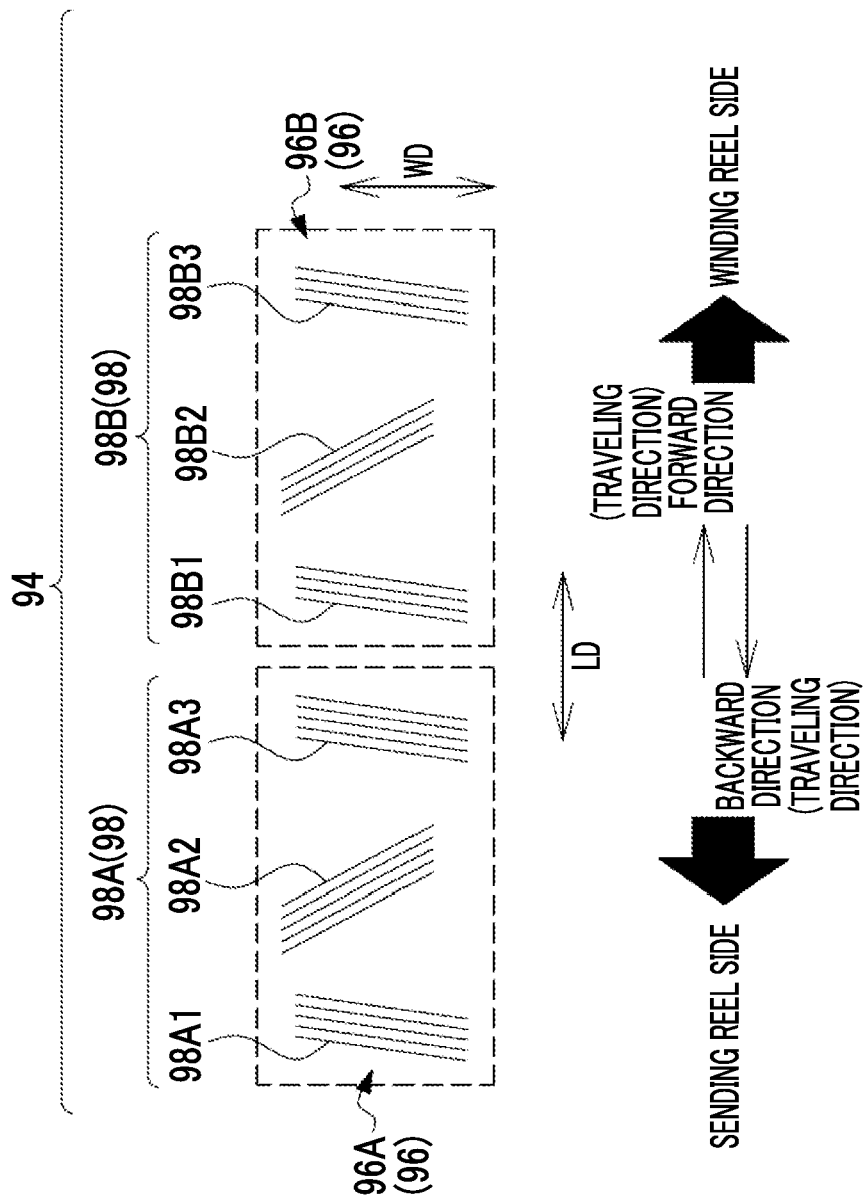
FIG. 44 is a conceptual diagram showing the seventh modification example, and is a conceptual diagram showing an example of an aspect of the servo pattern included in the magnetic tape.

As an example, as shown in FIG. 44, the servo pattern 96 consists of a linear magnetization region group 98. The linear magnetization region group 98 is classified into a linear magnetization region group 98A and a linear magnetization region group 98B.

The servo pattern 96A consists of the linear magnetization region group 98A. The linear magnetization region group 98A consists of linear magnetization regions 98A1, 98A2, and 98A3. The linear magnetization regions 98A1, 98A2, and 98A3 are disposed in a state of being adjacent to each other along the longitudinal direction LD of the magnetic tape MT. The linear magnetization regions 98A1, 98A2, and 98A3 are disposed in the order of the linear magnetization regions 98A1, 98A2, and 98A3 from the upstream side in the forward direction.

The linear magnetization regions 98A1 and 98A2 are configured in the same manner as the linear magnetization region pair 92A shown in FIG. 42, and have the same geometrical characteristics as the linear magnetization region pair 92A. That is, the linear magnetization region 98A1 is configured in the same manner as the linear magnetization region 92A1 shown in FIG. 42, and has the same geometrical characteristic as the linear magnetization region 92A1, and the linear magnetization region 98A2 is configured in the same manner as the linear magnetization region 92A2 shown in FIG. 42, and has the same geometrical characteristic as the linear magnetization region 92A2. In addition, the linear magnetization region 98A3 is configured in the same manner as the linear magnetization region 92A1, and has the same geometrical characteristic as the linear magnetization region 92A1.

The servo pattern 96B consists of the linear magnetization region group 98B. The linear magnetization region group 98B consists of linear magnetization regions 98B1, 98B2, and 98B3. The linear magnetization regions 98B1, 98B2, and 98B3 are disposed in a state of being adjacent to each other along the longitudinal direction LD of the magnetic tape MT. The linear magnetization regions 98B1, 98B2, and 98B3 are disposed in the order of the linear magnetization regions 98B1, 98B2, and 98B3 from the upstream side in the forward direction.

The linear magnetization regions 98B1 and 98B2 are configured in the same manner as the linear magnetization region pair 92B shown in FIG. 42, and have the same geometrical characteristics as the linear magnetization region pair 92B. That is, the linear magnetization region 98B1 is configured in the same manner as the linear magnetization region 92B1 shown in FIG. 42, and has the same geometrical characteristic as the linear magnetization region 92B1, and the linear magnetization region 98B2 is configured in the same manner as the linear magnetization region 92B2 shown in FIG. 42, and has the same geometrical characteristic as the linear magnetization region 92B2. In addition, the linear magnetization region 98B3 is configured in the same manner as the linear magnetization region 92B1, and has the same geometrical characteristic as the linear magnetization region 92B1.

Eighth Modification Example

Figure 45:
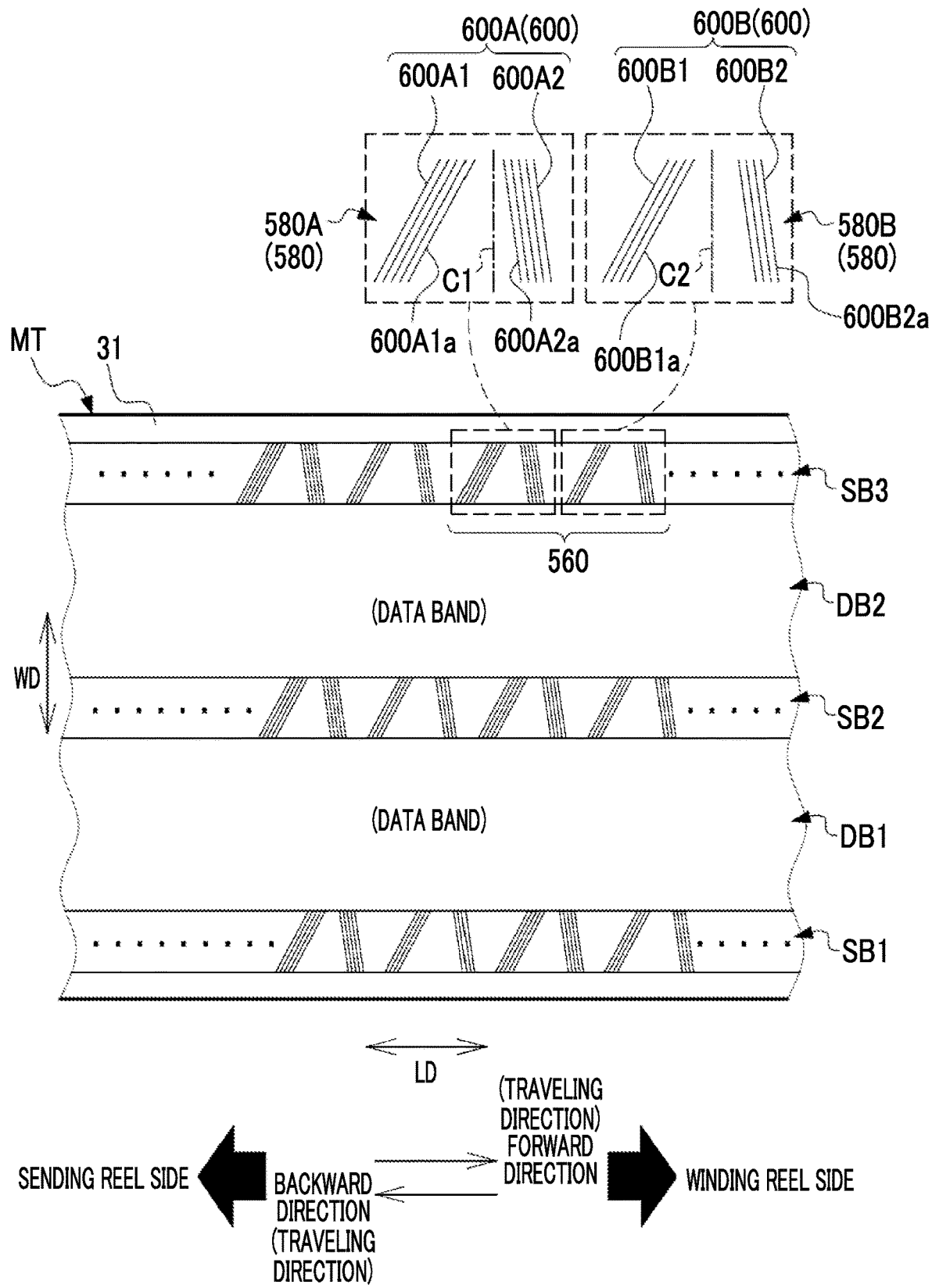
FIG. 45 is a conceptual diagram showing an eighth modification example, and is a conceptual diagram showing a modification example of the magnetic tape according to the embodiment (conceptual diagram showing an example of an aspect in which the magnetic tape is observed from the front surface side of the magnetic tape)

It should be noted that, in the first modification example described above (for example, example shown in FIG. 27), the form example has been described in which the servo band SB is divided by the plurality of frames 56 along the longitudinal direction LD of the magnetic tape MT, but the technology of the present disclosure is not limited to this. For example, as shown in FIG. 45, the servo band SB may be divided by a frame 560 along the longitudinal direction LD of the magnetic tape MT. The frame 560 is defined by a set of servo patterns 580. A plurality of servo patterns 580 are recorded in the servo band SB along the longitudinal direction LD of the magnetic tape MT. The plurality of servo patterns 580 are disposed at regular intervals along the longitudinal direction LD of the magnetic tape MT, similarly to the plurality of servo patterns 58.

The servo pattern 580 consists of a linear magnetization region pair 600. The linear magnetization region pair 600 is classified into a linear magnetization region pair 600A and a linear magnetization region pair 600B. That is, the linear magnetization region pair 600 is different from the linear magnetization region pair 60 (see FIG. 27) in that the linear magnetization region pair 600A is provided instead of the linear magnetization region pair 60A, and the linear magnetization region pair 600B is provided instead of the linear magnetization region pair 60B.

The servo pattern 580A consists of the linear magnetization region pair 600A. The linear magnetization region pair 600A is different from the linear magnetization region pair 60A in that the linear magnetization region 600A1 is provided instead of the linear magnetization region 60A1, and the linear magnetization region 600A2 is provided instead of the linear magnetization region 60A2. Each of the linear magnetization regions 600A1 and 600A2 is a linearly magnetized region.

The linear magnetization regions 600A1 and 600A2 are inclined in opposite directions with respect to the imaginary straight line C1. The linear magnetization regions 600A1 and 600A2 are not parallel to each other and are inclined at different angles with respect to the imaginary straight line C1. The linear magnetization region 600A2 has a steeper inclined angle with respect to the imaginary straight line C1 than the linear magnetization region 600A1. Here, "steep" means that, for example, an angle of the linear magnetization region 600A2 with respect to the imaginary straight line C1 is smaller than an angle of the linear magnetization region 600A1 with respect to the imaginary straight line C1. In addition, a total length of the linear magnetization region 600A2 is shorter than a total length of the linear magnetization region 600A1.

The linear magnetization region 600A1 is different from the linear magnetization region 60A1 in that a plurality of magnetization straight lines 600A 1a are provided instead of the plurality of magnetization straight lines 60A1a. The linear magnetization region 600A2 is different from the linear magnetization region 60A2 in that a plurality of magnetization straight lines 600A2a are provided instead of the plurality of magnetization straight lines 60A2a.

The plurality of magnetization straight lines 600A 1a are included in the linear magnetization region 600A1, and the plurality of magnetization straight lines 600A2a are included in the linear magnetization region 600A2. The number of the magnetization straight lines 600A1a included in the linear magnetization region 600A1 is the same as the number of the magnetization straight lines 600A2a included in the linear magnetization region 600A2.

The linear magnetization region 600A1 is a linear magnetization region corresponding to a first line symmetry region. The first line symmetry region refers to a region in which the linear magnetization region 60A2 (see FIG. 27) described in the first modification example is formed line-symmetrically with respect to the imaginary straight line C1. That is, the linear magnetization region 600A1 can be said to be a linear magnetization region formed by a geometrical characteristic of a mirror image of the linear magnetization region 60A2 (see FIG. 27) (that is, geometrical characteristic obtained by performing the mirror image with respect to the linear magnetization region 60A2 (see FIG. 27) with the imaginary straight line C1 as a line symmetry axis).

The linear magnetization region 600A2 is a linear magnetization region corresponding to a second line symmetry region. The second line symmetry region refers to a region in which the linear magnetization region 60A1 (see FIG. 27) described in the first embodiment is formed line-symmetrically with respect to the imaginary straight line C1. That is, the linear magnetization region 600A2 can be said to be a linear magnetization region formed by a geometrical characteristic of a mirror image of the linear magnetization region 60A1 (see FIG. 27) (that is, geometrical characteristic obtained by performing the mirror image with respect to the linear magnetization region 60A1 (see FIG. 27) with the imaginary straight line C1 as a line symmetry axis).

That is, in the example shown in FIG. 28, the geometrical characteristic of the imaginary linear region pair 62 obtained by aligning the positions of both ends of the imaginary linear region 62A and the positions of both ends of the imaginary linear region 62B in a case in which the entirety of the imaginary linear region pair 62 is inclined with respect to the imaginary straight line C1 by inclining the symmetry axis SA1 of the imaginary linear regions 62A and 62B with respect to the imaginary straight line C1 at the angle α clockwise as viewed from the paper surface side of FIG. 28 with the center O1 as the rotation axis corresponds to the geometrical characteristic of the servo pattern 580A.

The servo pattern 580B consists of the linear magnetization region pair 600B. The linear magnetization region pair 600B is different from the linear magnetization region pair 60B in that the linear magnetization region 600B1 is provided instead of the linear magnetization region 60B1, and the linear magnetization region 600B2 is provided instead of the linear magnetization region 60B2. Each of the linear magnetization regions 600B1 and 600B2 is a linearly magnetized region.

The linear magnetization regions 600B1 and 600B2 are inclined in opposite directions with respect to the imaginary straight line C2. The linear magnetization regions 600B1 and 600B2 are not parallel to each other and are inclined at different angles with respect to the imaginary straight line C2. The linear magnetization region 600B2 has a steeper inclined angle with respect to the imaginary straight line C2 than the linear magnetization region 600B1. Here, "steep" means that, for example, an angle of the linear magnetization region 600B2 with respect to the imaginary straight line C2 is smaller than an angle of the linear magnetization region 600B1 with respect to the imaginary straight line C2.

The plurality of magnetization straight lines 600B1a are included in the linear magnetization region 600B1, and the plurality of magnetization straight lines 600B2a are included in the linear magnetization region 600B2. The number of the magnetization straight lines 600B1a included in the linear magnetization region 600B1 is the same as the number of the magnetization straight lines 600B2a included in the linear magnetization region 600B2.

The total number of the magnetization straight lines 600B1a and 600B2a included in the servo pattern 580B is different from the total number of the magnetization straight lines 600A1a and 600A2a included in the servo pattern 580A. In the example shown in FIG. 45, the total number of the magnetization straight lines 600A 1a and 600A2a included in the servo pattern 580A is ten, whereas the total number of the magnetization straight lines 600B1a and 600B2a included in the servo pattern 580B is eight.

The linear magnetization region 600B1 is a set of magnetization straight lines 600B1a, which are four magnetized straight lines, and the linear magnetization region 600B2 is a set of magnetization straight lines 600B2a, which are four magnetized straight lines. In the servo band SB, the positions of both ends of the linear magnetization region 600B1 (that is, the positions of both ends of each of the four magnetization straight lines 600B1a) and the positions of both ends of the linear magnetization region 600B2 (that is, the positions of both ends of each of the four magnetization straight lines 600B2a) are aligned in the width direction WD.

As described above, the geometrical characteristic of the servo pattern 580A corresponds to the geometrical characteristic of the mirror image of the linear magnetization region 60A2 (see FIG. 27) and the geometrical characteristic of the mirror image of the linear magnetization region 60A2 (see FIG. 27) (that is, geometrical characteristic of the mirror image of the servo pattern 58A shown in FIG. 27), and the geometrical characteristic of the servo pattern 580B corresponds to the geometrical characteristic of the mirror image of the linear magnetization region 60B2 (see FIG. 27) and the geometrical characteristic of the mirror image of the linear magnetization region 60B2 (see FIG. 27) (that is, geometrical characteristic of the mirror image of the servo pattern 58B shown in FIG. 27). However, this is merely an example, and instead of the servo pattern 580, the servo pattern formed by the geometrical characteristic of the mirror image of the servo pattern 72 shown in FIG. 32, the geometrical characteristic of the mirror image of the servo pattern 78 shown in FIG. 34, the geometrical characteristic of the mirror image of the servo pattern 84 shown in FIG. 37, the geometrical characteristic of the mirror image of the servo pattern 90 shown in FIG. 41, or the geometrical characteristic of the mirror image of the servo pattern 96 shown in FIG. 43 may be applied.

It should be noted that, even in a case in which the geometrical characteristic of the servo pattern is changed in this way, the inclination mechanism 49 changes the direction of the inclination (that is, azimuth) of the imaginary straight line C3 with respect to the imaginary straight line C4 and the inclined angle (for example, angle β shown in FIG. 31) in accordance with the geometrical characteristic of the servo pattern. That is, even in a case in which the geometrical characteristic of the servo pattern is changed, as in the same manner in the first modification example described above, the inclination mechanism 49 rotates, under the control of the control device 30A, the magnetic head 28 around the rotation axis RA on the front surface 31 of the magnetic tape MT to change the direction of the inclination of the imaginary straight line C3 with respect to the imaginary straight line C4 (that is, azimuth) and the inclined angle (for example, angle β shown in FIG. 31) such that the variation in the servo pattern signal is reduced.

Other Modification Examples

In the embodiment described above, the form example has been described in which the front surface 31 of the magnetic tape MT is subjected to the magnetic processing by the magnetic head 28, but the technology of the present disclosure is not limited to this. For example, the back surface 33 of the magnetic tape MT may be formed of the surface of the magnetic layer, and the back surface 33 may be subjected to the magnetic processing by the magnetic head 28. In this case, the back surface 33 is an example of a "recording surface" according to the technology of the present disclosure.

In the embodiment described above, the magnetic tape system 10 has been described in which the magnetic tape cartridge 12 can be inserted and removed with respect to the magnetic tape drive 14, but the technology of the present disclosure is not limited to this. For example, even in a case of the magnetic tape system in which at least one magnetic tape cartridge 12 is loaded in advance into the magnetic tape drive 14 (that is, the magnetic tape system in which at least one magnetic tape cartridge 12 or the magnetic tape MT and the magnetic tape drive 14 are integrated in advance (for example, before the data is recorded in the data band DB)), the technology of the present disclosure is established.

In the embodiment described above, the single magnetic head 28 has been described, but the technology of the present disclosure is not limited to this. For example, a plurality of magnetic heads 28 may be disposed on the magnetic tape MT. For example, the magnetic head 28 for reading and at least one magnetic head 28 for writing may be disposed on the magnetic tape MT. The magnetic head 28 for reading may be used for verifying the data recorded in the data band DB by the magnetic head 28 for writing. In addition, one magnetic head on which the magnetic element unit 42 for reading and at least one magnetic element unit 42 for writing are mounted may be disposed on the magnetic tape MT.

Figure 46:
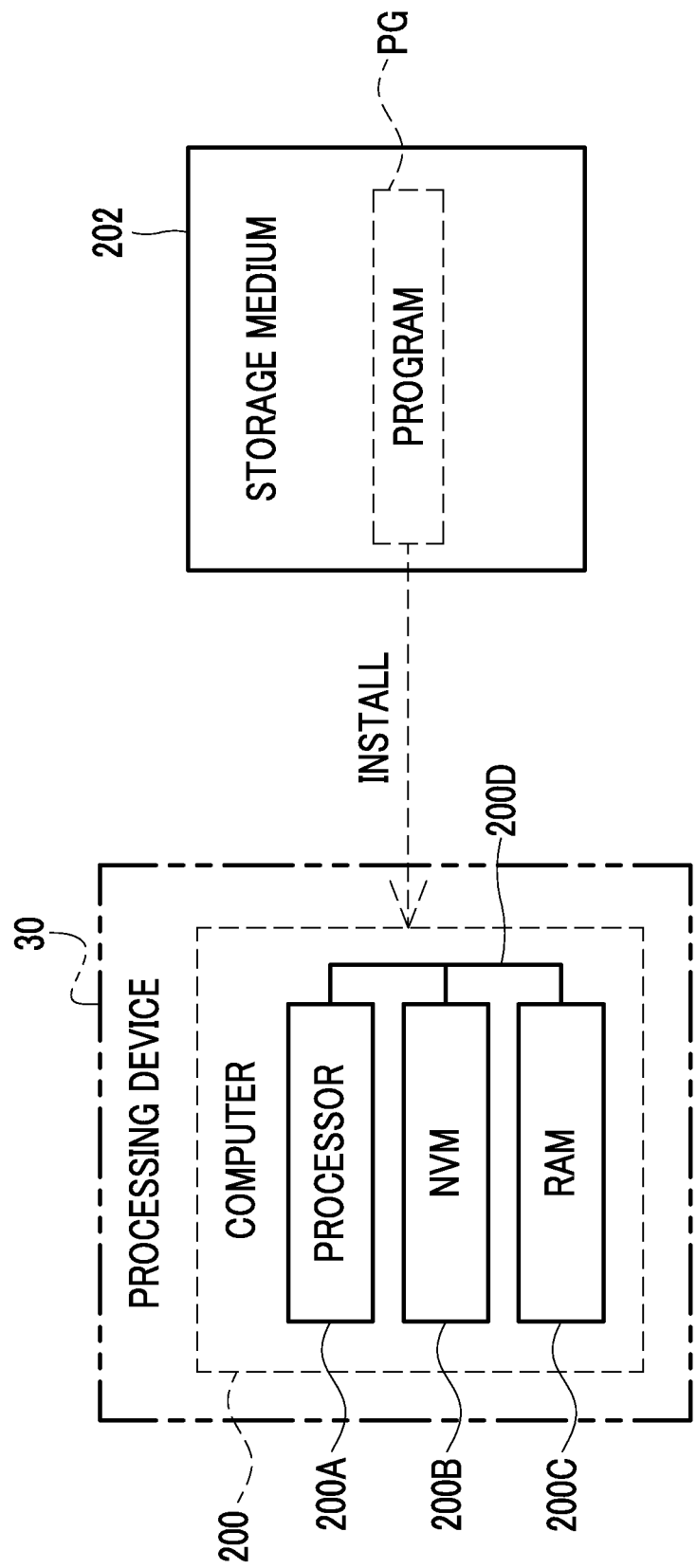
FIG. 46 is a conceptual diagram showing an example of an aspect in which a program stored in a storage medium is installed in a computer of the processing device.

In the embodiment described above, the form example has been described in which the processing device 30 (see FIG. 3) is realized by the ASIC, but the technology of the present disclosure is not limited to this, and the processing device 30 may be realized by a software configuration. In addition, only the control device 30A and the position detection device 30B provided in the processing device 30 may be realized by the software configuration. In a case in which the control device 30A and the position detection device 30B are realized by the software configuration, for example, as shown in FIG. 46, the processing device 30 comprises a computer 200. The computer 200 includes a processor 200A (for example, a single CPU or a plurality of CPUs), an NVM 200B, and a RAM 200C. The processor 200A, the NVM 200B, and the RAM 200C are connected to a bus 200D. A program PG is stored in a portable storage medium 202 (for example, an SSD or a USB memory) which is a computer-readable non-transitory storage medium.

The program PG stored in the storage medium 202 is installed in the computer 200. The processor 200A executes the data recording preprocessing (see FIG. 22) and the data recording reading processing (see FIGS. 23A, 23B, and 24) in accordance with the program PG.

In addition, the program PG may be stored in a storage device of another computer or server device connected to the computer 200 via a communication network (not shown), and the program PG may be downloaded in response to a request from the processing device 30 and installed in the computer 200. It should be noted that the program PG is an example of a "program" according to the technology of the present disclosure, and the computer 200 is an example of a "computer" according to the technology of the present disclosure.

In the example shown in FIG. 46, although the computer 200 has been described as an example, the technology of the present disclosure is not limited to this, and a device including an ASIC, an FPGA, and/or a PLC may be applied instead of the computer 200. In addition, instead of the computer 200, a hardware configuration and a software configuration may be used in combination.

As the hardware resource for executing the processing of the processing device 30 (see FIG. 3), various processors shown below can be used. Examples of the processor include the CPU which is a general-purpose processor functioning as the hardware resource for executing the processing by executing software, that is, a program. In addition, examples of the processor include a dedicated electronic circuit which is a processor having a circuit configuration designed to be dedicated to executing specific processing, such as an FPGA, a PLC, or an ASIC described as an example. A memory is built in or connected to any processor, and any processor executes the processing by using the memory.

The hardware resource for executing the processing of the processing device 30 and/or the servo writer controller SW5 may be composed of one of those various processors or may be composed of a combination of two or more processors of the same type or different types (for example, a combination of a plurality of FPGAs or a combination of a CPU and an FPGA). In addition, the hardware resource for executing the processing of the processing device 30 and/or the servo writer controller SW5 may be one processor.

As a configuring example of one processor, first, there is a form in which one processor is composed of a combination of one or more CPUs and software and the processor functions as the hardware resource for executing the processing. Secondly, as represented by SoC, there is a form in which a processor that realizes the functions of the entire system including a plurality of hardware resources for executing the processing with one IC chip is used. As described above, the processing of the processing device 30 and/or the servo writer controller SW5 is realized by using one or more of the various processors described above as the hardware resource.

Further, as the hardware structure of these various processors, more specifically, it is possible to use an electronic circuit in which circuit elements, such as semiconductor elements, are combined. In addition, the processing of the processing device 30 and/or the servo writer controller SW5 is merely an example. Therefore, it is needless to say that unnecessary steps may be deleted, new steps may be added, or the processing order may be changed within a range that does not deviate from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the description contents and shown contents above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B.

In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

In regard to the embodiments described above, the following supplementary notes will be further disclosed.

(Supplementary Note 1)

An information storage method including storing, in a storage medium in which information on a magnetic tape having a recording surface is stored, angle adjustment information obtained before data is recorded in the recording surface by a magnetic head, in which the magnetic tape has the recording surface, the data is recorded in the recording surface by the magnetic head in a state in which the magnetic tape is made to travel, the magnetic head is disposed at an inclined posture with respect to a width direction of the magnetic tape along the recording surface, and the angle adjustment information is information for adjusting an angle at which the magnetic head is inclined with respect to the width direction along the recording surface.

(Supplementary Note 2)

An information storage method including storing, in a magnetic tape having a recording surface, angle adjustment information obtained before data is recorded in the recording surface by a magnetic head, in which the magnetic tape has the recording surface, the data is recorded in the recording surface by the magnetic head in a state in which the magnetic tape is made to travel, the magnetic head is disposed at an inclined posture with respect to a width direction of the magnetic tape along the recording surface, and the angle adjustment information is information for adjusting an angle at which the magnetic head is inclined with respect to the width direction along the recording surface.

What is claimed is:

1. A magnetic tape cartridge comprising:
   a magnetic tape; and
   a storage medium in which information on the magnetic tape, which includes specification information of the magnetic tape, is stored,
   wherein the magnetic tape has a recording surface,
   angle adjustment information is stored in the storage medium, the angle adjustment information including a table that associates a plurality of the specification information with a plurality of reference skew angle information that serves as a plurality candidates for a reference skew angle of the magnetic tape before data is recorded in a data band of the magnetic tape, and
   an angle at which a magnetic head configured to record data on the recording surface is inclined with respect to the recording surface is adjusted by deriving, using the table, the reference skew angle corresponding to the specification information of the magnetic tape.

2. The magnetic tape cartridge according to claim 1,
   wherein the angle adjustment information includes width correspondence information corresponding to a width of the magnetic tape, and
   the width correspondence information is information acquired in a state in which the magnetic tape is made to travel before the data is recorded in the recording surface.

3. The magnetic tape cartridge according to claim 2, wherein the width correspondence information is acquired at a plurality of points of the magnetic tape in a total length direction of the magnetic tape.

4. The magnetic tape cartridge according to claim 1, wherein the angle adjustment information includes first environment information for specifying an environment.

5. The magnetic tape cartridge according to claim 4, wherein the first environment information is information including at least one of temperature information that indicates a temperature or humidity information that indicates humidity.

6. The magnetic tape cartridge according to claim 1, wherein the angle adjustment information includes angle information that indicates an angle of the magnetic head being inclined with respect to a width direction of the magnetic tape along the recording surface.

7. The magnetic tape cartridge according to claim 1, wherein the angle adjustment information includes physical feature information that indicates a physical feature of the magnetic tape.

8. The magnetic tape cartridge according to claim 7, wherein the physical feature includes at least one of a thickness of the magnetic tape, a thickness of a magnetic layer of the magnetic tape, a friction coefficient of a front surface of the magnetic tape, a friction coefficient of a back surface of the magnetic tape, a temperature expansion coefficient of the magnetic tape, a humidity expansion coefficient of the magnetic tape, a Poisson's ratio of the magnetic tape, or a substrate of the magnetic tape.

9. The magnetic tape cartridge according to claim 1, wherein the storage medium is a medium including a memory capable of communicating with a noncontact read/write device in a noncontact manner.

10. The magnetic tape cartridge according to claim 1, wherein the storage medium is a medium including a part of the magnetic tape.

11. A magnetic tape drive comprising:
a processor that executes processing for the magnetic tape cartridge according to claim 1; and
an angle adjustment mechanism that adjusts the angle by applying power to the magnetic head,
wherein the processor
acquires the angle adjustment information from the storage medium, and
causes the angle adjustment mechanism to adjust the angle based on the angle adjustment information.

12. The magnetic tape drive according to claim 11, wherein the magnetic tape includes a servo band, the magnetic head includes a servo reading element, and the processor matches a position of the servo band with a position of the servo reading element by causing the angle adjustment mechanism to adjust the angle based on the angle adjustment information in a case in which the data is recorded in the recording surface.

13. The magnetic tape drive according to claim 11, wherein the magnetic head performs magnetic processing on the recording surface,
the angle adjustment information includes second environment information for specifying an environment, and
the processor
acquires third environment information for specifying the environment at a timing at which the magnetic processing is performed, and
causes the angle adjustment mechanism to adjust the angle based on a degree of difference between the second environment information and the third environment information.

14. The magnetic tape drive according to claim 11, wherein the processor
acquires fourth environment information for specifying an environment at a first timing at which the data is recorded in the recording surface,
acquires fifth environment information for specifying the environment at a second timing at which the data is recorded in the recording surface, the second timing being different from the first timing, and
causes the angle adjustment mechanism to adjust the angle based on a degree of difference between the fourth environment information and the fifth environment information.

15. The magnetic tape drive according to claim 14, wherein the second timing is a timing at which the data is updated by performing overwriting to the data recorded in the recording surface at the first timing and/or a timing at which new data is added to the recording surface in which the data is recorded at the first timing.

16. An operation method of a magnetic tape drive, the method comprising:
acquiring the angle adjustment information from the storage medium included in the magnetic tape cartridge according to claim 1; and
causing an angle adjustment mechanism to adjust the angle based on the angle adjustment information.

17. The magnetic tape cartridge of claim 1, wherein the reference skew angle information is a reference skew angle before data is recorded in the data band.

18. The magnetic tape cartridge of claim 1, wherein, using the table, the respective reference skew angle is derived for the respective ones of different magnetic tape cartridges, so that different reference skew angles can be set for the different magnetic tape cartridges.

19. A magnetic tape cartridge comprising:
a magnetic tape; and
a storage medium in which information on the magnetic tape is stored,
wherein the magnetic tape has a recording surface,
angle adjustment information is stored in the storage medium, the angle adjustment information includes an arithmetic expression or a table that associates a plurality of width correspondence information corresponding to a possible set of width that the magnetic tape can have, a plurality of environmental information indicating a possible environment, a plurality of physical feature information indicating a possible physical characteristic of the magnetic tape, an angle at which a magnetic head configured to record data on the recording surface is inclined with respect to the recording surface is adjusted by deriving, using the arithmetic expression or the table, a corresponding angle adjustment amount from the width correspondence information of the magnetic tape, the environmental information of the magnetic tape, and the physical characteristic of the magnetic tape.

* * * * *